United States Patent [19]

Chilcote et al.

[11] Patent Number: 4,952,196
[45] Date of Patent: Aug. 28, 1990

[54] VARIABLE DIAMETER SPROCKET ASSEMBLY

[75] Inventors: Keith C. Chilcote, Pacifica; Robert J. Malahowski, San Carlos, both of Calif.

[73] Assignee: Autra-Bike Co., Inc., San Francisco, Calif.

[21] Appl. No.: 256,336

[22] Filed: Oct. 14, 1988

Related U.S. Application Data

[63] Continuation-in-part of Ser. No. 112,225, Oct. 21, 1987, Pat. No. 4,850,939.

[51] Int. Cl.⁵ .............................................. F16H 9/24
[52] U.S. Cl. ........................................ 474/70; 474/80
[58] Field of Search ...................... 474/70, 80, 82, 102, 474/109; 280/236-238, 804; 364/424.1

[56] References Cited

U.S. PATENT DOCUMENTS

| | | | |
|---|---|---|---|
| Re. 30,758 | 10/1981 | Lang | 474/80 |
| 593,285 | 11/1897 | Van Eyck | 474/57 |
| 2,199,331 | 4/1940 | Carlsson | 474/47 |
| 2,827,797 | 3/1958 | Bell et al. | 474/141 |
| 2,891,411 | 6/1959 | Sutherland et al. | 74/365 |
| 3,182,778 | 5/1965 | Droschel | 192/0.092 |
| 3,688,607 | 9/1972 | Marlow | 74/866 |
| 3,798,989 | 3/1974 | Hunt | 474/49 |
| 3,800,613 | 4/1974 | Clark | 474/54 |
| 3,864,985 | 2/1975 | Bradley et al. | 74/125.5 |
| 3,867,851 | 2/1975 | Gregory et al. | 474/56 |
| 3,919,891 | 11/1975 | Stuhlmuller et al. | 192/142 R |
| 3,956,944 | 5/1976 | Tompkins | 474/50 |
| 3,969,948 | 7/1976 | Pipenhagen, Jr. | 474/50 |
| 4,041,788 | 8/1977 | Niniger, Jr. | 474/80 |
| 4,065,983 | 1/1978 | Mimura | 74/625 |
| 4,129,044 | 12/1978 | Erickson et al. | 474/55 |
| 4,143,557 | 3/1979 | Wakebe et al. | 474/80 |
| 4,260,386 | 4/1981 | Frohardt | 474/72 |
| 4,294,341 | 10/1981 | Swart | 192/0.076 |
| 4,380,048 | 4/1983 | Kishi et al. | 74/866 |
| 4,411,334 | 10/1983 | Schlanger | 180/274 |
| 4,487,085 | 12/1984 | Collins | 74/113 |
| 4,490,127 | 12/1984 | Matsumoto et al. | 280/236 X |
| 4,493,678 | 1/1985 | Husted | 474/49 |
| 4,498,351 | 2/1985 | Ahoor | 474/47 |
| 4,575,367 | 3/1986 | Karmel | 474/106 |
| 4,605,240 | 8/1986 | Clem et al. | 280/236 |
| 4,608,034 | 8/1986 | Reswick | 474/49 |
| 4,642,070 | 2/1987 | Walker | 474/57 |
| 4,743,041 | 5/1988 | Vazin | 474/70 X |

OTHER PUBLICATIONS

Daniel Sweeney, "Pedaling New Wares", *High Technology*, vol. 6, No. 2, Feb. 1986, pp. 54–56.
Brochure; Chappelli, "Bike-O-Matic" Automatic Gear Shifter.
Brochure; James B. Reswick, "Ride-A-Matic" Automatic Bicycle Transmission, pp. 1–5.

*Primary Examiner*—Jerome W. Massie, IV
*Assistant Examiner*—Matthew Smith
*Attorney, Agent, or Firm*—Knobbe, Martens, Olson & Bear

[57] ABSTRACT

A rotatable sprocket assembly transmits force from a chain into rotation of a wheel on a bicycle. A plurality of sprocket segments having peripheral teeth are mounted on a pair of sprocket housings so that the combined periphery of the sprocket segments is substantially circular. The sprocket segments are slidable relative to the housing in a substantially radial direction so as to vary the diameter of the combined sprocket segments. Each sprocket segment is formed from a plurality of hinged subsegments, with each subsegment having a single tooth thereon. The sprocket segments of one housing overlap the adjacent sprocket segments on the other housing so that the pairs of overlapping teeth combine to effectively form a single tooth. The sprocket segments are movable angularly relative to the sprocket housings, so that in combination with the radial displacement of the sprocket segments, the total number of effective teeth on the sprocket assembly can be varied in increments of one tooth. The sprocket segments are retained in a desired radial position by a disengageable latch mechanism. A shift actuator contacts the latch mechanism to cause disengagement of the latch and angular displacement of the sprocket segments to a desired position. Movement of the shift actuator is accomplished manually or automatically through a motor and an electronic control system. The wheel and sprocket assembly are rotatable about a hub assembly which permits removal of the wheel from the bicycle without requiring removal of the sprocket assembly.

12 Claims, 32 Drawing Sheets

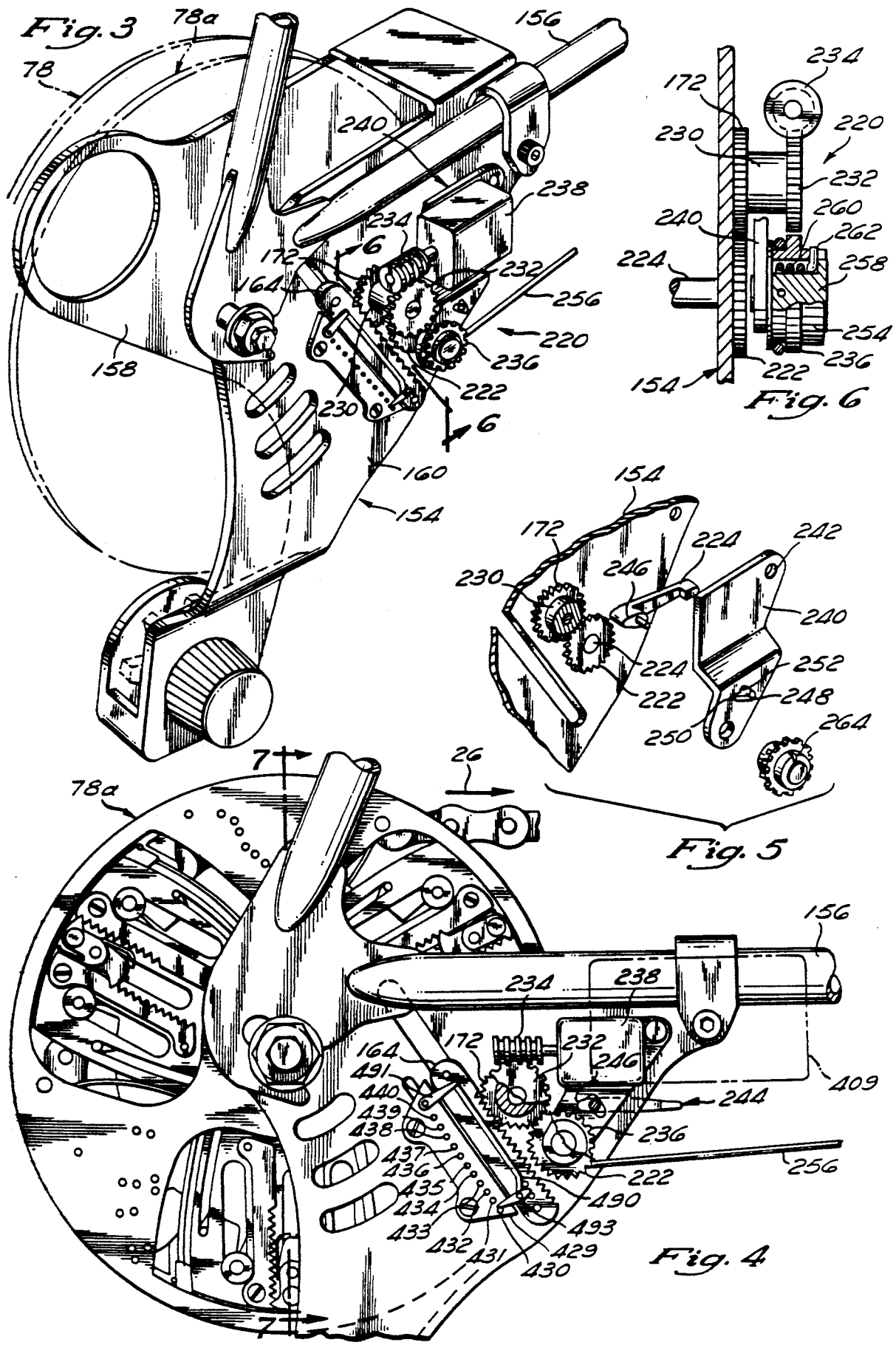

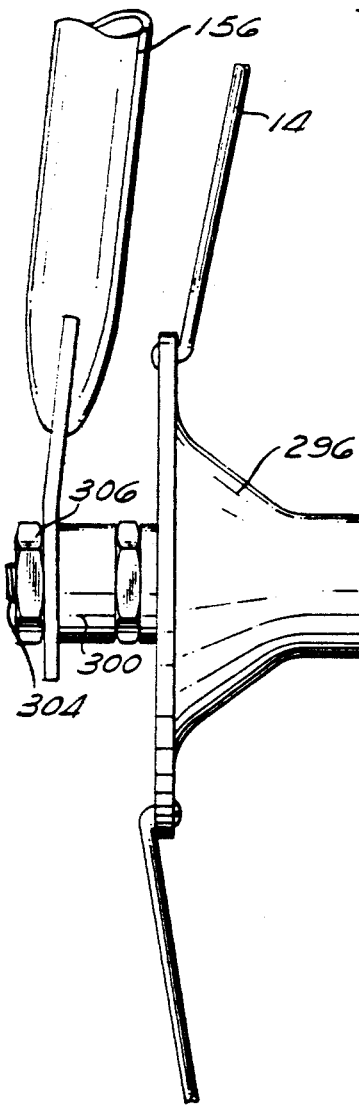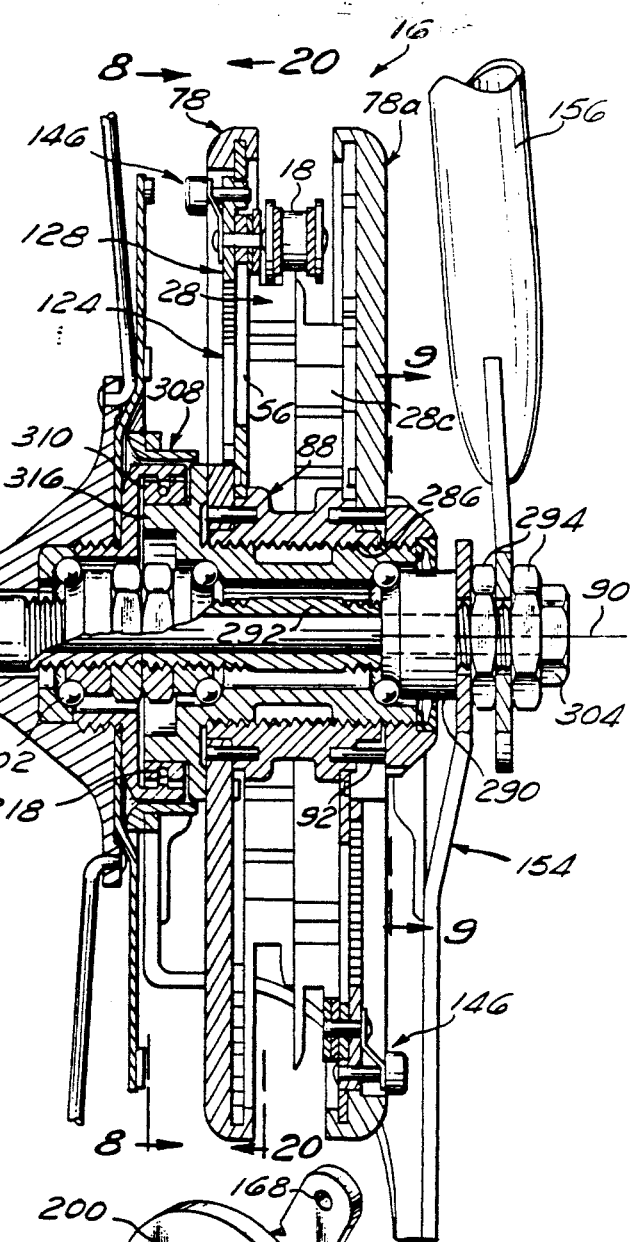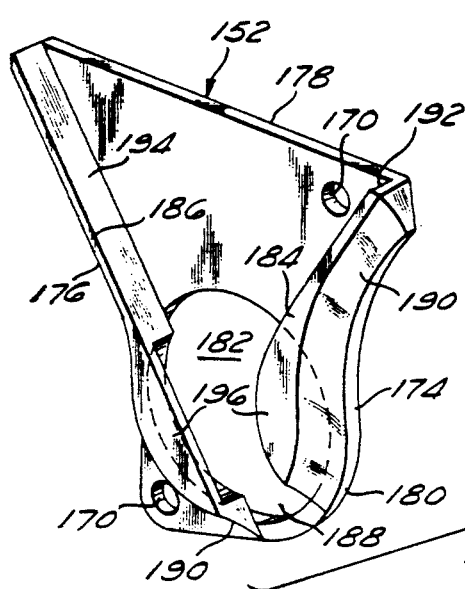
Fig. 7
Fig. 11
Fig. 12

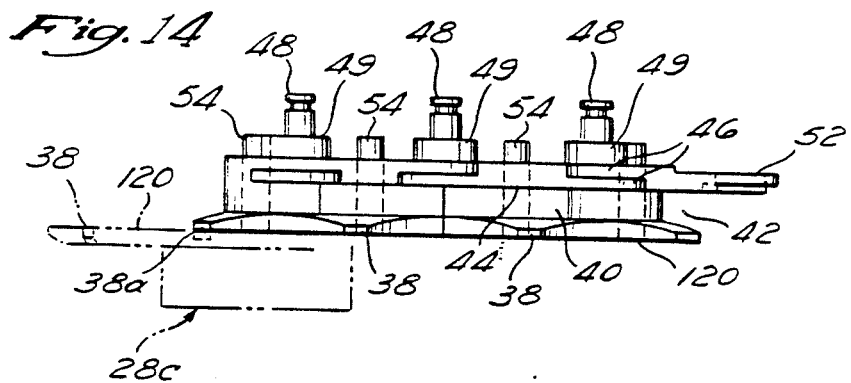
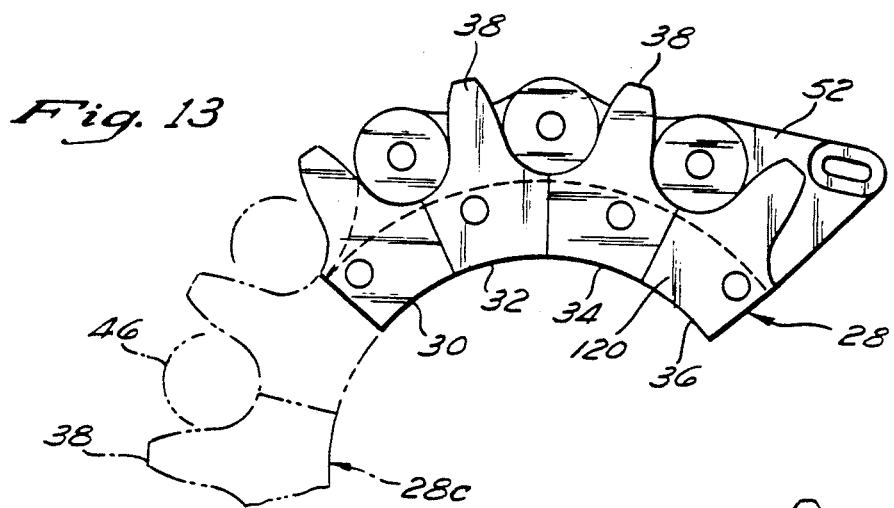
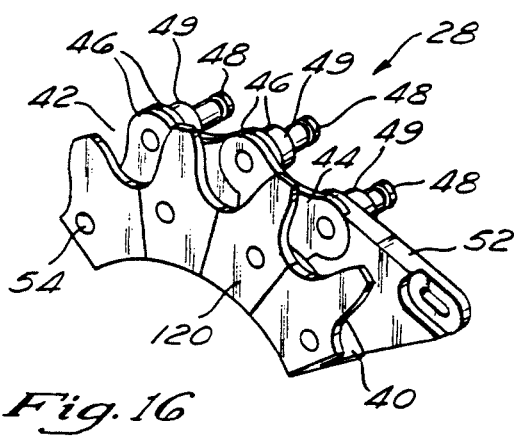
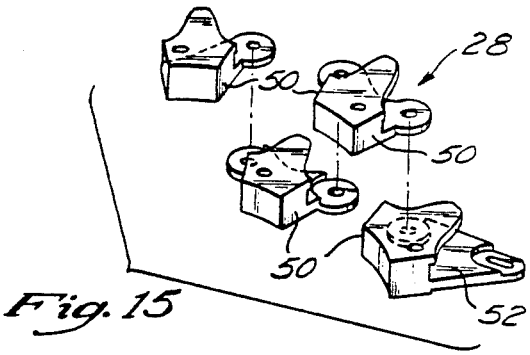

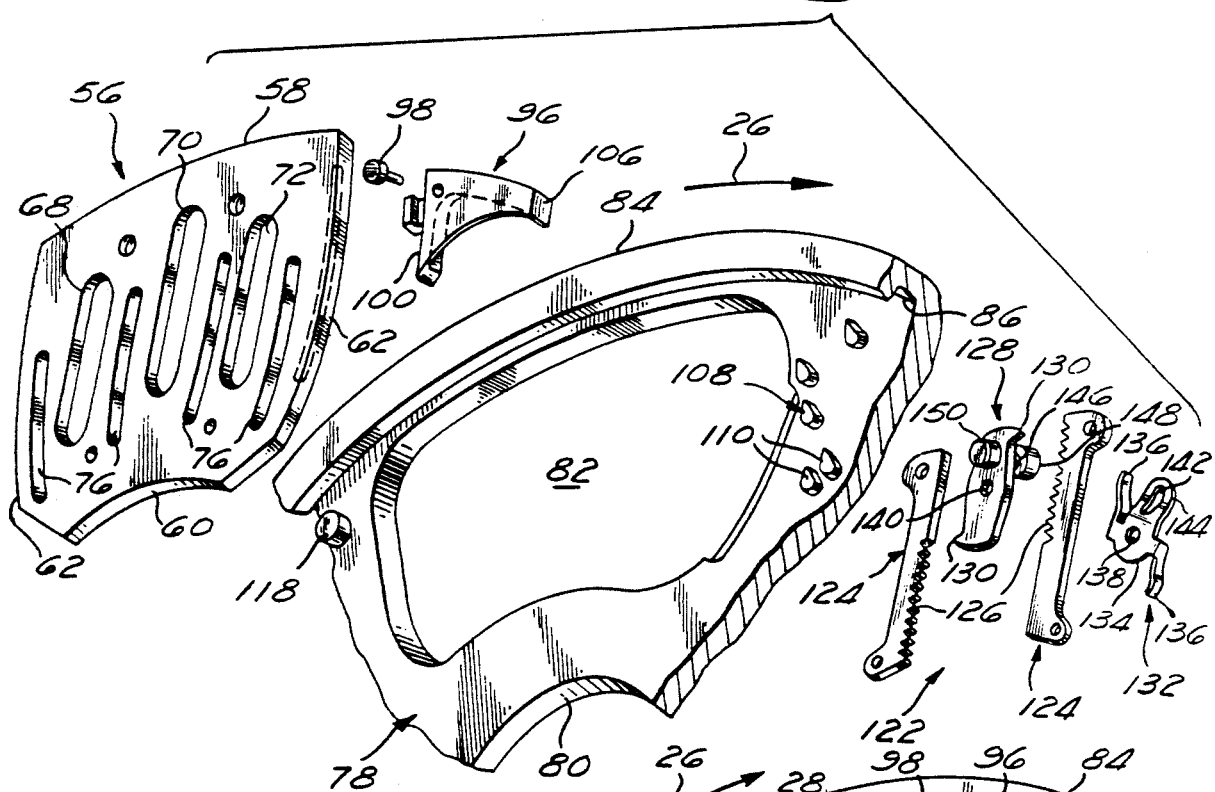
Fig. 17
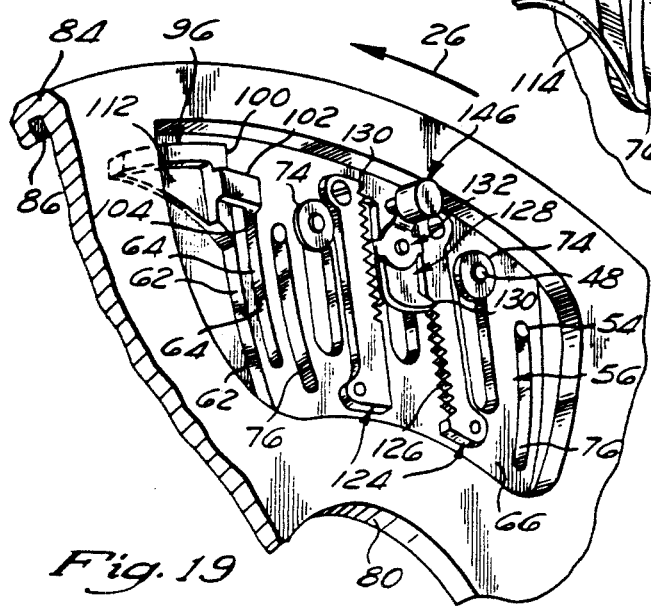
Fig. 19
Fig. 18

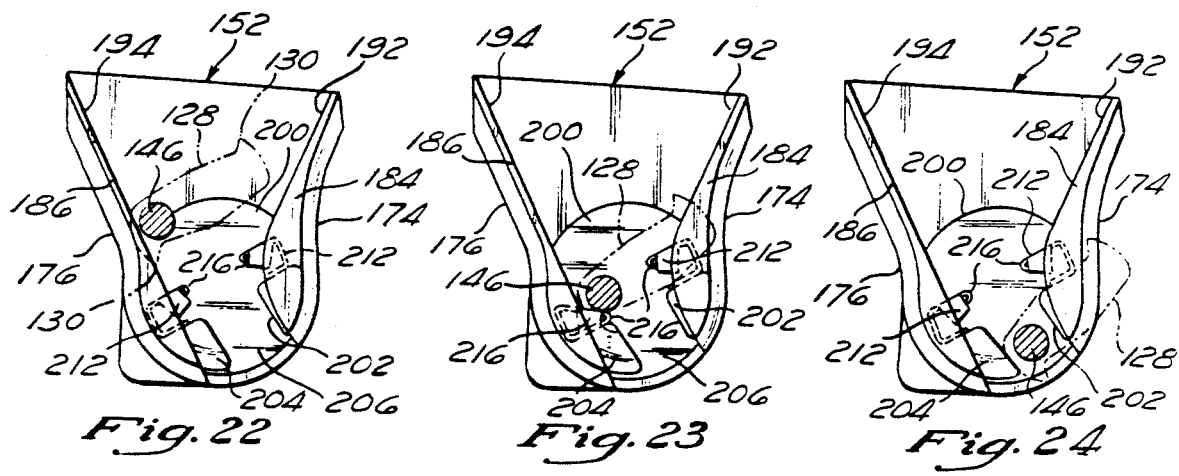
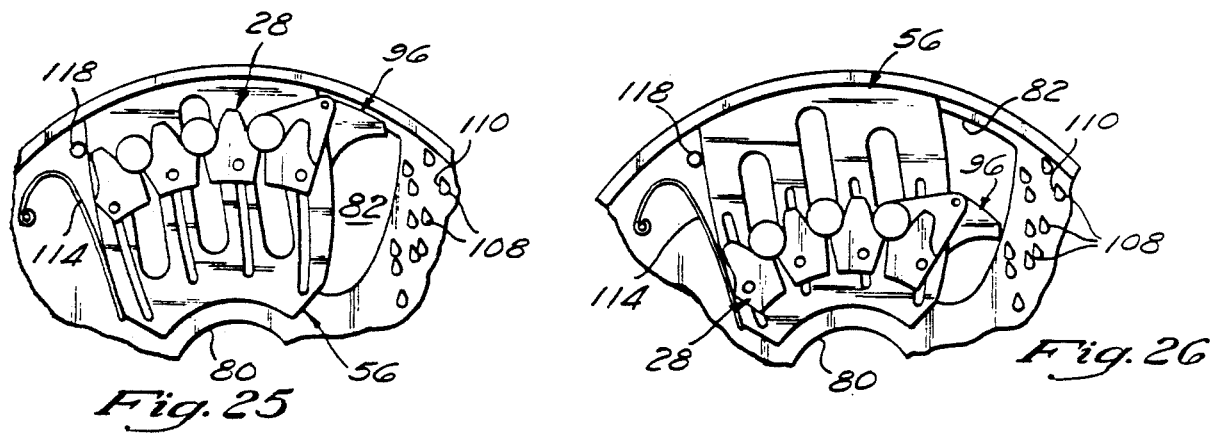
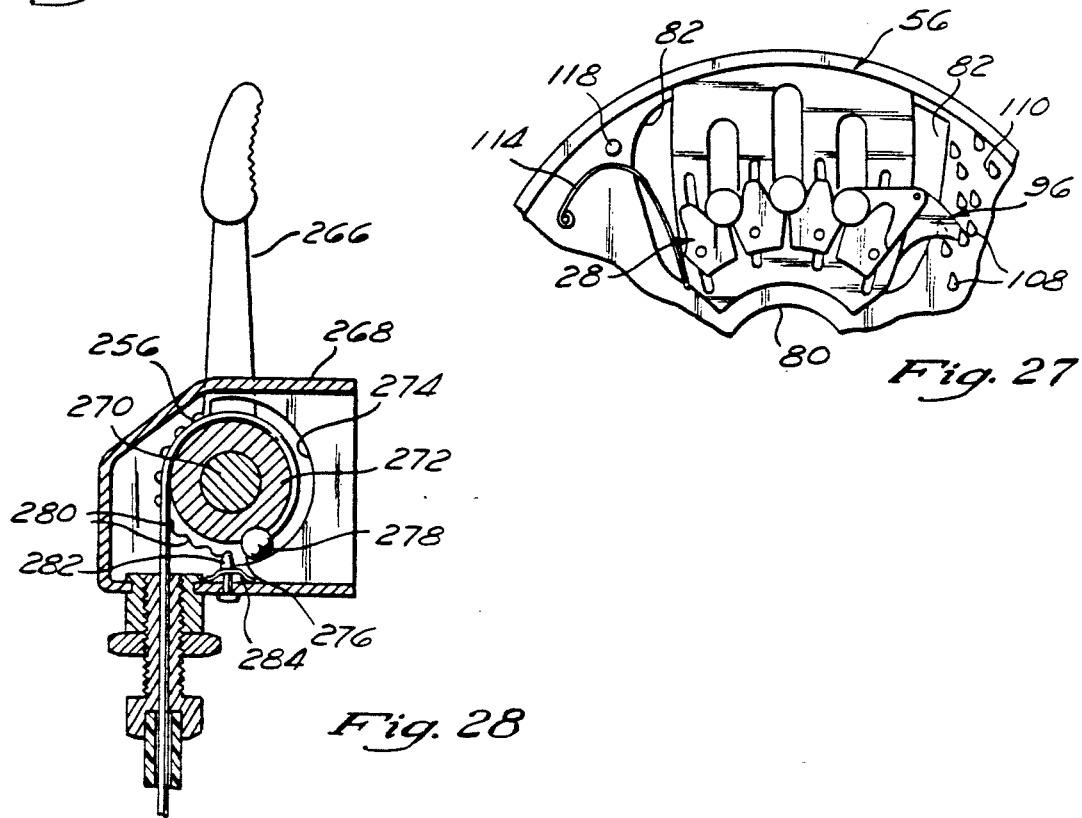

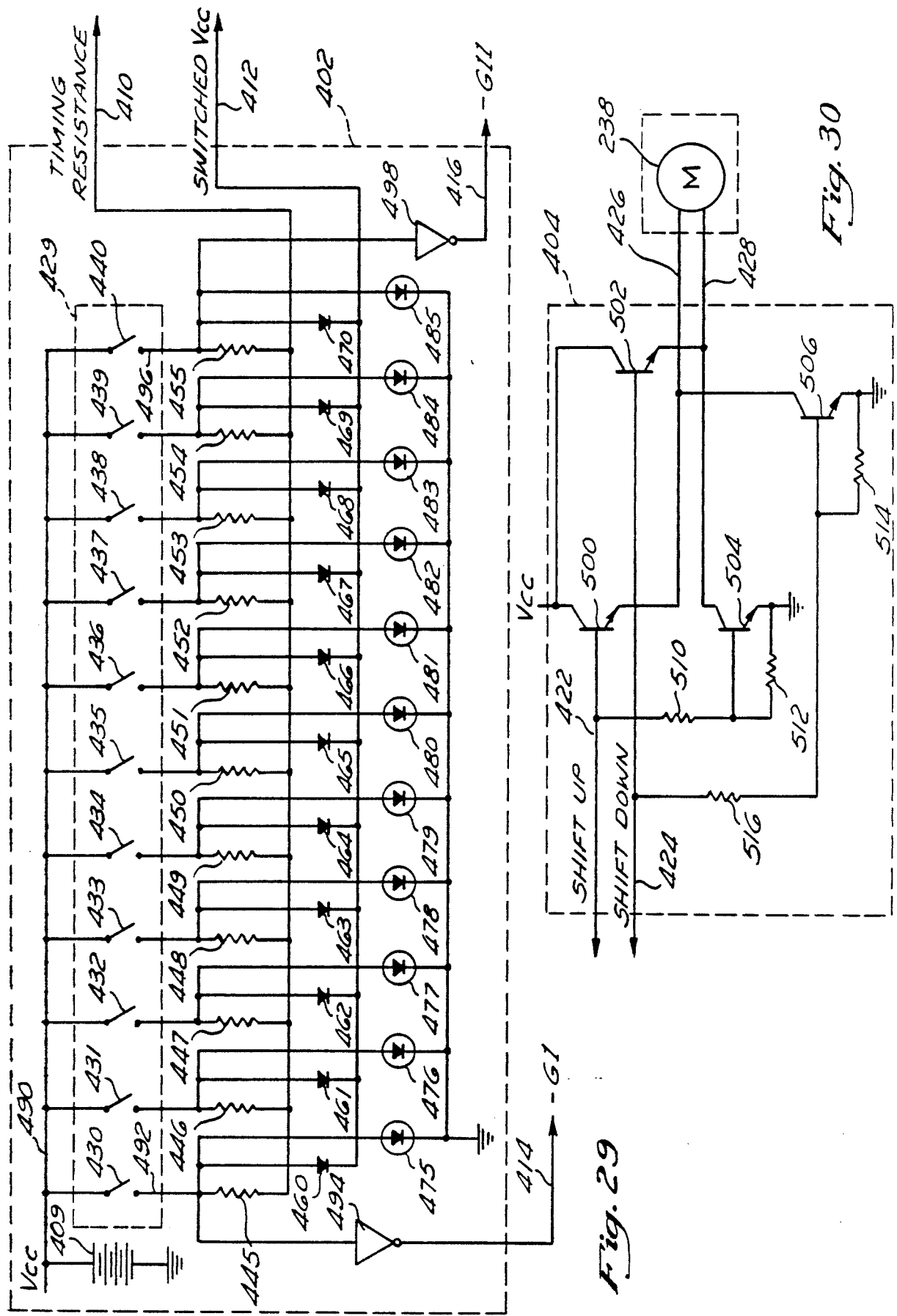

NO GEAR CHANGE

Fig. 34  SHIFT DOWN SEQUENCE

TIMED OUT SHIFT UP SEQUENCE

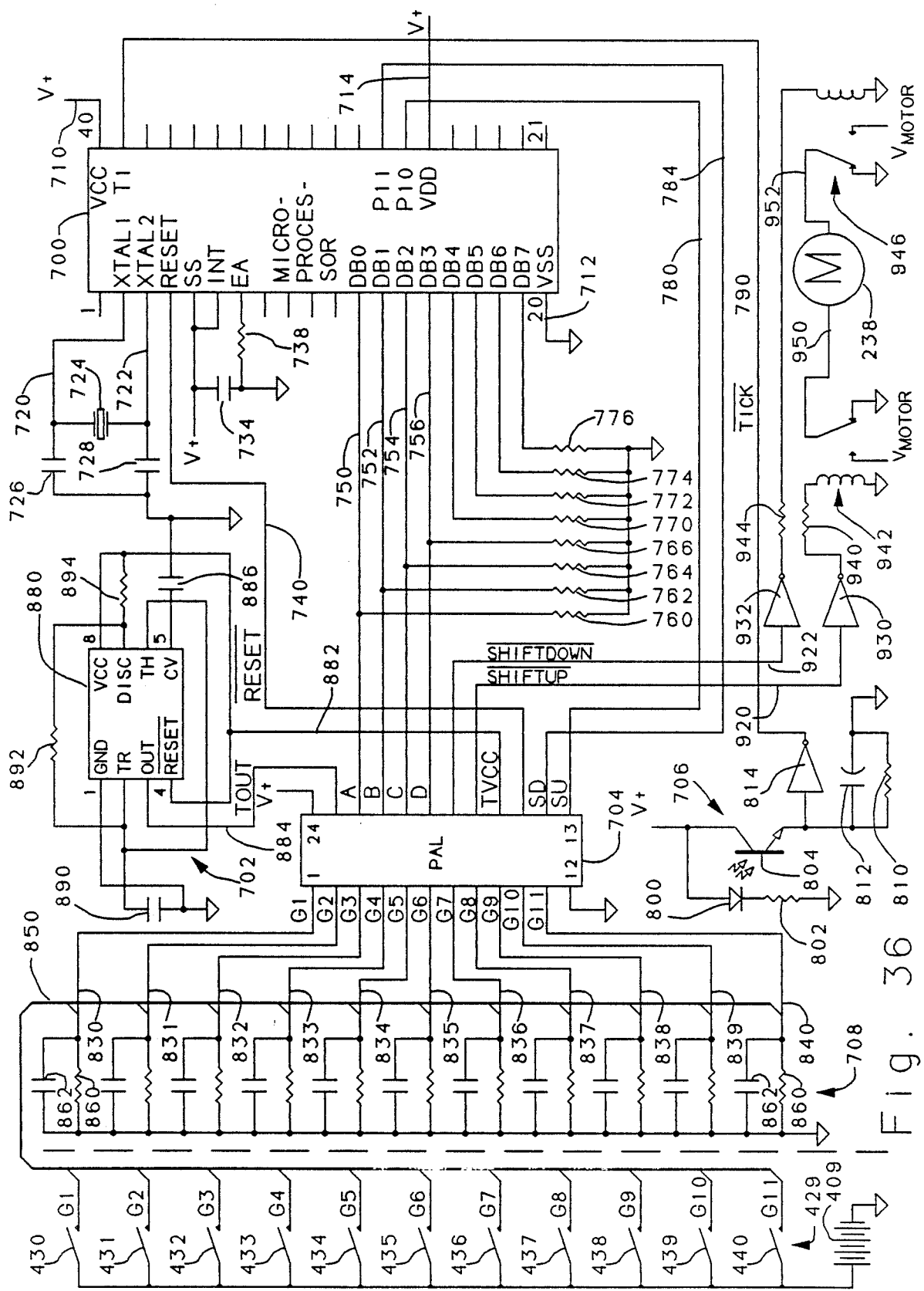

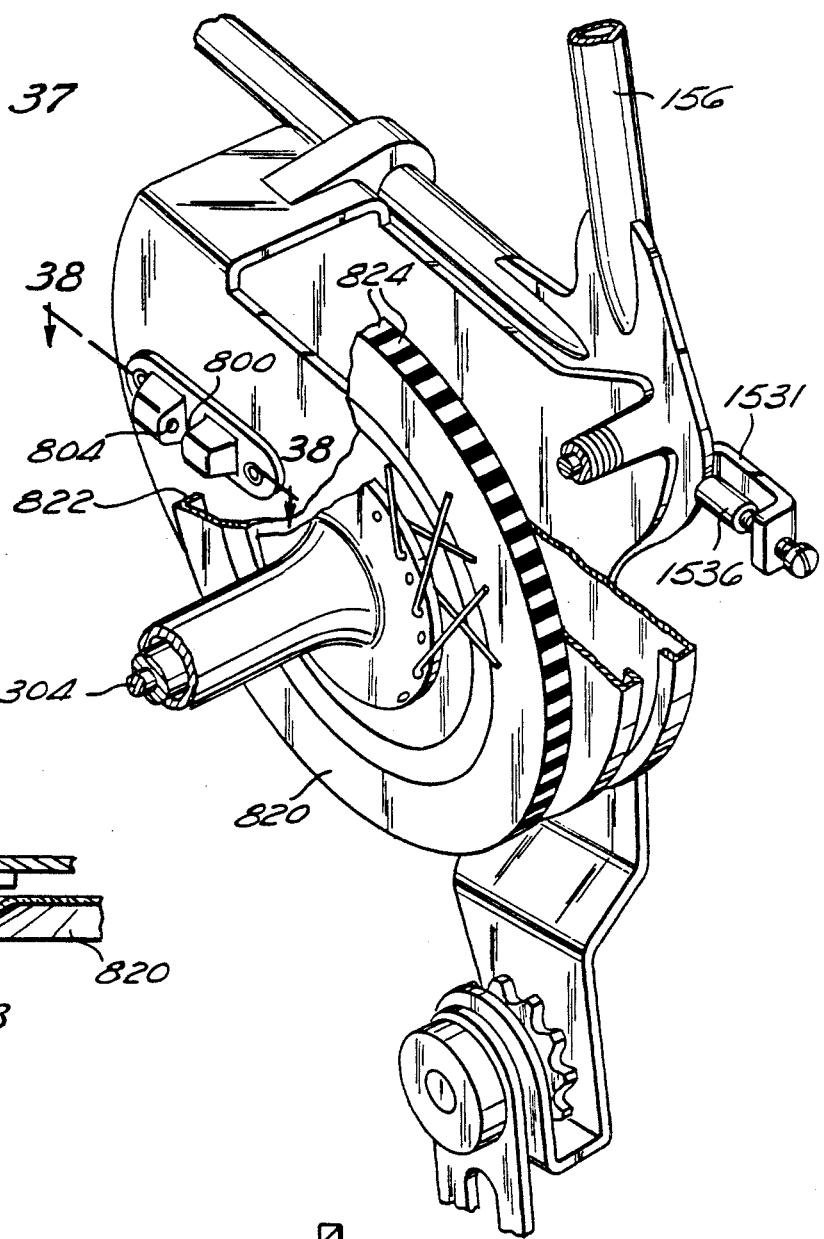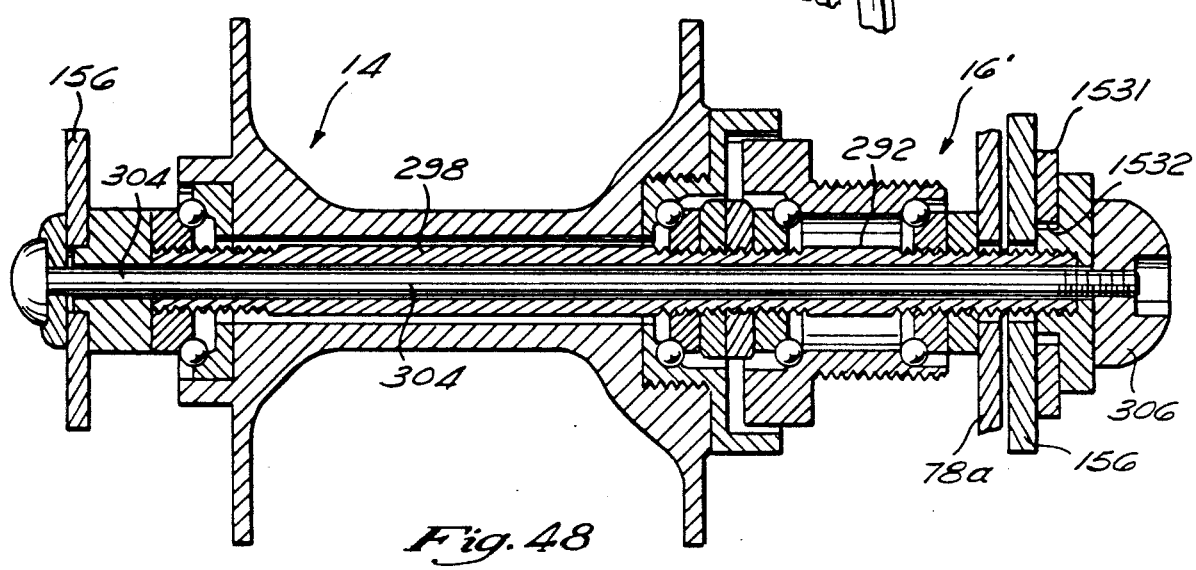

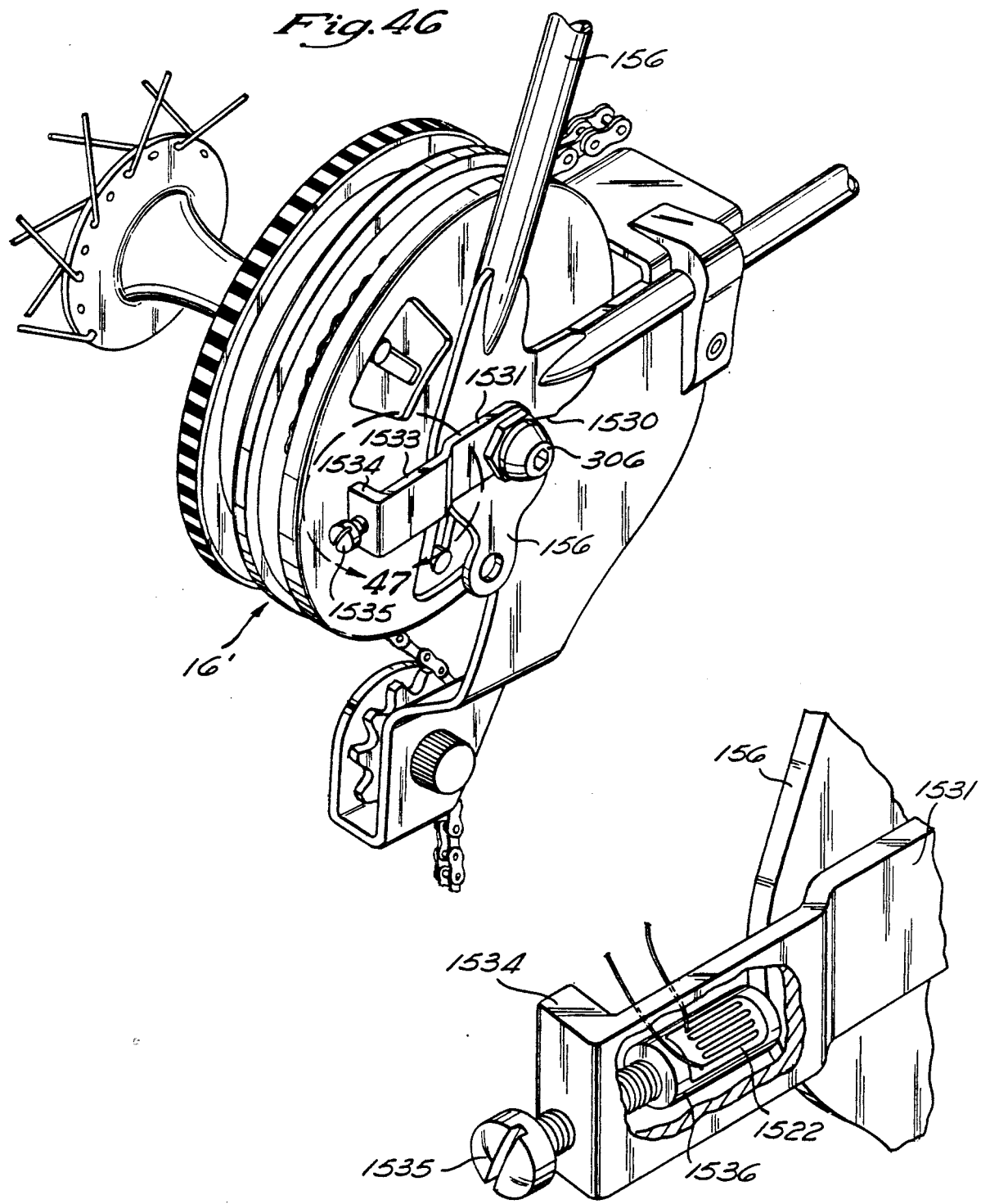

VARIABLE DIAMETER SPROCKET ASSEMBLY

RELATED APPLICATIONS

This is a continuation-in-part of U.S. Pat. application Ser. No. 112,225, filed on Oct. 21, 1987, now U.S. Pat. No. 4,850,939, issued on July 25, 1989.

NOTICE OF COPYRIGHTED SUBJECT MATTER

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a sprocket assembly which has variable gear ratios, and, in particular, relates to a sprocket assembly which does not require a derailleur to change gears.

Although the primary mode of ground transportation is the automobile, the bicycle continues to be a popular mode of transportation, particularly for recreational purposes. One of the reasons that the bicycle maintains its popularity is the availability of bicycles having multiple gear ratios, for example, "10-speed" and "15-speed" models. While in higher gears, these bicycles enable a rider to obtain relatively high speeds, which is advantageous while traversing flat terrain or going downhill. Moreover, by shifting into lower gears, the rider can climb hills with relatively little effort.

The most common means for providing multiple gear ratios on a bicycle is a "derailleur." As is well known in the art, a derailleur system has a plurality of rear sprockets of varying diameters mounted proximate to and in driving engagement with the rear wheel of the bicycle. One or more front sprockets are typically mounted in so as to be driven by the pedal cranks. The periphery of each sprocket is provided with a plurality of teeth, the number of which vary with the diameter of the sprocket. A chain link drive chain meshes with the teeth and transmits power from a selected one of the front sprockets to a selected one of the rear sprockets.

To shift gears, the drive chain is moved from one sprocket to an adjacent sprocket to change the gear ratio between the front sprockets and the rear sprockets. Thus, the mechanical advantage applied to cause rotation of the rear wheel by the pedals is varied. Typically, a derailleur system will have five or six rear sprockets and two or three front sprockets. For example, a 10-speed bicycle will have two front sprockets and five rear sprockets. Similarly, a 15-speed bicycle will have three front sprockets and five rear sprockets.

Although the derailleur system is very popular and is adequate in most cases to provide the ability to shift between the available gear ratios, there are a number of inadequacies associated with the derailleur system that are familiar to anyone who has used such a system. For example, the drive chain must be physically moved laterally to shift the chain from one sprocket to an adjacent sprocket. To do this, the chain is physically pushed to one side during the shifting process to cause it to slip off one sprocket and onto the adjacent sprocket. Thus, during the shifting process, the chain is not aligned between the front driving sprocket and the rear driving sprocket. This misalignment causes wear on both the chain and the sprockets during the shifting process.

Another problem with exemplary derailleur systems is that the chain is not aligned between the front and rear sprockets for all gear ratios. For example, with many derailleur systems, it is not advisable to operate with the derailleur chain passing from the leftmost front sprocket to the rightmost rear sprocket, or from the rightmost front sprocket to the leftmost rear sprocket. During these operations, the chain is exerting lateral forces against the edges of the sprocket teeth, and can cause excessive wear.

Furthermore, it is preferable, if not necessary, that the shifting process occur when no heavy loads are present on the driving mechanism. For example, if a shift is initiated while the rider is exerting large forces on the drive mechanism while pedaling uphill, the wear on the chain and the sprockets will be increased substantially and there may be some difficulty in completing the shifting process.

Finally, the derailleur system only operates effectively when the bicycle is moving. For example, when the bicycle is standing still, the gear ratio on a derailleur system cannot be changed. If such an attempt is made, the derailleur will not operate properly upon resuming pedaling. Thus, it is necessary for a rider coming to a stop to anticipate the gear ratio required to resume motion and to downshift prior to stopping.

Other systems have been devised for providing variable gear ratios on bicycles. For example, U.S. Pat. No. 593,285 to Van Eyck, issued Nov. 9, 1897, shows an early gear-changing device using a segmented sprocket-wheel that can be enlarged or reduced in size by means of a device located within reach of a bicycle rider. U.S. Pat. No. 2,827,797 to Bell, et al., issued on July 22, 1954, and U.S. Pat. No. 3,798,989 to Hunt, issued on Mar. 26, 1974, show multiple-speed drive sprockets that can be varied from a circular configuration to an elliptical configuration. U.S. Pat. No. 3,800,613 to Clark, issued on Apr. 2, 1974, shows a variable speed sprocket having a plurality of smaller sprockets that can be moved radially outward to vary the effective diameter of the sprocket group. U.S. Pat. No. 4,260,386 to Frohardt, issued on Apr. 7, 1981, has an outer gear ring for engagement with a standard bicycle chain and having inner segments that can be adjusted to different configurations for driving the outer gear ring. U.S. Pat. No. 4,493,678 to Husted, issued on Jan. 15, 1985, has a plurality of sprocket segments that are movable inwardly and outwardly in a corresponding number of spiral-wavy-cams.

Although the above-listed patents appear to describe sprockets that maintain chain alignment at each of the gear ratios, none of the above-described patents appear to disclose a drive sprocket that remains substantially circular for each of the gear ratios. It is believed that substantial circularity is preferable in order to provide the smooth pedaling effect obtained when riding a typical bicycle having sprockets which remain circular. For example, the elliptical sprockets disclosed by the Bell and Hunt patents will provide a different effective gear ratio depending upon the angular positions of the pedals. Thus, the rider must apply varying effort as the pedals are rotated about the crank axis. This change in the gear ratio is frequently referred to as "chordal speed variation" and is caused by the deviation of the sprocket from a perfect circle. Even a conventional sprocket has a chordal speed variation of approximately 2 percent caused by the use of a linked chain rather than a smooth belt. For example, when engaged with a chain, a 27-tooth sprocket would effectively have 27 flat surfaces or chords forming its circumference, as opposed to a smooth, truly circular surface. The chordal speed variation of the Clark device will be substantial because of the significant difference in the distance of the chain from the axle of the wheel when the sprockets are tangential to the chain and when the sprockets are disposed at an angle to the chain.

Thus, a need exists for a drive sprocket that provides a variable gear ratio while maintaining substantial circularity of the driving sprocket.

Another drawback of the derailleur systems is that the shifting of gears is accomplished manually, by moving a lever. The lever typically actuates a cable, which in turn causes the derailleur to shift gears. Each time the gears are to be shifted, the rider must loosen his grip on the handlebar of the bicycle in order to manually actuate the lever. Thus, when travelling at high speeds or over irregular terrain, maintaining of directional control over the bicycle can be difficult while the gears are being changed.

Automatic transmissions have been developed which automatically change gears without requiring manual actuation. However, these previous devices, which operate mechanically, have been unsatisfactory due to loss of efficiency which results from the additional mechanical components that engage the drive chain and cause the rider to have to exert additional effort to operate the bicycle. Further, these prior devices cause gear changes upon sensing variation in the amount of torque applied to the drive chain by the rider. Since torque variations are common when the rider temporarily discontinues pedalling and is coasting, such as during turns or when going downhill, the prior transmissions will often cause unwanted gear changes during short lulls in the pedalling action of the rider. Thus, a need exists for an improved automatic transmission that does not require the rider to have to exert extra effort in order to overcome the loss of efficiency caused by mechanical automatic transmissions, and which shifts in accordance with the speed of the bicycle rather than the torque applied to the chain.

SUMMARY OF THE INVENTION

Briefly, the present invention is a sprocket assembly which is rotatable upon application of a force from a drive member which engages the sprocket assembly. The sprocket assembly is expandable so as to vary the mechanical advantage applied to the sprocket assembly The sprocket assembly comprises a first sprocket housing which is rotatable about a central axis. The first sprocket housing is oriented in a plane which is substantially normal to the central axis. A second sprocket housing is also rotatable about the central axis, and is stationary relative to the first sprocket housing. The second sprocket housing is oriented in a plane which is parallel to the plane of the first sprocket housing. A plurality of sprockets segments are mounted on each of the sprocket housings. The sprocket segments include means for engaging the drive member so the motion of the drive member is transmitted into rotation of the sprocket assembly about the central axis. Each of the sprocket segments is movable relative to the housing on which it is mounted in a substantially radial direction. The sprocket segment on the first housing and the sprocket segment on the second housing cooperate to define a plurality of combined peripheral shapes, so as to permit variation in the mechanical advantage applied to the sprocket assembly by the drive member.

Preferably, the engagement means on the sprocket segments comprises a plurality of radially outwardly extending teeth, which mate with the drive member. The drive member, for example, may be formed from a chain comprised of a plurality of links.

A major advantage of the present invention over the prior art derailleur type systems is that no lateral movement of the chain is required to change gears. This is because the chain only engages a single sprocket throughout the variety of gear settings. Consequently, when the present invention is utilized as the rear sprocket on a bicycle, misalignment of the chain between the front and rear sprockets is minimal.

Another feature of the present invention is that regardless of the radial positions of the sprocket segments, the combined peripheral shape of the sprocket segments is substantially circular. To facilitate this, when the sprocket segments are in certain radial positions, the sprocket segments of one housing overlap with the adjacent sprocket segments on the other housing so that the pairs of overlapping teeth on the sprocket segments are effectively combined to form a single tooth. Moreover, each of the sprocket housings further comprises at least one backing plate on which the sprocket segments are slidably mounted. Preferably, arcuate slots are provided on each backing plate to guide the radial displacement of the sprocket segments. The backing plates are movable relative to the sprocket housings in an angular or circumferential direction only. Another advantage of the present sprocket assembly is that due to the combined radial and angular displacement of the sprocket segments relative to the sprocket housing, the diameter of the sprockets can be varied in small enough increments so that difference between consecutive sprocket settings is only a single tooth. Further, each sprocket segment is divided into a plurality of subsegments which are hingedly secured to each other. A single tooth is formed on each of the subsegments. As a result, a truly circular periphery can be obtained, thus virtually eliminating all chordal variation.

The present invention further comprises means for retaining the sprocket segments at desired locations relative to the sprocket housing. The retaining means is selectively disengageable so as to permit displacement of the sprocket segments to different locations, enabling the diameter of the sprocket segment to be varied. To change the diameter of the sprocket segment, a shift actuator is provided, which is movable relative to the central axis. Contact between the retaining means and the shift actuator causes disengagement of the retaining means and displacement of the sprocket segments, thereby causing the sprocket assembly to expand or contract. A shifter means is also provided to cause displacement of the shift actuator.

Advantageously, the shift actuator remains stationary during contact with the retaining means so that the force required to disengage the retaining means and displace the sprocket segments is not generated by moving the shift actuator, unlike derailleur-type shifters. The shifter means may be manually actuated to move the shift actuator, and thus the reduction in force necessary to move the shifter actuator enhances the ease of operation of the system. The force required to disengage the retaining means and cause displacement of the segments is generated by the chain, which, if used on a bicycle, is driven by the rider's legs, and thus the additional pedaling force required to shift gears is virtually unnoticeable. This is in contrast to prior device in which all of the force required is generated manually.

Another feature of the present invention is that the shift actuator can be moved while the sprocket assembly is stationary without adversely affecting the operation of the sprocket assembly upon resuming rotation. This results from orientating the shift actuator so that it contacts and disengages the retaining means at a position of angular rotation of the sprocket assembly wherein the drive chain is not engaged with the teeth of the sprocket segments of the sprocket assembly. This feature also permits shifting of gears while heavy loads are applied to the drive chain, such as while pedaling uphill, again without adversely affecting the changing of gears.

Furthermore, the number of rotations of the sprocket assembly required to cause shifting of multiple gears is no greater than the number of rotations of the sprocket assembly required to shift only a single gear, unlike previous derailleur systems. Another advantage is that the retaining means secures the sprocket segments in discrete locations corresponding to each gear ratio, and automatically compensates for movement of the shift actuator to a position which results in the sprocket segments being moved to positions other than the discrete gear positions.

Another aspect of the present invention is a hub assembly on which the wheel and sprocket assembly are rotatably mounted and secured to the bicycle frame. The sprocket assembly is rotatable about a tubular sprocket axle which is secured at one end to the bicycle frame. The wheel is rotatable about a tubular wheel axle, which has a common central axis with the sprocket axle. One end of the wheel axle is secured to the bicycle frame and the other end of the wheel axle is positioned opposite the other end of the sprocket axle. An elongate inner axle member extends through the wheel axle and through the sprocket axle and is fastened at either end to the bicycle frame. A clutch is provided to transmit force from the sprocket assembly to the wheel, and is disengageable so that upon withdrawal of the axle member from the wheel and sprocket axles, the clutch means can be disengaged to permit the wheel to be removed from the bicycle frame, without requiring removal of the sprocket assembly.

Another aspect of the present invention is a device that automatically controls the gear selection of a multigear shifting mechanism of a bicycle. The device comprises an electric motor that is engageable with the shifting mechanism. The rotation of the electric motor causes the shifting mechanism to shift from one gear to another gear. The motor is operational in a first direction to cause the shifting mechanism to select a higher gear. The motor is operational in a second direction to cause the shifting mechanism to select a lower gear. The device further includes a transducer that generates an output signal that has a characteristic that varies in accordance with the rotation rate of one of the wheels of the bicycle. An electrical circuit is also included that receives the transducer output signal and that generates a motor power signal to operate the electric motor. The electrical circuit compares the characteristic of the transducer output with first and second ranges of characteristics for the currently selected gear. The electrical circuit generates a motor power signal with a first polarity to operate the electric motor in the first direction to select a higher gear when the transducer output is within the first range of characteristics. The electrical circuit generates the motor power signal with a second polarity to operate the electric motor in the second direction to select a lower gear when the transducer output is within the second range of characteristics.

In preferred embodiments of the device the characteristic is the time interval between successive pulses generated by the transducer. The electrical circuit includes a pulse generator that generates a pulse having a time duration that varies in accordance with the currently selected gear. In a preferred embodiment of the device, the time duration is selected by a plurality of timing resistors, one of the timing resistors corresponding to each gear selection provided by the shifting mechanism. A counter is also included that counts the number of pulses generated by the transducer during the time duration and that provides a count output corresponding to the number of pulses. The preferred embodiment of the device also includes a decoder that decodes the count output of the counter and that generates a first signal when the count output is within a first range of counts. The decoder also generates a second signal when the count output is within a second range of counts.

In a particularly preferred embodiment of the automatic gear selection device, the electric motor is controlled by a microprocessor controlled circuit. The microprocessor in the circuit receives a first set of input signals that identify the currently selected gear and a second input signal that has a pulse repetition rate proportional to the rotational speed of a wheel of the bicycle. Preferably, the pulses are generated by periodically interrupting an infrared light beam between an infrared transmitter and an infrared receiver. The microprocessor counts the number of pulses of the second input signal in a predetermined unit of time and compares the counted number of pulses with a range of numbers associated with the currently selected gear. If the number of pulses is outside the range for the currently selected gear, the microprocessor generates a selected output signal to cause the motor in the shifting mechanism to operate in a direction to shift to a higher gear or a lower gear in accordance with whether the counted number of pulses is greater than or less than the range for the currently selected gear. In particularly preferred embodiments in accordance with this aspect of the invention, a fail-safe timer mechanism is included to reset the microprocessor to known conditions if the microprocessor does not operate to shift the shifting mechanism within a predetermined amount of time since the last shift. This fail-safe timer mechanism precludes the microprocessor controlled circuit from continuing in a unknown operating condition in the event that a transient in the power source, or other cause, should result in the microprocessor entering such an unknown operating condition.

In particularly preferred embodiments of the microprocessor controlled circuit, a strain gauge circuit is provided to detect the force applied to the sprocket assembly by the drive train. This force changes the resistance of a strain resistor. The changes in the resistance are converted to changes in an analog voltage which is digitized and provided as an additional input to the microprocessor to thereby provide a digital input responsive to the strain applied to sprocket assembly by the drive train. A count adjustment value is calculated that is responsive to this digital input and is added to the count range for the currently selected gear, thereby allowing a cyclist to pedal harder and faster in the currently selected gear without causing an automatic shift.

BRIEF DESCRIPTION OF THE DRAWINGS

FIG. 3 is a perspective view of the sprocket assembly shown in FIG. 2, with a dust cover removed to expose the shifter transmission, and with the sprocket housings shown schematically.

FIG. 4 is a side elevation of the sprocket assembly shown in FIG. 3, with the sprocket housing shown in detail.

FIG. 5 is an exploded perspective view of the shifter transmission shown in FIGS. 3 and 4.

FIG. 6 is a cross-sectional view of the shifter transmission shown in FIG. 3, as taken along line 6—6.

FIG. 7 is a cross-sectional view of the present sprocket assembly and the rear wheel of a bicycle, and their associated hub assemblies.

FIG. 11 is an exploded perspective view of the shift actuator mechanism shown in FIG. 9.

FIG. 12 is a cross-sectional view of the shift actuator mechanism shown in FIG. 9, taken along line 12—12.

FIG. 13 a side elevation of a sprocket segment, with an overlapping sprocket segment shown schematically in broken lines.

FIG. 14 is a top plan view of the sprocket segments shown in FIG. 13.

FIG. 15 is an exploded perspective view of a sprocket segment.

FIG. 16 is a perspective view of a sprocket segment.

FIG. 17 is an exploded perspective view of a sprocket housing, a backing plate and a shift lock mechanism.

FIG. 18 is a perspective view of a portion of a sprocket housing, a backing plate and a portion of a sprocket segment mounted thereon, as viewed from the interior of the sprocket assembly.

FIG. 19 is a perspective view of a portion of a sprocket housing, a backing plate and a shift lock mechanism, as view from the exterior of the sprocket assembly.

FIG. 22 is a side elevation of a shift actuator and a pilot pin as engaged during gear shifting.

FIG. 23 is a side elevation of a shift actuator showing engagement between the pilot pin and the contact spring during gear shifting.

FIG. 24 is a side elevation of a shift actuator and a pilot pin after the completion of gear shifting.

FIG. 25 is a schematic view of a portion of a shifter housing, with a backing plate and a sprocket segment biased to the left side during the initiation of gear shifting.

FIG. 26 shows the assembly of FIG. 25 after the sprocket segment has been moved radially to a new position corresponding to a new gear.

FIG. 27 shows the assembly of FIG. 26 after completion of gear shifting.

FIG. 28 is a cross-sectional side elevation of a manual shifter lever.

FIG. 29 is a detailed schematic diagram of the timing select and gear-indicating circuit, showing the plurality of switches representing the switch contacts of FIG. 4, the switch-selected timing resistors, the SWITCHED Vcc line and the light-emitting diodes that indicate the currently selected gear.

FIG. 30 is a detailed schematic diagram of the motor drive circuit that is responsive to the SHIFT-UP and SHIFT-DOWN signals from the motor controller circuit and that generates a bidirectional motor power signal that drives the electric motor in one of two directions.

FIG. 36 is a schematic diagram of an alternative embodiment of an electronic automatic transmission control circuit of the present invention that utilizes a microprocessor.

FIG. 37 is a partial perspective view of a portion of the rear wheel of the bicycle showing a disk with regularly spaced light transmitting holes around its periphery and further showing an infrared light emitting diode positioned in juxtaposition with an infrared sensitive phototransitor on opposite sides of the disk.

FIG. 38 is a partial cross-sectional view of the disk, the infrared light emitting diode and the phototransistor taken along the lines 38—38 in FIG. 37.

FIG. 46 is a perspective view of a portion of the bicycle frame and rear wheel showing the mounting of the sprocket assembly in accordance with this invention, and, in particular, showing an axle strap and a compression member for blocking the forward movement of the sprocket assembly.

FIG. 47 is an enlarged perspective view of a portion of the bicycle frame and sprocket assembly in the area encompassed by the line 47—47 in FIG. 46, showing the axle strap and compression member in more detail and showing the mounting of the strain resistor on the compression member.

FIG. 48 is a cross-sectional view of the sprocket assembly and the rear wheel of the bicycle similar to the view of FIG. 7, showing the non-engagement of the drive side of the sprocket axle with the bicycle frame and further showing the position of the axle strap between the sprocket assembly and the bicycle frame.

DETAILED DESCRIPTION OF A PREFERRED EMBODIMENT

Figure 1:
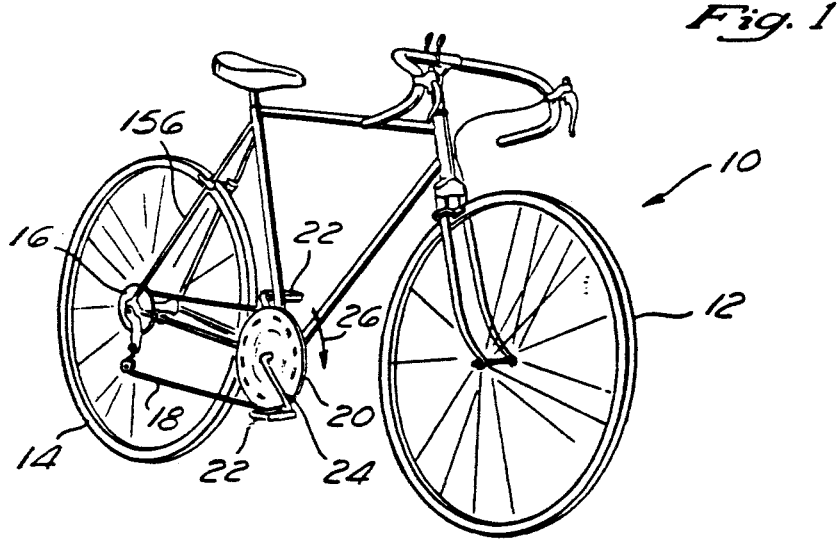
FIG. 1 is a perspective view of a bicycle utilizing the present variable diameter sprocket assembly on the rear wheel of the bicycle.

Referring to FIG. 1, a bicycle 10 having a front wheel 12 and a rear wheel 14 is shown. A sprocket assembly 16 according to the present invention is rotatably mounted adjacent the rear wheel 14. An endless chain 18 is looped around the sprocket assembly 16 and also around a rotatable front sprocket 20. Rotation of the front sprocket 20 is caused by applying force to a pair of pedals 22 joined to the front sprocket 20 by means of pedal cranks 24. Rotation of the front sprocket 20 in turn moves the chain 18 in a clockwise direction indicated by arrow 26, and referred to herein as the "drive direction." Movement of the chain 18 in the drive direction 26 results in rotation of the sprocket assembly 16. The sprocket assembly 16 is joined to the rear wheel 14 in a manner so that rotation of the sprocket assembly 16 is transferred into rotation of the rear wheel 14, as is discussed in greater detail below.

FIGS. 14-16 illustrate a sprocket segment 28 which is provided on the sprocket assembly 16 to engage the chain 18. The sprocket segment 28 is formed from a group of four separate subsegments 30, 32, 34, 36 which are hingedly secured together so that the sprocket segment 28 can assume an overall arcuate curvature. Each subsegment 30, 32, 34, 36 has a substantially planar tooth 38 which protrudes radially outward and is designed to mesh with the chain 18. Adjacent each tooth 38 is a shelf 40 which forms the base of a channel 42 within which the chain 18 nests when engaging the teeth 38. The opposite side of the channel 42 is formed by a planar hinge plate 44 which is substantially parallel to the plane of the teeth 38.

Each hinge plate 44 includes at least one circular hinge connector 46 which is recessed so as to mate with the hinge connector 46 of the adjacent subsegment. A hinge pin 48 extends through aligned holes in the hinge connectors 46 of adjacent subsegments 30, 32, 34, 36 to pivotably secure the subsegments 30, 32, 34, 36 together. The mating circular peripheries of the hinge connectors 46 permit rotation of the subsegments 30, 32, 34, 36 relative to each other throughout a range of angular displacement. Consequently, the overall radius of curvature of the sprocket segment 28 can be varied by pivotal movement of the subsegments 30, 32, 34, 36 relative to each other. The minimum radius or diameter of the sprocket segment 28 is reached when there is contact between side edges 50 of the subsegments 30, 32, 34, 36. The side edges 50 are tapered in a radially inward direction so as to increase the degree of curvature which can be achieved by the sprocket segment 28 when the adjacent side edges 50 are abutting.

Each of the four subsegments 30, 32, 34, 36 differ slightly. The left, outer subsegment 30 has only a single hinge connector 46 since it is only adjacent to one other subsegment 32, which is referred to as the left central subsegment 32. Both the left central subsegment 32 and the adjacent right central subsegment 34 have two hinge connectors 46 on either side. The right outer subsegment 36 has a hinge connector 46 on one side to secure the right outer subsegment 36 to the right central subsegment 34. A locator contact plate 52 also extends outwardly from the other side of the right outer subsegment 36. The purpose of the locator plate 52 is discussed in greater detail below. Each subsegment 30, 32, 34, 36 also includes a guide pin 54 which extends outwardly in a direction substantially parallel to the direction of the hinge pins 48.

Figure 20:
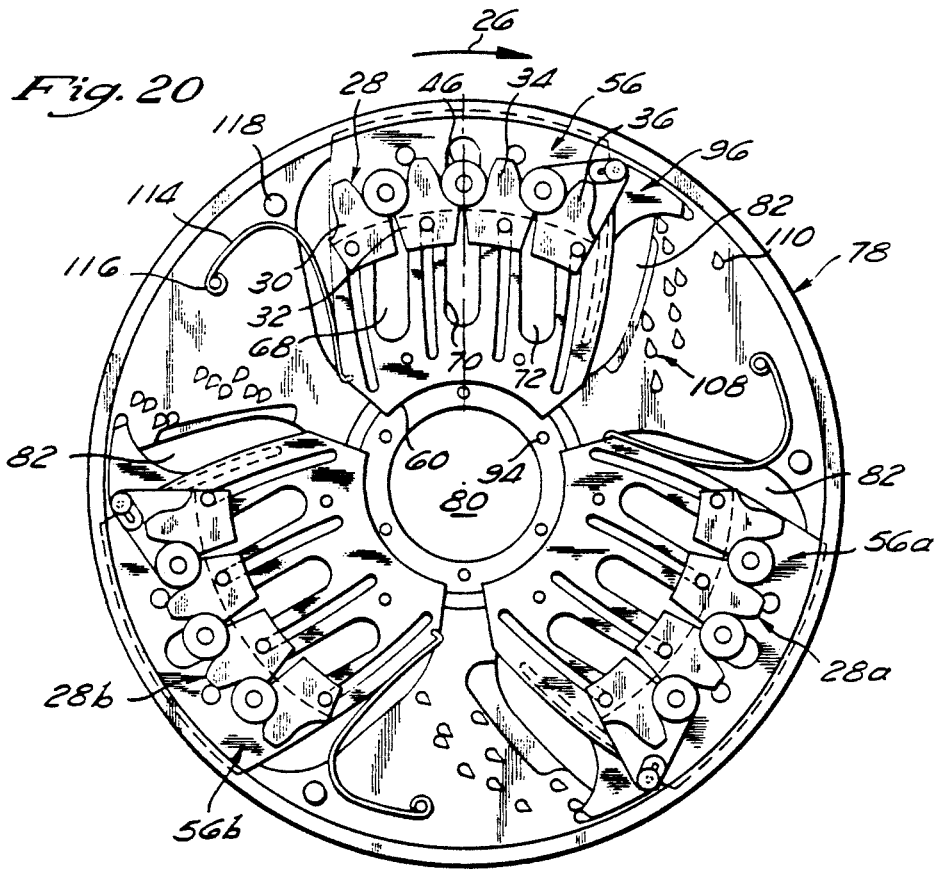
FIG. 20 is a side elevation of the inboard sprocket housing with the sprocket segments positioned in first gear.
Figure 21:
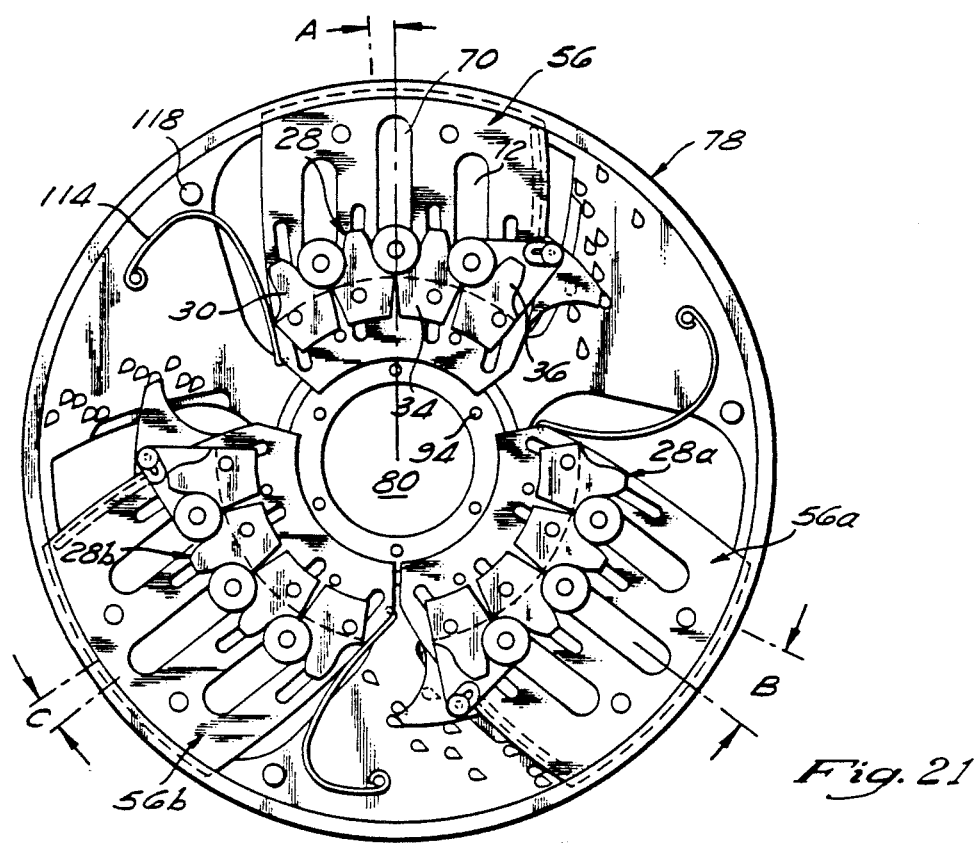
FIG. 21 is a side elevation of the inboard sprocket housing with the sprocket segments positioned in eighth gear.

As is shown in FIGS. 18, 20 and 21, the sprocket segment 28 is mounted on a substantially planar backing plate 56. The backing plate 56 has an arcuate radially outer edge 58, an arcuate radially inner edge 60 and a pair of convexly curved side edges 62. As is seen in FIGS. 17 and 19, a groove 64 is provided on a back side 66 of the backing plate 56. The groove 64 is curved and extends substantially parallel to the curved side edge 62.

Three oblong hinge pin slots 68, 70, 72 extend completely through the backing plate 56. The hinge pins 48 extend through and are slidable within the hinge pin slots 68, 70, 72. Preferably, the hinge pins 48 are surrounded by tubular rollers 49 which reduce friction between the pins 48 and the backing plate 56. To secure the sprocket segment 28 to the backing plate 56, washers 74 are secured to the ends of the hinge pins 48 which extend through the back side 66 of the backing plate 56.

Additionally, a total of four guide pin slots 76 are provided in the backing plate 56. The guide pin slots 76 are narrower than the hinge pin slots 68, 70, 72 and are interspersed between the hinge pin slots 68, 70, 72 so that each hinge pin slot 68, 70, 72 is surrounded on either side by a guide pin slot 76. The guide pins 54 on the sprocket segment 28 extend into and are slidable within the guide pin slots 76.

The curvature of the guide pin slots 68, 70, 72 and the hinge pin slots 76 is chosen so that as the sprocket segment 28 slides along the backing plate 56, the radius of curvature of the sprocket segment 28 varies. However, the sprocket segment 28 always forms a truly circular arc about the same center point regardless of its position relative to the backing plate 56. By curving the guide pin slots 76 and the outer hinge pin slots 68, 72 as circular arcs of a large radius, the sprocket segment 28 can maintain a truly circular arc over the range of sprocket segment 28 radii permissible by sliding along the backing plate 56.

As is described more fully below, the sprocket segment 28 can be held stationary relative to the backing plate 56 at a number of discrete locations corresponding to desired sprocket radii. Each of these positions is referred to as a "gear," due to the different gear ratios or degree of mechanical advantages between the front sprocket 20 and the sprocket assembly 16.

As seen in FIGS. 7 and 17-21, the backing plate 56 is slidably mounted on an annular sprocket housing 78, along with two identical backing plates 56a and 56b. On each backing plate 56, 56a, 56b, an identical sprocket segment 28, 28a, 28b is mounted, respectively. The sprocket housing 78 is substantially planar and has a circular central bore 80 and three equally-spaced cutout portions 82 between the bore 80 and a peripheral lip 84 the sprocket housing 78. The peripheral lip 84 on the sprocket housing defines a radially inwardly facing channel 86. The outer edges 58 of the backing plates 56 are slidable within the channel 86.

Referring to FIG. 7, a sprocket hub 88 extends through the central bore 80. The hub 88 is rotatable about a central axis 90, but is fixed relative to the sprocket housing 78 by means of pins 92 which extend through holes 94 in the sprocket housing surrounding the central bore 80. The radially inner edges 60 of the backing plates 56 slidably rest on the hub 88. As a result, the backing plates 56 cannot be displaced radially relative to the sprocket housing 78, but are capable of angular displacement or rotation about the central axis 90.

The angular displacement of the backing plates 56 in the drive direction 26 is limited by a polar locator 96. The polar locator 96 is pivotably joined to the locator plate 52 on the right outer sprocket subsegment 36 by means of a pin 98, and is slidable relative to the backing plate 56 along with the entire sprocket segment 28. The polar locator 96 has a concavely curved radial edge 100 which abuts against the side edge 62 of the backing plate 56. An arm 102 extends outwardly from the polar locator radial edge 100 and terminates in a lip 104 which faces inwardly and mates with the groove 64 in the backside 66 of the backing plate 56, so as to guide the motion of the polar locator 96 relative to the backing plate 56.

A substantially planar pin engagement surface 106 on one end of the polar locator 96 abuts against one of several locator pins 108 protruding from the sprocket housing 78. The locator pins 108 are positioned adjacent one side of each cutout 82. A planar contact surface 110 on each of the locator pins 108 mates with the polar locator surface 106 so as to prevent further angular displacement of the backing plates 56 in the drive direction 26. A number of locator pins 108 are provided in varying angular and radial positions so that for each radial position of the sprocket segments 28 corresponding to a "gear," the polar locator 96 will be in contact with a different locator pin 108. A depression 112 is provided on the backside of the polar locator 96 so that the polar locator 96 can overlap and avoid contact with adjacent locator pins 108 not corresponding to the desired "gear."

The backing plate 56 is biased in the drive direction 26 by means of a spring 114 so that the polar locator 96 is normally in engagement with the locator pins 108. The spring 114 is fixed at one end to a pin 116 on the sprocket housing 78 and at another end engages the side edge 62 of the backing plate 56. Any displacement of the backing plate 56 in a direction opposite the drive direction 26 is limited by a stop member 118 which protrudes from the sprocket housing 78 adjacent each cutout, and engages the side edge 62 of the backing plate 56 so as to prevent further angular displacement of the backing plate 56 in a direction opposite the drive direction 26, as is best shown in FIG. 25.

As illustrated in FIGS. 20 and 21, the three backing plates 56, 56a, 56b are mounted on the sprocket housing 78 so as to overlap each of the three cutout portions 82 on the sprocket housing 78. Correspondingly, springs 114, stop members 118 and locator pins 108 are positioned proximate each cutout, so that each backing plate 56, 56a, 56b and the sprocket segments 28, 28a, 28b mounted thereon are movable independently of each other. The sprocket segments 28, 28a, 28b do not form a continuous periphery due to gaps or spaces between each of the segments 28, 28a, 28b.

The sprocket housing 78 shown in FIGS. 20 and 21 is one of two sprocket housings 78, 78a on the sprocket assembly 16. As is shown in FIG. 7, a second or "outboard" sprocket housing 78a is oriented in a plane substantially parallel to the plane of the "inboard" sprocket housing 78, shown in FIG. 20. As used herein, the term "inboard" refers to the side of the sprocket assembly 16 adjacent to the rear wheel 14, and "outboard" refers to the side of the sprocket assembly 16 facing outwardly, or away from the rear wheel 14.

The outboard sprocket housing 78a is fixed to the sprocket hub 88 in the same manner as the inboard sprocket housing 78 and thus the sprocket housings 78, 78a are stationary relative to each other. With the exception of the exact positioning of the locator pins 108, the outboard sprocket housing 78a is the mirror image of the inboard sprocket housing 78. The outboard sprocket housing 78a has three sprocket segments 28c mounted thereon. The outboard sprocket housing 78a is secured to the sprocket hub 88 at an angular orientation such that the cutouts 82 on the outboard sprocket housing 78a are staggered 60° relative to the cutouts 82 on the inboard sprocket housing 78. As a result, the sprocket segments 28c of the outboard sprocket housing 78a are positioned to fill in the gaps between sprocket segments 28, 28a, 28b of the inboard sprocket housing 78. The combined peripheries of the outboard housing sprocket segments 28c and the inboard housing sprocket segments 28, 28a, 28b therefore form a continuous periphery. Preferably, the periphery of the sprocket segments 28, 28a, 28b, 28c is circular in shape.

By sliding the sprocket segments 28 radially inwardly relative to the backing plates 56, the diameter of the sprocket assembly 16 is reduced, thereby "changing gears" or varying the mechanical advantage applied to the sprocket assembly 16 by the chain 18. As the diameter of the sprocket assembly 16 is reduced, the total number of teeth 38 on the sprocket assembly 16 must also be reduced, since the continuous periphery of the reduced diameter sprocket assembly 16 is correspondingly less.

The required reduction in the number of teeth 38 is achieved by permitting overlap of the inboard housing sprocket segments 28, 28a, 28b with the outboard housing sprocket segments 28c, as in FIGS. 13 and 14, where one of the three outboard housing sprocket segments 28c is shown in broken lines. The teeth 38 on each sprocket segment 28 are approximately one-half the width of a standard-size sprocket tooth, and thus the overlapping teeth 38 combine to effectively form a single, standard-width tooth 38a. The sprocket segments 28 each have planar front surfaces 120 which abut each other during overlap. Although FIGS. 13 and 14 only show the overlap of a single tooth 38 on each sprocket segment 28, 28c, it is to be understood that the total number of overlapping teeth 38 may be greater in order to permit the overall diameter of the sprocket assembly 16 to be further reduced.

To ensure that the sprocket segments 28 overlap the precise degree required for pairs of teeth 38 to be properly aligned and form a single tooth 38a, the backing plates 56 are displaced angularly and maintained in the proper angular position by the polar locator 96 and the locator pins 108. As mentioned above, for each "gear" or sprocket assembly diameter, a different locator pin 108 is provided at a radial position corresponding to the radial position of the sprocket segment 28 for that particular gear. Additionally, the angular displacement of each backing plate 56 varies for each gear, as is necessary to achieve the proper overlapping of teeth 38 on adjacent sprocket segments 28. Further, for a given gear or radial position of the sprocket segments 28, each of the six backing plates 56 located on both the inboard and outboard housings 78, 78a will have its own particular degree of angular displacement.

This is illustrated in FIG. 20, which shows the inboard sprocket housing 78 with the sprocket segments 28 positioned in their most radially outward position to form the largest diameter sprocket possible, which corresponds to "first gear." In this position, each backing plate 56 is centered relative to the cutouts 82, such that the centers of the backing plates 56, 56a, 56b are exactly 120° apart.

FIG. 21 illustrates the inboard housing 78 with the sprocket segments 28 displaced radially inwardly such that, due to overlap with the sprocket segments 28c of the outboard housing 78a, the total number of effective teeth 38 on the sprocket 16 are seven teeth less than that in first gear. Since the diameter of the sprocket assembly 16 can be varied in increments small enough so that the total number of teeth 38 on the sprocket assembly 16 is changed by only a single tooth, the sprocket segment position shown in FIG. 21 corresponds to the seventh incremental step from the first position shown in FIG. 20. Therefore, the position shown in FIG. 21 is referred to as "eighth gear," as one would add the seven incremental steps to the first gear.

When in eighth gear, the backing plates 56 are not oriented exactly 120° apart. The angular displacement A corresponds to a 3.53 degree displacement for the backing plate 56 from its position when in first gear. The angular displacement B corresponds to a 10.59 degree displacement from the backing plate 56a position in first gear, and the angular displacement C corresponds to a 3.53 degree displacement of the backing plate 56b from a position in first gear. Each of the three backing plates 56 has a different angular displacement due to the different angular position of the particular locator pin 108 which each backing plate 56 is positioned by when the sprocket assembly 16 is in eighth gear. Likewise, the locator pins 108 on the outboard housing 78a are different for each of the three backing plates 56 mounted on the outboard housing 78a.

In the preferred embodiment, the angular offset of each sprocket segment 28 from its centered position (120° apart from the other sprocket segments 28 on the same sprocket housing, 78, 78a) is listed in the table below, for each of the gear positions of the sprocket assembly 16. Also listed in the table are the number of total effective teeth 38 on the sprocket assembly 16 for each gear position. In the table, sprocket segments Nos. 1, 3 and 5 are those sprocket segments located on the inboard housing 78, and sprocket segments Nos. 2, 4 and 6 are those sprocket segments located on the outboard housing 78a. A positive value for the number of degrees of offset indicates that the sprocket segment 28 is rotated in the drive direction 26 relative to the center position, whereas a negative offset indicates that the rotation is counter to the drive direction 26.

| SPROCKET SEGMENT OFFSET | | |
| --- | --- | --- |
| Gear No. | OFFSET IN DEGREES (Drive Direction Sprocket 26 Positive) | Segment No. |
| Gear: 11 | 0 | 1 |
| No. of Teeth: 14 | −8.57 | 2 |
| | +8.57 | 3 |
| | 0 | 4 |
| | −8.57 | 5 |
| | +8.57 | 6 |
| Gear: 10 | +6.00 | 6 |
| No. of Teeth: 15 | −6.00 | 1 |
| | +6.00 | 2 |
| | −6.00 | 3 |
| | +6.00 | 4 |
| | −6.00 | 5 |
| Gear: 9 | 0 | 5 |
| No. of Teeth: 16 | +7.50 | 6 |
| | −7.50 | 1 |
| | 0 | 2 |
| | +7.50 | 3 |
| | −7.50 | 4 |
| Gear: 8 | 0 | 6 |
| No. of Teeth: 17 | +3.53 | 1 |
| | +7.06 | 2 |
| | +10.59 | 3 |
| | −7.06 | 4 |
| | −3.53 | 5 |
| Gear: 7 | 0 | 3 |
| No. of Teeth: 18 | 0 | 4 |
| | 0 | 5 |
| | 0 | 6 |
| | 0 | 1 |
| | 0 | 2 |
| Gear: 6 | 0 | 6 |
| No. of Teeth: 19 | −3.16 | 1 |
| | −6.32 | 2 |
| | +9.47 | 3 |
| | +6.32 | 4 |
| | +3.16 | 5 |
| Gear: 5 | 0 | 1 |
| No. of Teeth: 20 | −6.00 | 2 |
| | +6.00 | 3 |
| | 0 | 4 |
| | −6.00 | 5 |
| | +6.00 | 6 |
| Gear: 4 | +4.28 | 6 |
| No. of Teeth: 21 | −4.28 | 1 |
| | +4.28 | 2 |
| | −4.28 | 3 |
| | +4.28 | 4 |

-continued

SPROCKET SEGMENT OFFSET

| Gear No. | OFFSET IN DEGREES (Drive Direction Sprocket 26 Positive) | Segment No. |
|---|---|---|
| | −4.28 | 5 |
| Gear: 3 | 0 | 5 |
| No. of Teeth: 22 | +5.45 | 6 |
| | −5.45 | 1 |
| | 0 | 2 |
| | +5.45 | 3 |
| | −5.45 | 4 |
| Gear: 2 | 0 | 4 |
| No. of Teeth: 23 | +2.61 | 5 |
| | +5.22 | 6 |
| | +7.83 | 1 |
| | −5.22 | 2 |
| | −2.61 | 3 |
| Gear: 1 | 0 | 3 |
| No. of Teeth: 24 | 0 | 4 |
| | 0 | 5 |
| | 0 | 6 |
| | 0 | 1 |
| | 0 | 2 |

To secure the sprocket segments 28 at the desired radial position corresponding to each gear, a shift lock mechanism 122 is provided with each sprocket segment 28. As is best shown in FIGS. 4, 17 and 19, the shift lock mechanism 122 is comprised of a pair of racks 124 which are secured to the backside 66 of each backing plate 56. The racks 124 are generally elongate and planar, and are oriented substantially parallel to the central hinge pin slot 70 in the backing plate 56. The two racks 124 on each backing plate 56 are oriented substantially parallel to each other, and are positioned on either side of the central hinge pin slot 70. On the edges of the racks 124 which face toward each other, a plurality of small teeth 126 are provided The teeth 126 are designed to mate with a latch member 128 which is pivotably secured to the hinge pin 48 which extends through the central hinge pin slot 70. The latch member 128 has an overall S-shape, formed by a pair of catch members 130 protruding outwardly from opposite sides of either end of the latch member 128. The catches 130 are designed to mate with the teeth 126 in the racks 124. Since the catch members 130 are positioned on opposite sides of the latch 128, both catches 130 can be simultaneously engaged with the teeth 126 on both racks 124. When the catches 130 are so engaged with the racks 124, the sprocket segments 28 are held in a stationary radial position.

The latch member 128 is biased into an engaged position with the racks 124 by means of a shift lock spring 132. The shift lock spring 132 has a body portion 134 which is mounted on the latch member 128 and a pair of arms 136 which extend outwardly from the body portion 134. The arms 136 engage the inwardly facing edges of the racks 124 so as to force the catch members 130 into the teeth 126 on the racks 124. The body portion 134 of the spring 132 is secured to the latch member 128 through a central hole 138 which aligns with a central hole 140 in the latch member 128, through which the hinge pin 48 extends.

The spring 132 is also secured to the latch member 128 through an elongated opening 142 which passes through a raised portion 144 of the spring 132. A pilot pin 146 extends through the elongated hole 142 in the spring 132, and also through an aligned hole in the latch member 128. The pilot pin 146 is slidable through the hole in the latch member 128, but is maintained captive on the latch member 128 by means of an enlarged head 148 on one end of the pin 146 and a shoulder 150 on the other end. Both the head 148 of the pilot pin 146 and the shoulder 150 of the pilot pin 146 are larger in diameter than the hole through which the pilot pin 146 is slidable. Likewise, the pilot pin head 148 is larger than the elongated hole 142 in the spring 132, and thus retains the spring 132 on the latch member 130.

The bent or raised portion 144 of the spring 132 biases the pilot pin 146 in a direction away from the back side 66 of the backing plate 56, so that the shoulder portion 150 of the pilot pin 146 is normally abutting against the latch member 128.

Since the pilot pin 146 extends through the latch member 128 at a point spaced from the center of the latch member 128, and since the latch member 128 is pivotable about its center, applying a force to the pilot pin 146 in a direction opposite the drive direction 26 will cause the latch member 128 to rotate about its center. Consequently, the latch member 128 will become disengaged from the teeth 126 on the racks 124, permitting radial motion of the latch member 128 relative to the backing plate 56. Since the latch member 128 is directly secured to the sprocket segments 28 which are on the other side of the backing plates 56, when the latch member 128 is permitted to move radially, the sprocket segments 28 will also be permitted to move radially Likewise, when the catches 130 of the latch member 128 are in engagement with the racks 124, radial motion of the latch member 128 and the sprocket segments 28 is prevented.

The teeth 126 on the racks 124 are designed so that each tooth 126 corresponds to one of the gears of the sprocket assembly 16. Thus, moving the latch member 128 radially so as to displace the catch members 130 by a single tooth 126 along the rack 124 results in the changing of gears by an increment of a single discrete gear ratio.

Figure 9:
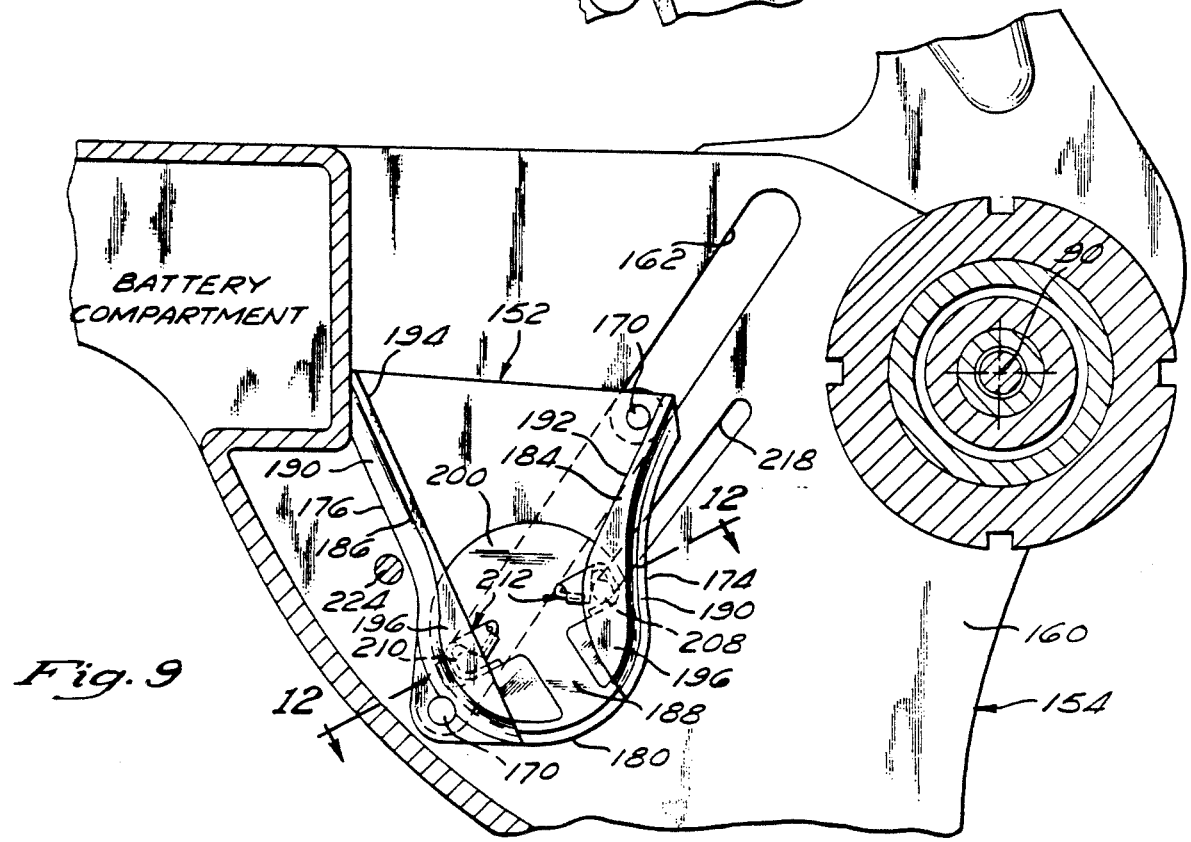
FIG. 9 is a cross-sectional side elevation of the sprocket assembly shown in FIG. 7, as taken along line 9—9, illustrating the inboard side of the shifter housing and the shift actuator.

In order to disengage the latch members 128 and permit radial motion of the sprocket segments 28, and therefore gear shifting, a shift actuator 152 is provided to contact the pilot pin 146 as is needed to disengage the latch members 128. The shift actuator 152 is best shown in FIGS. 9, 11 and 12. The shift actuator 152 has a generally U-shaped outline and is mounted to a shifter housing 154, which is best illustrated in FIG. 3. The shifter housing 154 is mounted on the bicycle frame 156 and has two substantially planar side walls 158 and 160, which are parallel to each other and which surround the inboard and outboard sides of the sprocket assembly 16, respectively.

Two shift actuators 152, 152a, outboard and inboard, are provided, one secured to each side wall 160, 158, respectively. An elongate shift actuator slot 162 is provided in each side wall 160, 158. The shift actuator 152, 152a is mounted on the interior side of the side walls 160, 158, or the sides which face toward the sprocket assembly 16. On the opposite or exterior side of each side wall 160, 158 a shifter rack 164 is provided. The shifter racks 164 are generally elongate and has a plurality of teeth 166 along one side edge. The shifter rack 164 is pinned to the shift actuator 152 through holes 168 in the shifter rack 164 which align with holes 170, in the shift actuator 152. The holes 168, 170 are also aligned with the actuator slot 162. The shift actuator 152 and the shifter rack 164 are slidable relative to the shifter housing side wall 158, 160 along the actuator slot 162.

Simultaneous movement of the shift actuators 152, 152a is caused by rotation of a pinion gear 172 which engages the shifter racks 164, as discussed in greater detail below.

With reference to the axis of rotation 90 as the radial center point, the shift actuator 152 has a radially inner edge 174 which is generally S-shaped, and a radially outer edge 176 which likewise is S-shaped A linear upper edge 178 joins the upper ends of the radial edges 174, 176. An arcuate lower edge 180 joins the lower ends of the radial edges 174, 176 and surrounds a circular bore 182 which extends through the lower portion of the shift actuator 152. A raised inner shoulder 184 conforms to the radially inner edge 174 of the shift actuator 152. Likewise, a raised outer shoulder 186 wraps around the radially outer edge 176 of the actuator 152. The shoulders 184, 186 dO not extend across the upper edge 178, and are separated along a portion of the lower edge 180 of the actuator so as to create a gap 188. The shoulders 184, 186 each include a beveled surface 190 which slopes downwardly and outwardly, toward the respective radial edges 174, 176 of the actuator 152. The inwardly facing sides of the shoulders 184, 186 are defined by planar contact surfaces 192, 194 which extend normally from the actuator 152. The contact surface 194 on the outer shoulder 186 is substantially linear, while the inner contact surface 192 is convexly curved. The sections of the shoulders 184, 186 which overlay the bore 182 are countersunk so as to define planar shelves 196 which cover small depressions or pockets 198.

A circular base plate 200 having a diameter proximate to that of the bore 182 is inserted within the bore 182. The base plate 200 abuts against the shoulders 184, 186 and is rotatable relative the actuator 152. A pair of triangular, wedge-shaped deflectors 202, 204 protrude upwardly from the base plate 200 and nest within the pockets 198 in the actuator 152. Both of the deflectors 202, 204 have surfaces 205 that slope downwardly toward the periphery of the base plate 200 from a high point at their apexes. The space between the deflectors 202, 204 defines a channel 206 which is aligned with the gap 188 between the shoulders 184, 186. A pair of cylindrical spring pins 208, 210 extend from the base plate 200 from points just above the deflectors 202, 204. One of the spring pins 208 is elongated and extends completely through the base plate 200 and protrudes from the rear side thereof. Mounted on each of the spring pins 208, 210 is a contact spring 212 which includes a leg 214 that extends between the deflectors 202, 204 and spring pins 208, 210. A V-shaped section of each spring 212 extends inwardly, terminating at a contact point 216.

As is best shown in FIG. 9, the elongated spring pin 208 extends through an elongate spring pin slot 218 on the shifter housing 154. The spring pin slot 218 is slightly arcuate, having a large radius of curvature. The spring pin slot 218 is also skewed relative to the actuator slot 162 so that the slots 162, 218 diverge as they extend upwardly and in a generally radially inward direction. Thus, as the shift actuator 152 and the backing plate 200 slide radially inwardly, the backing plate 200 will rotate in a clockwise direction relative to the actuator 152 due to the fact that the spring pin 208 is captured within the spring pin slot 218.

FIGS. 22 and 24 best illustrate the outboard shift actuator 152 and base plate 200 in operation. FIG. 22 shows the outboard shift actuator 152 in a stationary position, just after it has been moved in a radially inward direction. As the sprocket assembly 16 rotates, the pilot pins 146 on the outboard sprocket housing 78a will consecutively engage the contact surface 194 on the radially outer shoulder 186 of the shift actuator 152. The engagement between the pilot pin 146 and the contact surface 194 initially causes angular displacement of the entire backing plate 56 on which the pilot pin 146 is secured, as shown in FIG. 25. The displacement of the backing plate 56 is terminated upon contact of the backing plate 56 with the stop pin 118. At this time, the engagement between the pilot pin 146 and the contact surface 194 causes deflection of the arms 136 on the shift lock spring 132 and rotation of the latch member 128 about the hinge pin 48. This sequence of movement described is due to the greater stiffness of the shift lock spring 132 as compared to the backing plate spring 114. Rotation of the latch member 128 disengages the catch members 130 from the catch racks 124 (FIG. 19), permitting radial displacement of the sprocket segments 28 relative to the backing plate 56, as illustrated in FIG. 26.

Continued rotation of the sprocket assembly 16 brings the pilot pin 146 into engagement with the contact spring 212, as is shown in FIG. 23. The contact spring 212 will deflect until it contacts the deflector 204. The deflection of the contact spring 212 guides the pilot pin 146 so as to be displaced radially inwardly a small distance beyond that which would occur if the contact point 216 on the spring 212 were to remain in its undeflected position. Thus, in subsequent revolutions of the sprocket assembly 16, the pilot pin 146 will not engage the undeflected contact spring 212 or the contact surface 194, as long as the shift actuator 152 remains stationary.

FIG. 24 shows the pilot pin 146 after further rotation and disengagement of the pilot pin 146 from the contact spring 212. At this point, the latch member 128 is biased back into engagement with the rack 124 by the shift lock spring 132, and the backing plate 56 is biased by the spring 114 to return to an angular position in which the polar locator 96 is in contact with the locator pin 108, as shown in FIG. 27. The pilot pin 146 then passes through the channel 206, avoiding further contact with the shift actuator 152.

The shifting sequence described above is repeated for each of the three sprocket segments 28c on the outboard housing 78a. Since, as discussed below, both shift actuators 152, 152a move simultaneously, the sprocket segments 28 on the inboard sprocket housing 78 will simultaneously be moved to the same radial position or gear setting as the outboard sprocket segments 28c. Thus, a gear shift will be completed after one full revolution of the sprocket assembly 16 during which each of the six pilot pins 146 on the sprocket assembly 16 will be engaged by the shift actuators 152, 152a. As a result, gear shifts need not take place incrementally, i.e., the shift actuator 152 may be moved to a position which causes a change in the diameter of the sprocket assembly 16 such that shifting across multiple gear ratios may take place even though only a single movement of the shift actuator 152 has occurred.

When the shift actuator 152 is moved in a radially inward direction, the diameter of the sprocket assembly 16 will be reduced, or there will be a shift to a higher gear. Conversely, displacement of the shift actuator 152 in a radially outward direction will cause shifting to a lower gear by increasing the diameter of the sprocket assembly 16. Although not shown, shifting to a lower gear is caused by engagement of the pilot pins 146 with the radially inner contact surface 192 and with the inner contact spring 212, in a similar sequence to that discussed above with FIGS. 22–25.

The rotation of the base plate 200 as the shift actuator 152 is moved along the slots 162, 218 is necessary to maintain both of the spring pins 208, 210 oriented so that both spring pins 208, 210 and the central axis 90 are collinear. Thus, movement of the shift actuator 152 along the actuator slot 162, which is not in a truly radial direction, still permits the contact springs 212 to be deflected in a manner which radially displaces the pilot pins 146 further than would occur if the contact points 216 on the contact springs 212 were stationary. Thus, regardless of the position of the shift actuator 152, the pilot pins 146 will always be moved to a position in which, after shifting is completed, the pilot pins 146 will not engage the shift actuator 152 or the undeflected contact springs 212 on subsequent revolutions.

Since the actual displacement of the sprocket segments occurs while the shift actuator 152 is stationary, the force required to move the actuator 152 is small. The energy required to move the sprocket segments 28 by contact between the pilot pins 146 and the shift actuator 152 is derived from the energy supplied to the sprocket assembly 16 by the chain 18. This energy is in turn provided by the rider's legs, and is negligible in comparison to the total force applied to the sprocket assembly 16 by the chain 18.

Figure 8:
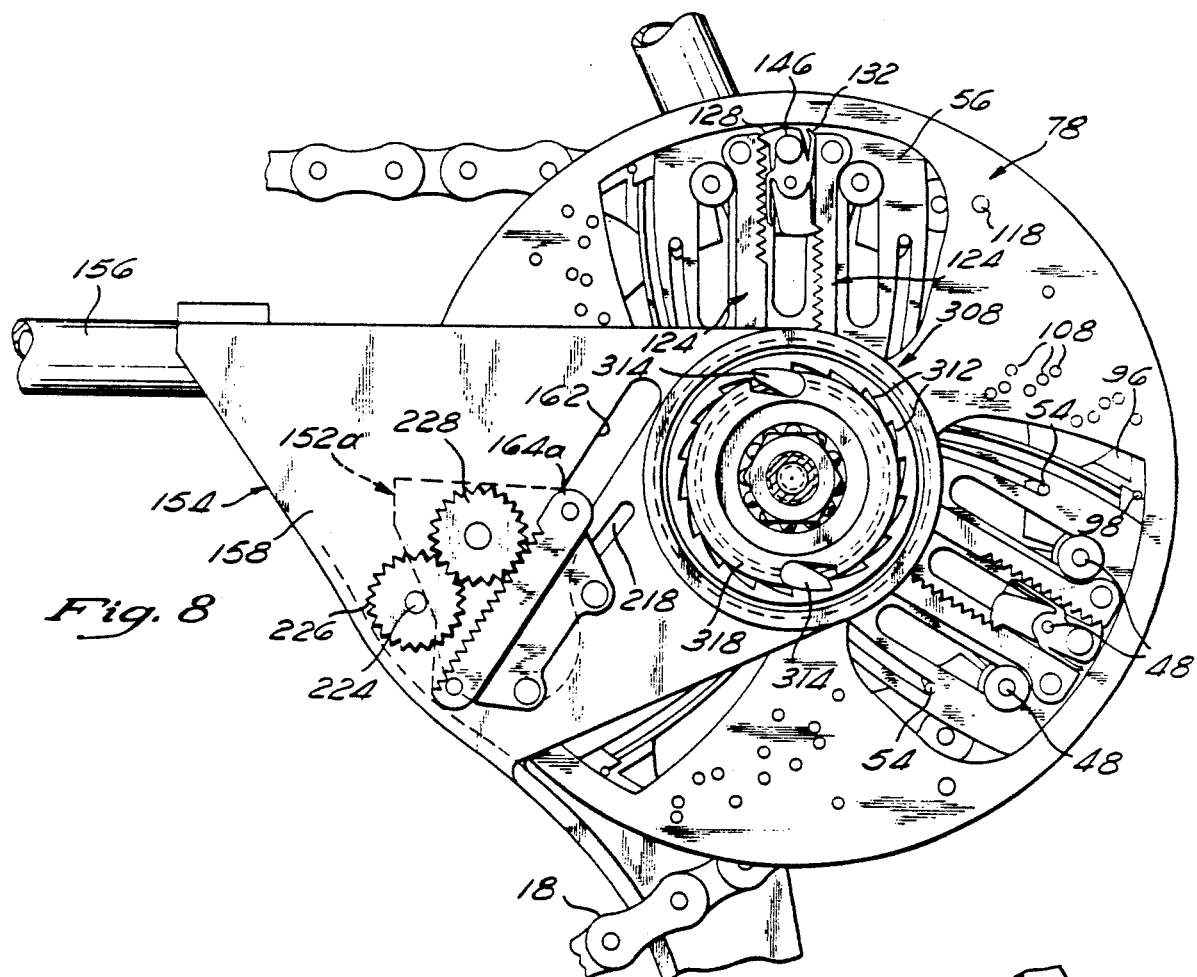
FIG. 8 is a cross-sectional side elevation of the inboard side of the present sprocket assembly, as taken along line 8—8 in FIG. 7.

Moreover, as is best seen in FIG. 8, the chain 18 wraps around less than 180° of the sprocket assembly 16. The shift actuators 152, 152a are oriented alongside the sprocket assembly 16 at a point on the circumference of the sprocket assembly 16 which never is in engagement with the chain 18. As a result, gear shifting can be conducted while high loads are applied to the sprocket assembly 16, or even when pedaling from a complete stop, without adversely affecting the function of the sprocket assembly 16 or its gear shifting.

The beveled surfaces 190 on the shoulders 184, 186 and the deflectors 202, 204 are designed to permit backpedaling, or rotation of the sprocket assembly 16 in a direction opposite to the drive direction 26. After the completion of a gear shift, all of the pilot pins 146 are radially positioned so that during regular pedaling and even during backpedaling, the pilot pins 146 would pass through the channel 206 in the base plate 200 without interference. However, in the event that a gear shift is not completed, i.e., some but not all of the pilot pins 146 have been moved to a position at which the pilot pins 146 would pass through the channel 206, upon backpedaling, the pilot pins 206 which had not yet been repositioned would engage either the deflectors 202, 204 or the shoulders 184, 186.

However, the pilot pins 146 are capable of axial displacement upon deflection of the raised portion 144 of the shift lock spring 132, and contact between the pilot pins 146 and the sloped surfaces 190, 205 of the deflectors 202, 204 or the shoulders 184, 186 will cause such axial displacement. As a result, the pilot pins 146 will pass over the shift actuator 152 smoothly, without interfering with the backpedaling motion.

Turning now to FIGS. 3–6, a transmission 220 which causes movement of the shift actuators 152, 152a is illustrated. As discussed above, a pinion gear 172 is rotatably mounted on the outboard side wall 160 of the shifter housing 154 and meshes with the shifter rack 164 so that rotation of the pinion gear 172 causes linear motion of the rack 164 and the outboard shift actuator 152, which is fixed to the rack 164. The pinion gear 172 also drives an outboard transfer gear 222 which is mounted on a transfer shaft 224 that extends through both side walls 160, 158 of the shifter housing 154, and terminates at an inboard transfer gear 226 which is flush against the inboard side wall 158. The inboard transfer gear 226 drives an adjacent inboard pinion gear 228 which in turn meshes with an inboard shifter rack 164a, as seen in FIG. 8. Consequently, rotation of the pinion gear 172 causes simultaneous motion of both shift actuators 152, 152a.

The pinion gear 172 is flush against the side wall 160 and is mounted on a pinion hub 230, which extends normal to the plane of the outboard side wall 160. An outer gear 232 is mounted on the free end of the pinion hub 230 so that the driving forces applied to the outer gear 232 are transmitted through the pinion hub 230 through the pinion gear 172. Preferably, a driving force can be applied in one of two ways to the outer gear 232: (1) by means of a worm gear 234, or (2) by means of a manual control gear 236.

FIGS. 3, 4 and 6 illustrate the transmission 220 with the outer gear 232 being driven by the worm gear 234, which in turn is rotated by an electric motor 238. The motor 238 is fixed on a mounting plate 240 which has a generally triangular outline and is pivotably secured to the outboard side wall 160 of the shifter housing 154 through a hole 242 on an upper apex of the mounting plate 240. The mounting plate 240 is prevented from rotation by a lever 244 which is pivotably secured to the outboard side wall 160, and has a raised portion 246 which protrudes through an opening 248 in the mounting plate 240. The opening 248 has a curved cam surface which forms two lobes 250, 252 in the opening 248. When the raised portion 246 of the lever 244 engages the lower lobe 250, the worm gear 234 engages the outer gear 232. By rotating the lever 244, pivotal movement of the mounting plate 240 is caused, until the upper lobe 252 is engaged by the lever 244. The resulting movement of the mounting plate 240 disengages the worm gear 234 and brings the manual control gear 236 into engagement with the outer gear 232.

As is best seen in FIG. 6, the manual control gear 236 is formed on the periphery of a tubular take-up reel 254 around which a cable 256 is wrapped. The take-up reel 254 is rotatable about a shaft 258 which extends through the take-up reel 254 and is fixed to the mounting plate 240. A coiled return spring 260 wraps around the shaft 258 and terminates at an arm 262 which is engaged in a slot 264 in the take-up reel 254. The return spring 260 thus biases the take-up reel 254 to rotate in a clockwise direction, which causes the cable 256 to be wound around the take-up reel 254. This also applies a tension to the cable 256 which additionally acts to bias the mounting plate 240 to rotate in a counter clockwise direction, causing a positive engagement between the raised portion 246 of the lever 244 and the lobes 250, 252 of the opening 248.

By moving the lever 244, the rider can optionally switch between a manual transmission mode in which the manual control gear 236 provides the force to move the shift actuator 152 and change gears, and an automatic transmission mode in which the gear shifting is initiated by rotation of the worm gear 234 through action of the electric motor 238. The operation of the electric motor 238 is controlled by a control circuit shown in FIG. 10. The operations of the control circuit to provide automatic shifting of the gear ratio in response to changes in road conditions will be set forth in more detail below.

Figure 2:
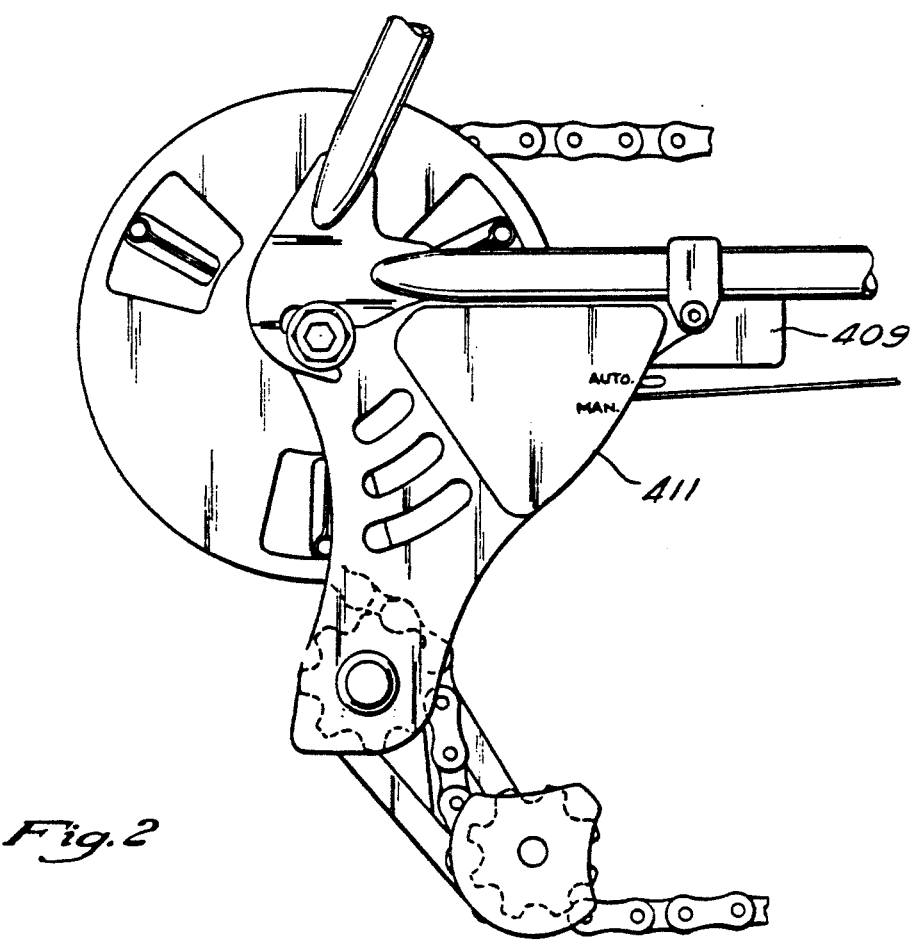
FIG. 2 is a side elevation of the sprocket assembly shown in FIG. 1, as viewed from the outboard side, with all dust covers in place.

When in the manual transmission mode, gear shifting is initiated by displacement of the cable 256 by means of a shifter lever 266, shown in FIGS. 2 and 28. The shift lever 266 extends through a housing 268 which is fixed to the bicycle frame 156. Within the housing 268, a stationary support shaft 270 is provided. The support shaft 270 is surrounded by an annular shift pulley 272 which is secured to the shift level 266. The pulley 272 is rotatable about the shaft 270.

A portion of the periphery of the shift pulley 272 has an arcuate channel 274 therein. The channel 274 communicates with a circular recess 276, in which a cylindrical plug 278 is retained. The plug 278 is secured to one end of the cable 256. The cable 256 rests within the channel 274 and wraps around the periphery of the pulley 272.

A portion of the periphery of the shift pulley 272 has a plurality of grooves 280 formed therein. A gear selector pin 282 extends through the housing 268 and is biased into engagement with the grooves 280 by means of a leaf spring 284.

In order to shift gears, the shift lever 266 is manually rotated, causing rotation of the shift pulley 272 and displacement of the cable 256. Due to the engagement between the gear selector pin 282 and the grooves 280, the shift pulley 272 rotates in discrete angular increments, each corresponding to the degree of cable displacement 256 necessary in order to ultimately effect movement of the shift actuator 152 to the extent necessary to shift a single gear.

Another aspect of the invention is the manner in which the rear wheel 14 and the sprocket assembly 16 are rotatably mounted on the bicycle frame 156. Referring to FIG. 7, the sprocket hub 88 has an inner portion 286 which forms an outer bearing race for ball bearings 288. An inner bearing race 290 is fixed to a stationary tubular sprocket axle 292, which extends through the inner portion 288. The sprocket hub 88 thus is rotatable about the sprocket axle 292 with a minimum of friction. The sprocket axle 292 is externally threaded at both ends. The outboard end of the sprocket axle 292 extends through the sprocket housing 154 and is attached to the bicycle frame 156 by means of axle nuts 294.

Similarly, the rear wheel 14 has a wheel hub 296 which is rotatable about a tubular wheel axle 298. One end of the wheel axle 298 abuts against the sprocket axle 292. The other end of the wheel axle 298 engages a tubular spacer 300 which extends between the wheel axle 298 and the bicycle frame 156. The wheel axle 298 and the sprocket axle 292 are coaxial about the central axis 90. Ball bearings 302 are provided between the wheel axle 298 and the wheel hub 296 to minimize friction.

An elongated axle bolt 304 extends completely through the sprocket axle 292 and the wheel axle 298 and is fastened to the bicycle frame by a nut 306, thus forming an inner axle member which supports both the wheel axle 298 and the sprocket axle 292.

Referring also to FIG. 8, rotational force is transmitted from the sprocket hub 88 to the wheel hub 296 by means of a clutch assembly 308. The clutch 308 is formed by a circular ratchet member 310 on the wheel hub 296 having a plurality of radially inwardly facing ratchet teeth 312. A pair of dogs 314 is mounted on an annular shoulder 316 which protrudes from the sprocket hub inner section 286 and rests within the ratchet member 310. The dogs 314 are biased radially outwardly by a circumferential wire spring 318 which surrounds the shoulder 316. As illustrated in FIG. 8, the dogs 314 engage the ratchet teeth 312 so that upon rotation of the sprocket hub 88 and dogs 314 in the drive direction 26, the ratchet member 310 and wheel hub 296 will be caused to rotate therewith. Due to the orientation of teeth 312, the sprocket hub 88 is capable of rotation relative to the wheel hub 296 in a direction opposite the drive direction 26, thus permitting backpedaling.

The ratchet member 310 and the dogs 314 are disengaged by relative movement in an axial direction parallel to the central axis 90. Due to this feature, and the separate wheel axle 298 and sprocket axle 292, the rear wheel 14 can be removed from the bicycle 10 for repair or replacement while maintaining the sprocket assembly 16 secured in place on the bicycle frame 156. To remove the wheel 14, the nut 306 is unfastened and the axle bolt 304 is withdrawn from the wheel and sprocket axles 298, 292. The spacer 300 is then removed, permitting the wheel 14 to move parallel to the central axis 90 a distance sufficient to disengage the ratchet member 310 from the dogs 314 and shoulder 316 of the sprocket assembly hub 88. The wheel 14 is then free to be removed completely from the bicycle frame 156, while the sprocket assembly 14 remains intact, secured to the bicycle 10. This obviates the need to remove the chain 18 each time the rear wheel 16 is removed.

The above-described transmission 220 requires relatively little force to change gears as compared to a conventional derailleur transmission. Thus, it is particularly advantageous because the operation of the transmission 220 can be controlled by the electric motor 238 with relatively low power requirements.

As set forth above, the present invention advantageously includes the electric motor 238 that rotates the worm gear 234. The worm gear 234 is selectively engageable with the outer gear 232 so that rotation of the electric motor 238 moves the shift actuator 152 and thereby changes the gears. A control circuit 400 that automatically controls the rotation of the electric motor 238 is illustrated in FIGS. 10 and 29-35.

Figure 10:
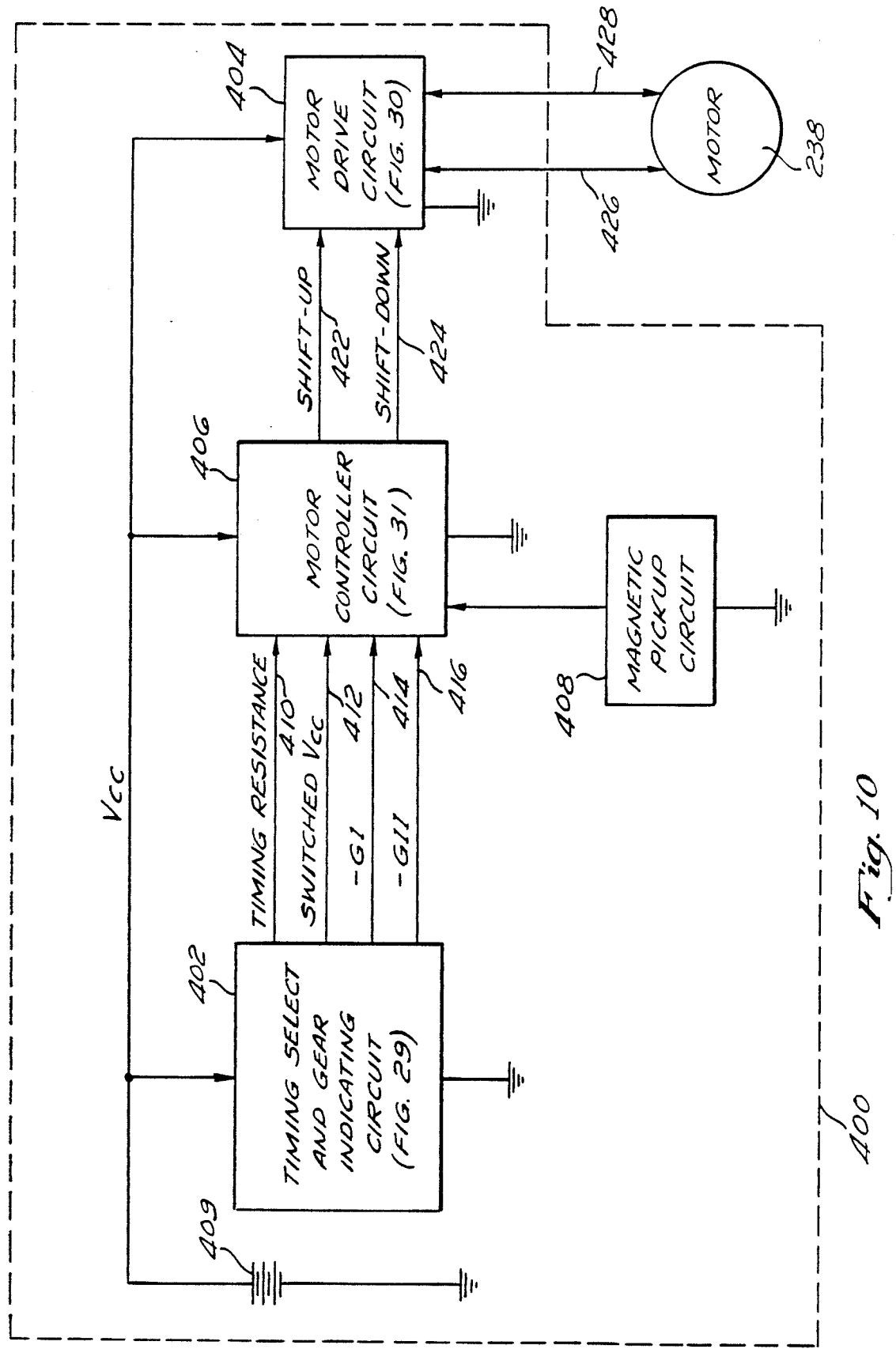
FIG. 10 is a block diagram of an automatic transmission control circuit in accordance with the present invention, showing the timing select and gear indicating circuit, the motor controller circuit, the motor drive circuit, the magnetic pickup circuit and the battery.
Figure 31:
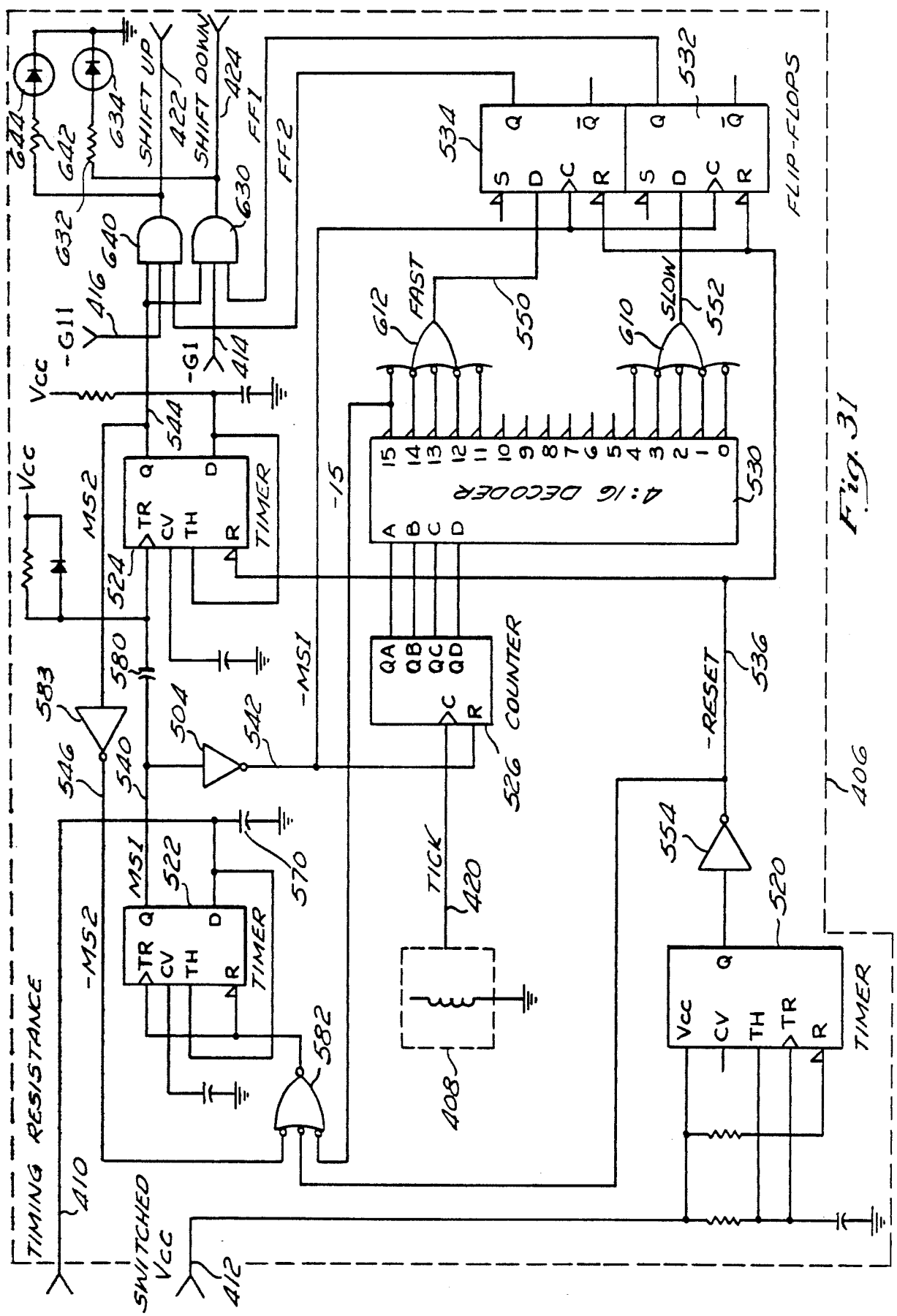
FIG. 31 is a detailed schematic diagram of the motor controller that receives pulses from the magnetic pickup circuit which indicates the wheel rotation rate and that receives the TIMING RESISTANCE from the timing select and gear-indicating circuit, and that generates the SHIFT-UP and SHIFT-DOWN signals to the motor drive circuit.

As illustrated in FIG. 10, the control circuit 400 comprises four circuits including: a timing select and gear indicating circuit 402, FIG. 29; a motor drive circuit 404, FIG. 30; and a motor controller circuit 406, FIG. 31; a magnetic pickup circuit 408, and a battery 409 (shown in phantom in FIG. 4). The electronics are enclosed in a dust shield 411 (FIG. 2).

The control circuit 400 automatically shifts gears depending on the wheel speed. The timing select and gear indicating circuit 402 provides input signals to the motor controller circuit 406 that include a TIMING RESISTANCE on a line 410, a SWITCHED Vcc signal on a line 412, a $-G1$ signal on a line 414 and a $-G11$ signal on a line 416. The TIMING RESISTANCE on the line 410 provides a variable resistance to the motor controller circuit 406 that is responsive to the currently selected gear of the transmission 220. The SWITCHED Vcc signal on a line 412 provides a supply voltage to the motor controller circuit 406 that is active when the transmission 220 is in gear and is inactive when the transmission is shifting between gears. The $-G1$ signal on a line 414 is an active low signal that indicates to the motor controller circuit 406 that the transmission 220 is in the lowest gear (i.e., gear one) and therefore, the motor controller 406 should not attempt to shift the transmission 220 any lower. Similarly, the −G11 signal on the line 416 is an active low signal that indicates to the motor controller 406 that the transmission 220 is in the highest gear (i.e., gear eleven). and that the motor controller 406 should not attempt to shift up. On a line 420, the motor controller 406 also receives an input signal from the magnetic pickup circuit 408 which is a conventional transducer circuit that provides a sequence of pulses that are spaced apart in time in accordance with the rotational velocity of the bicycle wheel. The pulses indicate the speed of the bicycle to the motor controller circuit 406.

The motor controller 406 outputs a SHIFT-UP signal on a line 422 and a SHIFT-DOWN signal on a line 424 to the motor drive circuit 404. An active SHIFT-UP signal on the line 422 causes the motor drive circuit 404 to apply power to the motor 238 in a first direction which causes the transmission to shift up. An active SHIFT-DOWN signal on the line 424 causes the motor drive circuit 404 to apply power to the motor 238 in a second direction to cause the transmission to shift down. In order to accomplish a shift-up or a shift-down, the motor drive circuit 404 is connected to the motor 238 via a first bidirectional motor power line 426 and a second bidirectional motor power line 428. To shift the gears up, one polarity is placed on the motor power lines 426, 428 of the motor 238 to cause current flow through the motor in a first direction; and, for a shift-down, the opposite polarity is placed on the motor power lines 426, 428 to cause current flow in the opposite direction.

The timing select and gear indicating circuit 402, shown in FIG. 29, comprises a set 429 of eleven switches 430-440, eleven resistors 445-455, eleven diodes 460-470 and eleven light-emitting diodes (LED's) 475-485, corresponding to each of the eleven gears of the transmission 220. Additional switches can be provided if the number of gears is increased. The set of switches 429 is also illustrated physically in FIG. 4 as an insulating block on which eleven switch contacts 430-440 are mounted. The switch contacts 430-440 are numbered in accordance with the corresponding switches 430-440 in FIG. 29. One switch, one resistor, one diode and one light-emitting diode are provided for each of the eleven gears. For example, the resistor 445, the switch 430, the diode 460, and the LED 475 are associated with the lowest gear, gear one. Similarly, the resistor 455, the switch 440, the diode 470, and the LED 485 are associated with the highest gear, gear eleven.

As illustrated in FIG. 29, each of the switches 430-440 in the set 429 is connected to power (Vcc) on a positive voltage bus 490. The voltage on the line 490 is advantageously provided by the battery 409. The bus 490 is illustrated in FIG. 4 as a length of copper conductor on the shifter rack 164. The electrical power from the battery 409 is provided to the bus 490 via a wiper contact 491 that is fixedly mounted to the set of switches 429. The electrical power on the bus 490 is conducted to a selected one of the switch contacts 430-440 by a moving contact 493 that moves along with the shifter rack 164 and thus moves from switch contact to switch contact as the transmission 220 shifts gears. Of the eleven switches 430-440, only one can be closed at any one time in accordance with the current position of the moving contact 493. Thus, although illustrated as eleven separate switches in FIG. 29, it should be understood that the set of switches 429 physically comprises one eleven-position switch in the described embodiment. The switch corresponding to a particular gear will be closed to indicate when the transmission is in that gear. The switch contacts 430-440 (FIG. 4) are spaced apart so that the moving contact 493 disengages from one switch contact before engaging the next switch contact. Thus, all of the switches 430-440 will be open when the transmission 220 is shifting between gears.

For gear one, the contact 430 (i.e., the switch 430) is connected to the power bus 490 by moving contact 493. The contact 430 is electrically connected to a line 492 that is also connected one lead of the resistor 445, the anode of the diode 460 and the anode of the light-emitting diode 475. The other lead of the resistor 445 is connected together with the other resistors 446-455 and represents the TIMING RESISTANCE on the line 410. The cathode of the diode 460 is connected together with the cathodes of the other diodes 461-470 and represents the SWITCHED Vcc signal on the line 412. The cathode of the light-emitting diode 475 is attached to ground. Gears two through eleven are similarly wired with each gear having its respective switch contact 431-440, resistor 446-455, diode 461-470 and light-emitting diode 476-485 interconnected as described above.

Depending on the particular switch 430-440 that is closed, a corresponding light-emitting diode 476-485 will be turned on indicating to the user of the bicycle which gear the transmission 220 is in. Although the disclosed embodiment has eleven light-emitting diodes 475-485 to indicate which gear is being used, it should be understood that the switch contacts 430-440 can also be connected to an encoder to drive a pair of seven-segment light-emitting diodes or other similar display devices to provide a digital display of the currently enabled gear.

As set forth above, one lead of each of the resistors 445-455 is connected together to provide the TIMING RESISTANCE on the line 410. At most, only one switch will be closed to provide a single value of resistance between the power bus 490 and the TIMING RESISTANCE line 410. Each of the resistors 445-455 vary in resistance according to the gear being used. As will be described in more detail below, for the lower gears a higher value of resistance will be used to increase the amount of time before the wheel speed is checked, and vice versa for the higher gears.

The SWITCHED Vcc signal on the line 412 will have power applied to it when one of the contacts 430-440 is engaged by the moving contact 493. Otherwise, when the transmission 220 is between gears, none of the contacts 430-440 are engaged and no power is provided on the SWITCHED Vcc line 412.

The gear one switch contact 430 is also connected via the line 492 to the input of an inverter 494. The output of the inverter 494 is connected to the −G1 signal line 414. The −G1 signal on the line 414 will be active when the transmission 220 is in the lowest gear, and, as will be described below, will prevent the motor controller circuit 406 from attempting to shift to any lower gear. Similarly, the gear eleven switch contact 440 is connected via a line 496 to the input of an inverter 498. The output of the inverter 498 is provided as the −G11 signal on the line 416. Thus, when the switch 440 is closed (i.e., the contact 440 is engaged by the moving contact 493). the −G11 signal will be activated on the line 416 to inhibit the motor controller circuit 406 from attempting to shift to a higher gear.

FIG. 30 illustrates the details of the motor drive circuit 404. Upon assertion of either the SHIFT-UP signal on the line 422 or the SHIFT-DOWN signal on the line 424 from the motor controller circuit 406, the motor drive circuit 404 will turn the motor 238 either clockwise or counterclockwise in accordance with the direction of the current applied to the bidirectional motor power lines 426, 428.

The motor drive circuit 404 of FIG. 30 comprises a first transistor 500, a second transistor 502, a third transistor 504, a fourth transistor 506, a first resistor 510, a second resistor 512, a third resistor 514 and a fourth resistor 516. The first transistor 500, has its base connected to the SHIFT-UP signal on the line 422, its emitter connected to the first motor power line 426 and its collector connected to power (Vcc). The second transistor 502, has its base connected to the SHIFT-DOWN signal on the line 424, its emitter connected to the second motor power line 428, and its collector connected to power (Vcc). The third transistor 504 has its base connected in common to a first lead of the first resistor 510 and a first lead of the second resistor 512, its emitter connected to ground, and its collector connected to the second motor power line 428. The fourth transistor 506 has its base connected to a first lead of the third resistor 514 and a first lead of the fourth resistor 516, its emitter connected to ground, and its collector connected to the first motor power line 426 of the motor 238. The second lead of first resistor 510 is connected to the SHIFT-UP signal on the line 422. The second lead of the second resistor 512 is connected to ground. The second lead of the third resistor 514 is also connected to ground. The second lead of the fourth resistor 516 is connected to the SHIFT-DOWN signal on the line 424.

There are three combinations of signals which are applied to the motor drive circuit 404. First, both the SHIFT-UP signal on the line 422 and SHIFT-DOWN signal on the line 424 can be low. When this occurs, none of the four transistors 500, 502, 504, 506 are active. Thus, no current flows to the electric motor 238.

Second, when the SHIFT-UP signal on the line 422 is high and the SHIFT-DOWN signal on the line 424 is low, the first transistor 500 and the third transistor 504 are both turned on, and the second transistor 502 and the fourth transistor 506 are both off. This combination connects ground to the second motor power line 428 through the collector and emitter of the third transistor 504, and connects power from Vcc to the first motor power line 426 through the first transistor 500. The SHIFT-DOWN signal on the line 424 applies a low voltage to the base of both the second transistor 502 and the fourth transistor 506. A high voltage applied to the first motor power line 426 and a low voltage applied to the second motor power line 428 provides current in a first direction to the motor 238 so that it turns in a first direction (e.g., counterclockwise). This causes the shifter rack 164 (FIG. 4) to move inward to decrease the effective sprocket diameter.

Third, when the SHIFT-UP signal on the line 422 is low and the SHIFT-DOWN signal on the line 424 is high, the second transistor 502 and the fourth transistor 506 are both turned on, and the first transistor 500 and the third transistor 504 are turned off. The second transistor 502 connects the high voltage (Vcc) to the second motor power line 428. The fourth transistor 506 connects ground to the first motor power line 426. This causes the motor 238 to turn in the opposite direction than when the SHIFT-UP signal is high and the SHIFT-DOWN signal is low (i.e., clockwise).

Additional details of the motor controller circuit 406 are illustrated in FIG. 31. The motor controller circuit 406, receives an input signal comprising a series of spaced-apart pulses from the magnetic pickup 408 and the TIMING RESISTANCE input and SWITCHED Vcc input from the timing select and gear indicating circuit 402 of FIG. 29, and automatically outputs the SHIFT-UP and SHIFT-DOWN signals on the lines 422, 424 to the motor drive circuit 404 of FIG. 30. The motor controller circuit 406 comprises a timer 520, a first monostable multivibrator ("one shot") 522, a second monostable multivibrator 524, a counter 526, a decoder 530, a first flip-flop 532, a second flip-flop 534 and other interconnecting circuitry. The motor controller circuit 406 also has a number of signals which it uses internally such as a −RESET signal on a line 536 which resets the motor controller circuit 406 after a gear change; a MS1 signal on a line 540 which is the output of the first monostable multivibrator 522; a −MS1 signal on a line 542 which is the inverse of the MS1 signal on the line 540; a MS2 signal on a line 544 which is the output of the second monostable multivibrator 524; a −MS2 signal on a line 546 which is the inverse of the MS2 signal 544; a FAST signal on a line 550 which indicates that the bicycle wheel is turning too fast for a particular gear; and a SLOW signal on a line 552 which indicates that the bicycle wheel is turning too slow for a particular gear.

The −RESET signal is generated by a reset circuit that comprises the timer 520, an inverter 554, and associated tuning and biasing components connected to the timer. The timer 520 is advantageously a XR-L555 micropower timing circuit, or an equivalent. Unlike the other components of the motor controller circuit 406, which are connected to the Vcc supply provided by the battery 409, the timer 520 has its Vcc power input connected to the SWITCHED Vcc signal on the line 412 from the timing select and gear indicating circuit 402. Thus, the timer 520 only has power applied to it when the SWITCHED Vcc line 412 is active high. The Q output of the timer 520 is inverted by the inverter 554 and is provided as the −RESET signal on the line 536. The −RESET signal on the line 536 resets the first flip-flop 532 which stores the state of the SLOW signal on the line 552, and also resets the second flip-flop 534 which stores the state of the FAST signal on the line 550. Further, the −RESET signal on the line 536 resets the first monostable multivibrator 522, and the second monostable multivibrator 524.

When the transmission 220 is stable in one of the gears, the SWITCHED Vcc signal on the line 412 will be at a high voltage level, therefore, the timer 520 will be switched on and its Q output will be low. Thus, the −RESET signal line 536 will be at a high voltage level. As long as the gear shifter remains in one gear, nothing will affect the power to the timer 520 and the −RESET signal line 536 will remain high. However, when the gears are changed, there will be a short amount of time when all the switches are open, as the moving contact 493 moves with the shifter rack 164 between two adjacent switch contacts 430-440. Thus, no power will be connected to the Vcc input of the timer 520 because the SWITCHED Vcc line 412 is at a low voltage level. Since the timer 520 will produce no Q output, the inverter 554 will continue to assert a high voltage level on its output and the −RESET signal on the line 536 will remain inactive. When the next gear is reached, one of the switches 430-440 will close to apply Vcc to the SWITCHED Vcc line 412. The rising edge of the SWITCHED Vcc signal on the line 412 will turn the power back on to the timer 520. When the power is first turned back on, the timer 520 will generate an output pulse of fixed duration that is inverted by the inverter 554 to provide the −RESET signal on the line 536. The −RESET signal is shown as a pulse 564, 566, 568 in the timing diagrams of FIGS. 33, 34 and 35, respectively.

Figure 32:
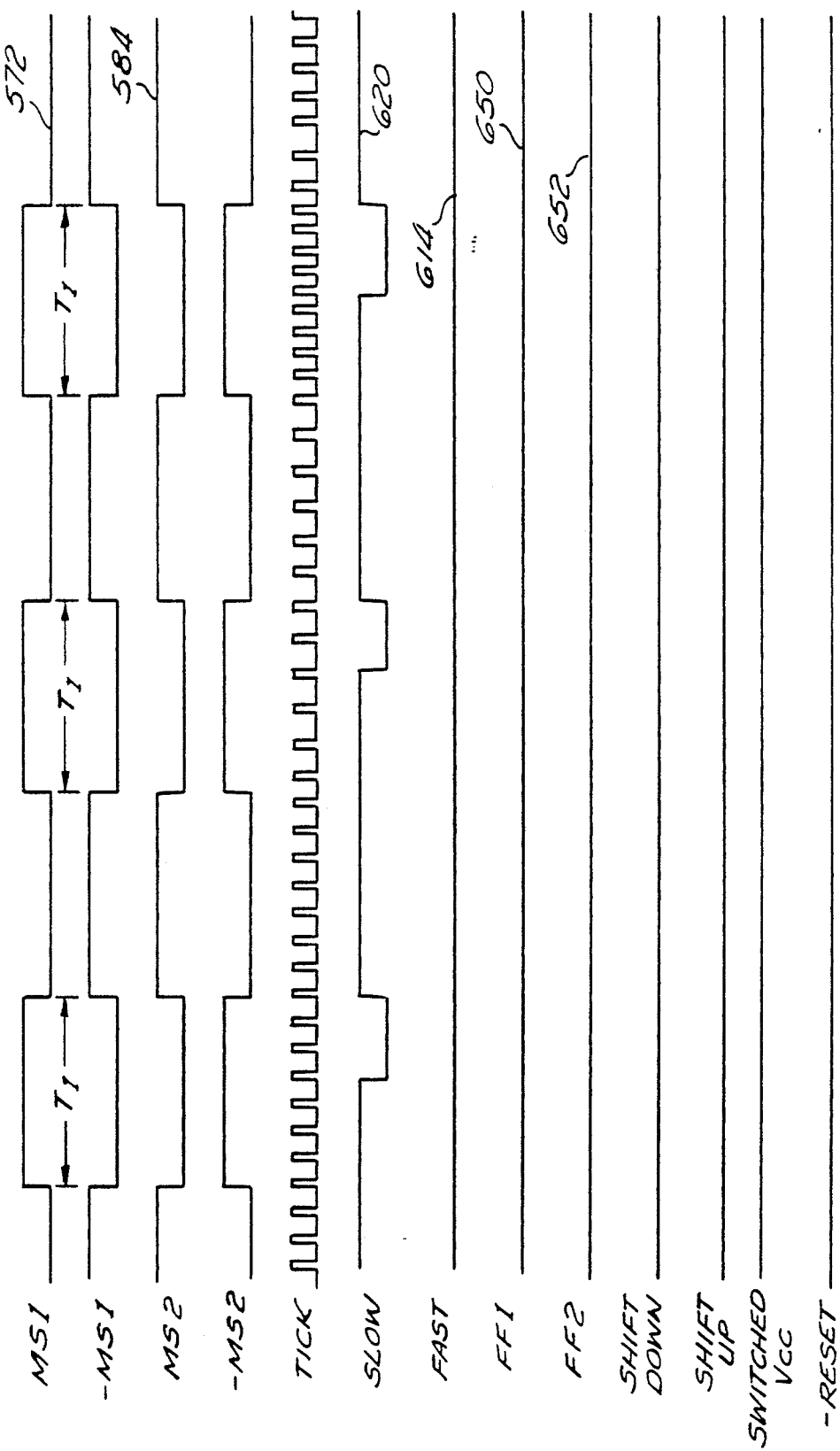
FIG. 32 is a set of timing diagrams representing the signals within the motor controller circuit which will occur when the wheel rotation rate is within an acceptable range for the current gear so that no shifting occurs.
Figure 33:
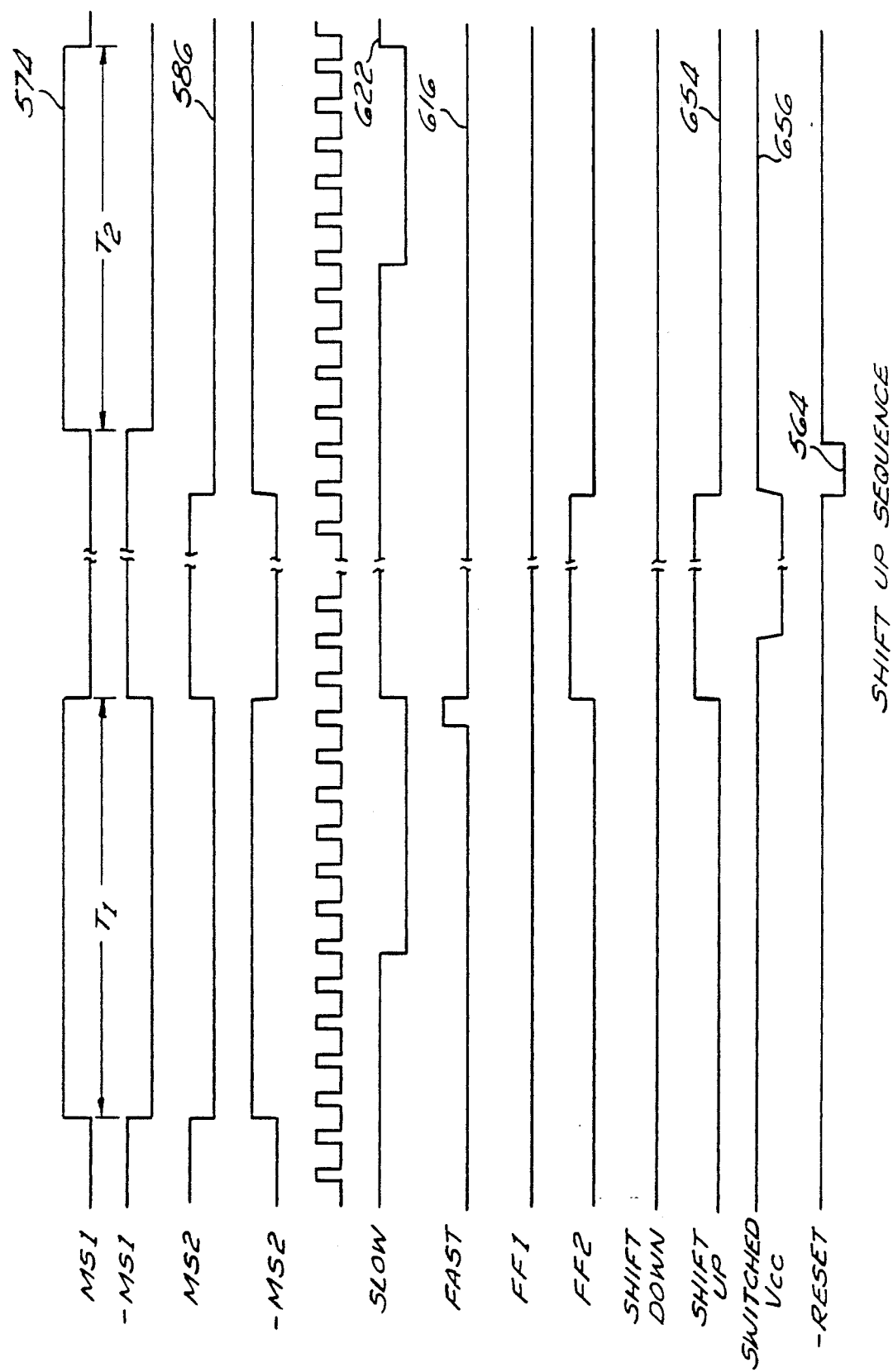
FIG. 33 is a set of timing diagrams representing the signals within the motor controller circuit which will occur when the wheel rotation rate is within a range of wheel rotation rates for the currently selected gear that are too high for the current gear so that the motor is operated to shift the transmission to a higher gear.
Figure 34:
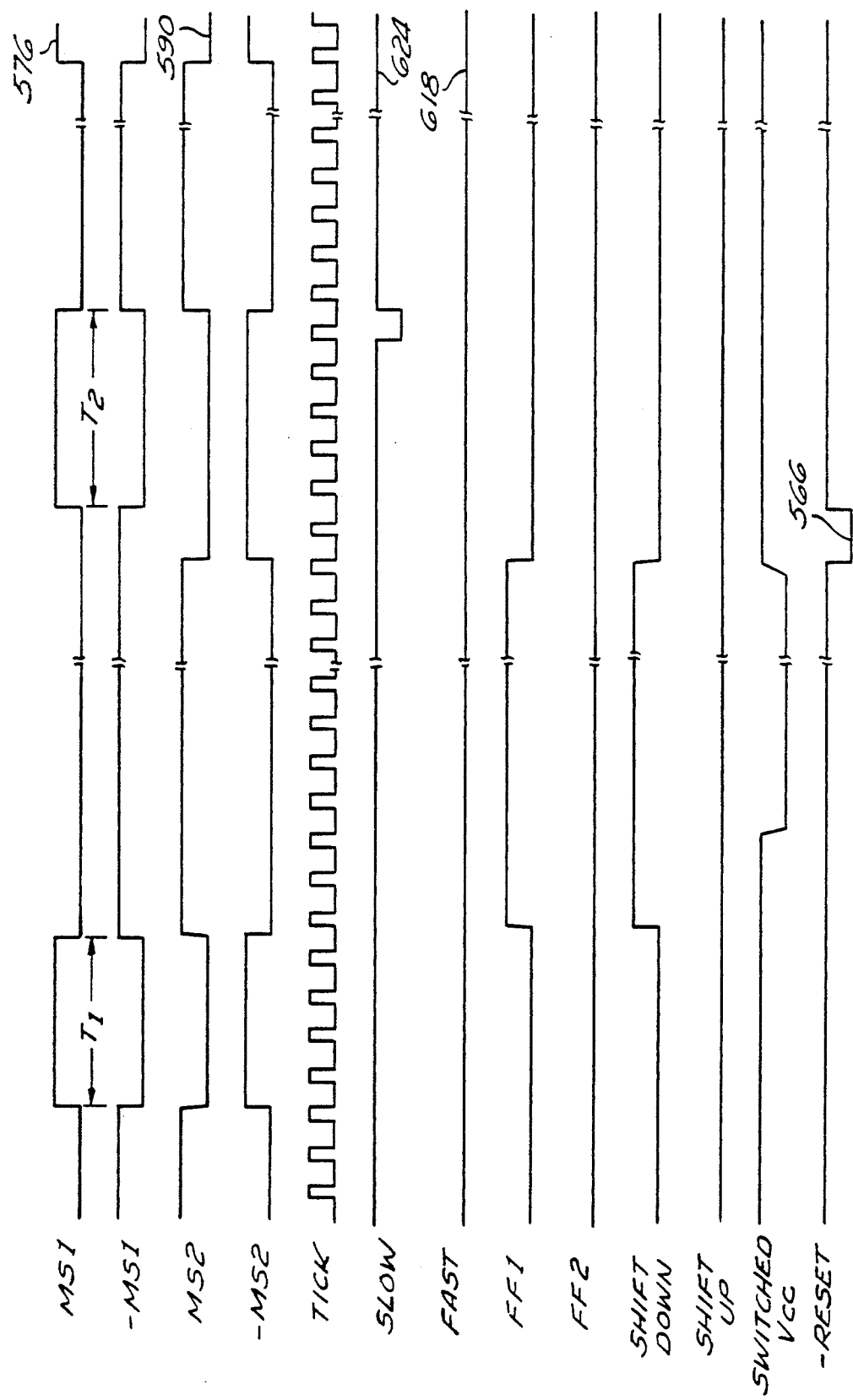
FIG. 34 is a set of timing diagrams representing the signals within the motor controller circuit which will occur when the wheel rotation rate is within a range of wheel rotation rates that are too low for the current gear so that the motor is operated to shift the transmission to a lower gear.

In the exemplary embodiment of the motor controller circuit 406, the two monostable multivibrator timing circuits 522, 524 are XR-L556 timers that are each connected to timing components to operate as one-shot timers. The first monostable multivibrator 522 generates a timing pulse that is dependent on the gear ratio. As set forth above, the timing select and gear indicating circuit 402 of FIG. 29 connects one of the eleven resistors 445-455 between the Vcc bus 490 and the TIMING RESISTANCE line 410. The TIMING RESISTANCE line 410 is connected to a timing capacitor 570 of the first monostable multivibrator 522. By selecting one of the resistors 445-455, the RC time constant of the capacitor 570 and the selected resistor will be varied to vary the width of the output pulse generated by the multivibrator 522. Exemplary signal waveforms 572, 574 and 576, generated by the Q output of the first monostable multivibrator 522, are seen in FIGS. 32, 33 and 34, respectively.

The output of the first monostable multivibrator 522 is used to control other functions in the circuit. The Q output of the first monostable 522, the MS1 signal on the line 540, is connected to a capacitor 580 which in turn is connected to the trigger input of the second monostable 524. The capacitor 580 operates to cause the second monostable 524 to be triggered at the end of the MS1 pulse on the line 540. The leading edge of the −MS1 signal on the line 542 clocks the first flip-flop 532 and the second flip-flop 534. Since the −MS1 signal is the inverse of the MS1 signal on the Q output of the first monostable, the flip-flops 532, 534 are triggered at the end of the pulse on MS1.

The −MS1 signal on the line 542 also controls the counter 526. When the −MS1 signal is low, the counter 526 is enabled so that it counts. When the −MS1 signal switches to its high level at the end of the pulse, the counter 526 is reset.

The first monostable 522 can be reset by three signals, the −RESET signal on the line 536, the −MS2 signal on the line 546, and the output 15 of the decoder 530. The three signals are logical OR'ed together by an OR-gate 582, and the output of the OR-gate 582 is connected to both the reset and the trigger of the first monostable 522. The first monostable 522 is reset whenever any of these signals is active.

The second monostable 524 produces the MS2 signal on the line 544 when it is triggered by the end of the MS1 signal on the line 540 via a coupling capacitor 580. The MS2 signal is inverted by an inverter 583 and is provided as a −MS2 signal on a line 546. The second monostable multivibrator 524 maintains the MS2 signal active on the line 544 and the −MS2 signal on the line 546 for slightly longer than the time needed for the motor 238 to shift gears. Exemplary waveforms 584, 586, 590 for the MS2 signal are shown in FIGS. 32, 33 and 34, respectively. The −MS2 signal resets the first monostable 522 so that it generates the pulse MS1 at the end of the pulse MS2. This reset is used to restart the first monostable when there is no gear change, as illustrated by the timing diagrams in FIG. 32. The two monostables 522, 524 operate together to create the waveforms as seen in the timing diagrams of FIGS. 32, 33, 34 and 35.

The remainder of the motor controller circuit 406 will determine the speed of the wheel, determine whether shifting is needed, and output the SHIFT-UP signal or the SHIFT-DOWN signal. The magnetic pickup 408 is used to determine the speed of wheel. The output of the magnetic pickup 408 is input to the clock of the counter 526 on the line 420. An exemplary counter 526 is a 4-bit, binary counter such as an SN7493A, from Texas Instruments, or a CMOS equivalent counter. The four outputs of the counter 526 are fed to the 4-line to 16-line decoder 530, which may be, for example, an SN74154 1-of-16 decoder/demultiplexer from Texas Instruments, or an equivalent. The counter 526 is reset by the −MS1 signal and is enabled to count during the MS1 signal. The first five outputs (0-4) of the decoder 530 (corresponding to the first five counts of the counter 526) are input to an NOR-gate 610 to produce the SLOW signal on the line 552 when any one of the five outputs is active. The SLOW signal on the line 552 is provided as the D-input of the first flip-flop 532, and indicates that the counter 526 did not receive a sufficient number of pulses from the magnetic pickup 408 during the time that the counter 526 was enabled by the −MS1 signal. The last five outputs (11-15) of the decoder 530 (corresponding to counts of 11 through 15 from the counter 526) are input to an NOR-gate 612 to produce the FAST signal on the line 550 when any one of the five outputs is active. The FAST signal on the line 550 is provided as an input to the D-input of the second flip-flop 534, and indicate that the counter 526 received too many pulses during the time that it was enabled. The last output (15) of the decoder 530 is also connected to the OR-gate 582 together with the −RESET signal on the line 536 and the −MS2 signal on the line 546 to reset the first monostable 522. Exemplary waveforms 614, 616, 618 of the FAST signal on the line 550 can be seen in FIGS. 32, 33 and 34, respectively. Exemplary waveforms 620, 622, 624 of the SLOW signal on the line 552 can be seen in FIGS. 32, 33 and 34, respectively.

The flip-flops 532, 534 serve as memory devices to hold the SLOW signal 552 and the FAST signal 550. The flip-flops 532, 534 are clocked by the leading edge of the −MS1 signal on the line 542, corresponding to the trailing edge of the MS1 signal. The Q output (designated as "FF1") of the first flip-flop 532 indicates that the bicycle wheel is turning too slow for the present gear and that the gear needs to be shifted down. The Q output is provided as an input to an AND-gate 630, along with the −G1 signal on the line 414 and the MS2 signal on the line 544. The output of the AND-gate 630 produces the SHIFT-DOWN signal on the line 424. The output of the AND-gate 630 is also connected to a resistor 632 in series with a light-emitting diode (LED) 634 which is connected to ground so that the LED 634 emits light to indicate that the automatic transmission is shifting down.

Similarly, the Q output of the second flip-flop 534 (designated as "FF2") is sent to an AND-gate 640 along with the −G11 signal on the line 416 and MS2 signal on the line 544. The output of the AND-gate 640 produces the SHIFT-UP signal on the line 422. The output of the AND-gate 640 is also connected to a resistor 642 in series with a light emitting diode 644 which in turn is connected to ground. The light emitting diode 644 emits light to indicate when the transmission is shifting up.

The AND-gates 630, 640 act as enabling gates so that the SHIFT-UP and the SHIFT-DOWN signals can be asserted only when properly timed in synchronism with the MS2 signal on the line 544. Thus, the gears can be shifted only at specified times. The length of time that the MS2 signal is active is selected to be sufficiently long enough that the motor 238 operates to move the shifter rack 164 (FIG. 4) between two adjacent gear positions. As will be discussed below, the MS2 signal can be selected to be a much larger timing component than necessary to shift between two adjacent gears because the −RESET signal will prevent the MS2 signal from operating longer than the time needed to shift one gear position.

There are four possible scenarios for operation of the motor controller circuit 406. First, there may be no gear change. If this is the case, the first monostable 522 is just an oscillator which is reset by the second monostable 524. The MS1 signal on line 540 is active for a time T1 dependent on the resistance selected through the TIMING RESISTANCE. The waveform 572 for the MS1 signal on line 540 can be seen in timing diagram of FIG. 32. There is no other activity on any of the other signals other than the SLOW signal on the line 552. The SLOW signal on the line 552 is asserted when the decoder 530 is in states zero through four, as seen from the waveform 620 in FIG. 32. The SLOW signal on line 552, however, is not clocked into the first flip-flop 532 to enable the SHIFT-DOWN signal on line 424 because the flip-flops 532, 534 are only clocked on the rising edge of the −MS1 signal on line 542. As can be seen from the waveforms 650, 652 in the timing diagrams of FIG. 32, the −MS1 signal on the line 542 never has a rising edge when the SLOW signal 552 is asserted. On the other hand, since the wheel speed is within the correct range for the selected gear, the MS1 signal on line 540 will time-out before the FAST signal on the line 550 will be asserted. Thus, the counter 526 will have a binary count of five through ten, and neither the first flip-flop 532 nor the second flip-flop 534 will be enabled.

A second sequence of operation is the shift-up sequence of FIG. 33. In the shift-up sequence, the wheel will be turning too fast, thus, the sprocket needs to be shifted to a higher gear. In such a case, the length (T1) of the pulse MS1, as determined by the current value of the resistance connected to the TIMING RESISTANCE line 410 is too large. Thus, the counter 526 will count to a count in the range of 11 through 15 before the MS1 signal times out. Thus, when the MS1 signal on the line 540 has a falling edge (i.e., −MS1 has a rising edge), the FAST signal on the line 550 is high (see waveform 616 of FIG. 33). The FAST signal will be latched into the second flip-flop 534. Since the MS2 signal on the line 544 will become active at the same time the MS1 signal on the line 540 becomes active, the FF2 signal out of the second flip-flop 534 to be enabled through the AND-gate 640 and activate the SHIFT-UP signal on the line 422. Once the gear shift has begun, this will put a low voltage on the SWITCHED Vcc signal on the line 412 while the transmission 220 is between gears. When the transmission 220 has completed the shift to the next higher gear, the SWITCHED Vcc signal on the line 412 will return to its high level, as seen in waveform 656 of FIG. 33. This causes the activation of the −RESET signal as seen in the waveform 564 of FIG. 33. Once the −RESET signal on line 536 becomes inactive, the MS1 signal on line 540 will become active as before. However, the resistance on the TIMING RESISTANCE line 410 will be smaller to decrease the length of the pulse MS1 so that the counter 526 is enabled for a shorter amount of time, and thus counts a smaller number of pulses from the magnetic pickup circuit 408.

A third scenario is a shift-down sequence of FIG. 34. In a shift-down sequence, the MS1 signal is too short (i.e., the time T1 is too short). Thus, the counter 526 will only count in the range of 0 to 4 times. Thus, the output of the decoder 530 will be in one of states zero through four and the SLOW signal on the line 552 will be active to indicate that the current gear is too high for the present speed of the bicycle wheel. On the falling edge of the MS1 pulse, the SLOW signal on line 552 will be clocked into the first flip-flop 532. At the same time, the MS2 signal 544 will become active. Thus, the AND-gate 630 will enable the FF1 output of the first flip-flop 532 to generate the SHIFT-DOWN signal on the line 424 to power the motor 238. Once the motor 238 begins to shift the gears, the SWITCHED Vcc signal on the line 412 will be disabled since the transmission 220 will be shifting between gears. Thus, no power will be applied to the timer 520 and it will be turned off. Once the gear shift is complete, the power to the timer will be turned on and this will create a pulse on the −RESET signal on the line 536 as shown by the waveform 566 of FIG. 34. At the end of the −RESET signal on the line 536, the first monostable 522 will generate an MS1 pulse having a longer pulse duration because a new resistance will have been enabled onto the TIMING RESISTANCE line 410. Thus, the counter 526 will be enabled for a longer time so that it is more likely that it will receive a count in the range of five through ten.

Figure 35:
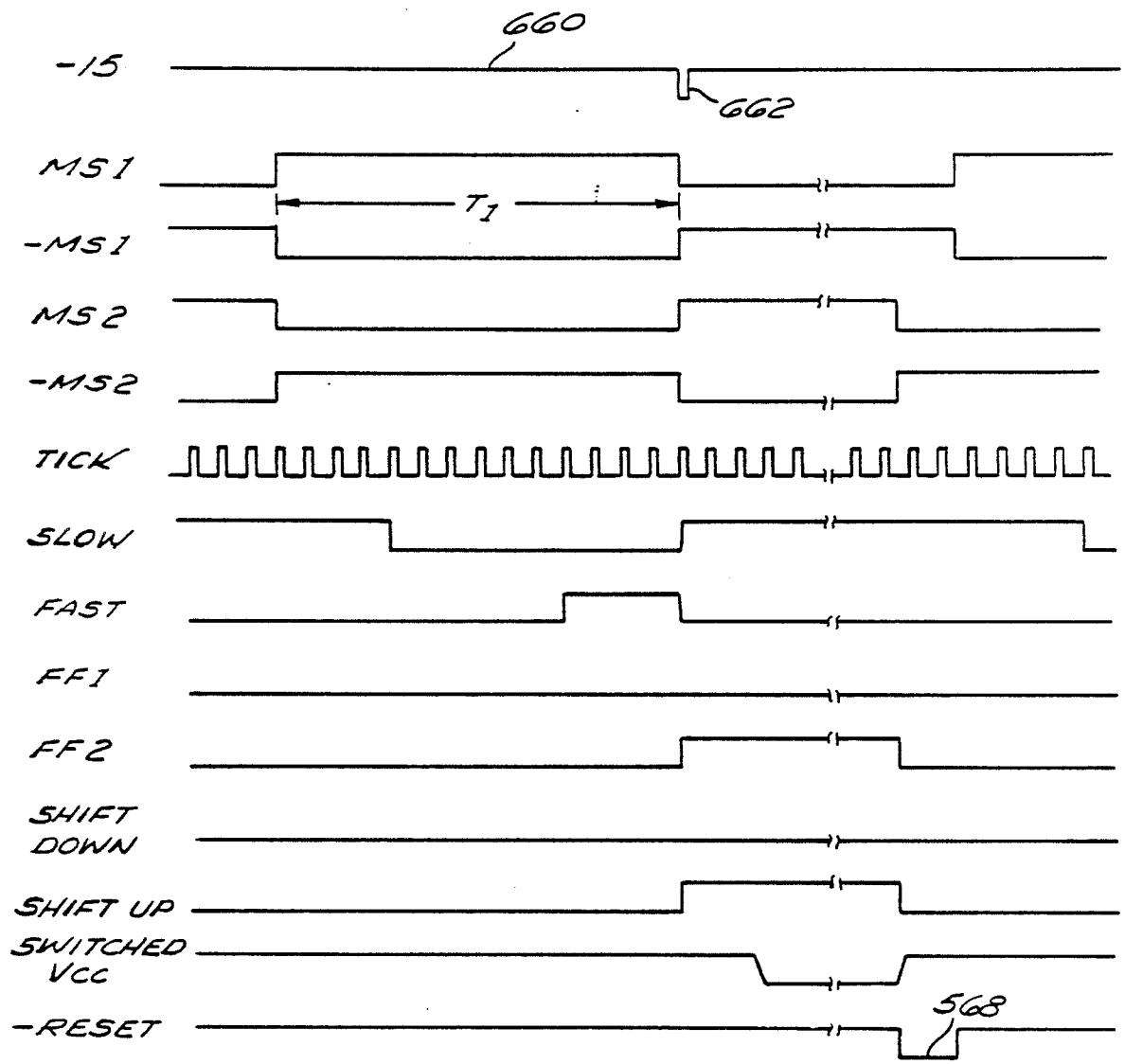
FIG. 35 is a set of timing diagrams representing the signals within the motor controller circuit which will occur when the wheel rotation rate is at or above the high end of the range of wheel rotation rates for the current gear. In this instance the electrical control circuit causes the motor to be operated to shift to a higher gear irrespective of whether the timing circuit has timed out.
Figure 39:
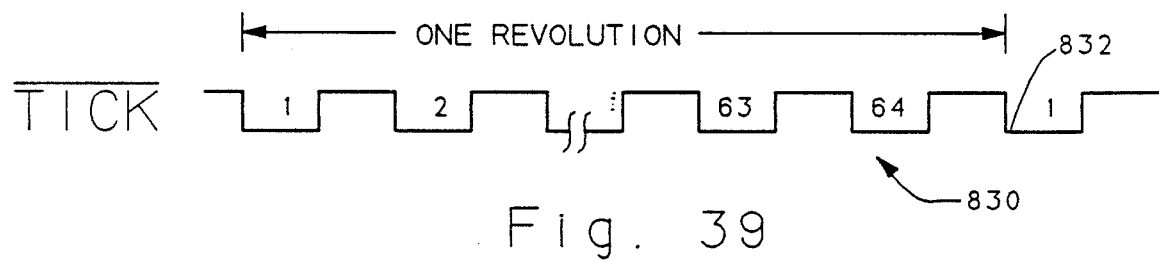
FIG. 39 illustrates a graph of the $\overline{\text{PICK}}$ signal generated by the rotation speed sensing circuit of FIG. 36.

The final mode of operation will be a time out, shift-up sequence in FIG. 35. This occurs when the MS1 pulse length T1 is too long and the speed of the wheel is too fast. Thus, the counter 526 output reaches state fifteen. Once state fifteen has been reached, the −15 output of the decoder 530 becomes active (as represented by a zero-going pulse 662 in a waveform 660 in FIG. 35). The −15 signal will cause the first monostable 522 to be reset through the OR-gate 582, thus causing the MS1 and −MS1 signals to terminate. Since the first monostable 522 is being reset, the flip-flops 532, 534 will be clocked and the data which is presently on the inputs will be latched in. Since the FAST signal on the line 550 is presently active and will be on the D-input of the second flip-flop 534 when the −MS1 signal on the line 542 is asserted, this will trigger a shift-up. The sequence is seen on the timing diagrams in FIG. 35, with the initial triggering of the sequence caused by the counter 526 reaching state fifteen rather than the timing out of the MS1 signal on the line 540 occurring when the counter 526 is in states eleven through fourteen. The rest of the time out shift-up sequence proceeds the same as for the shift-up sequence with the SWITCHED Vcc signal on line 412 being disabled during the gear change, and thereafter the −RESET signal 536 being activated to restart the timing cycle.

Description of Microprocessor Controlled Automatic Shift Control Circuit

Although described above in connection with the disclosed circuit, it should be understood that the counting and timing functions disclosed herein can be performed by a microprocessor that is responsive to the cadence of the cyclist and that generates the SHIFT-UP and SHIFT-DOWN signals to the motor drive circuit 404. Such a microprocessor controlled circuit is illustrated in FIGS. 36–49 and will be described hereinafter.

As illustrated in FIG. 36, this alternative embodiment includes a microprocessor 700, a timer circuit 702, a programmable array logic (PAL) circuit 704, a rotation speed sensing circuit 706, and a gear contact filter circuit 708, which are interconnected as shown, and as will be described below.

The microprocessor 700 has an integral programmable read only memory (PROM) (not shown). For example, the microprocessor 700 is advantageously an 8748 microprocessor or an 8751 available from Advance Micro Devices, Inc., and Intel Corporation, for example. As is well known in the art, the internal PROM in such microprocessors allows a circuit to be constructed without requiring external memory and associated memory support circuits. The microprocessor 700 is particularly suited for microcontroller applications and provides a number of input and output signals for controlling the microprocessor and for receiving data from and transmitting data to the circuit into which it is incorporated.

For convenience in referring to the specifications provided by the integrated circuit manufacturers, the microprocessor 700 is shown with 40 connection leads with pins 1, 20, 21 and 40 identified. The input and output lines pertinent to the present invention are explicitly labelled in FIG. 36 to facilitate the discussion below.

As illustrated, the microprocessor 700 includes a $V_{CC}$ input pin that is connected via a line 710 to a source of power, shown as $V+$, which in this embodiment is provided by the battery 409. A $V_{SS}$ input pin is connected via a line 712 to the circuit ground reference. A $V_{DD}$ input pin, which can be optionally connected to a separate power supply, is connected via a line 714 to the source of power $V+$ in this embodiment of the invention.

The microprocessor includes a pair of input/output connection pins, labelled XTAL1 and XTAL2, which are connected via a line 720 and a line 722, respectively, to respective first and second contacts of a crystal 724. The crystal 724 is selected to have a resonant frequency of 3.57 MHz. The crystal 724 is part of a resonant circuit that further comprises a capacitor 726 and a capacitor 728 that are respectively connected between the first and second contacts of the crystal 724 and the circuit ground reference. In the presently preferred embodiment, the capacitors 726 and 728 have capacitances of approximately 10 picofarads. The crystal 724, and the capacitors 726 and 728 operate in cooperation with internal circuitry of the microprocessor 700 to provide an internal clock for the microprocessor 700 that controls the timing of instruction execution and input and output operations.

The microprocessor 700 further includes three control inputs that are used in some applications to control the operation of the microprocessor 700. A single step ($\overline{SS}$) is activated when a signal is applied having a level approximately equal to the ground reference. When activated, the single step input causes the microprocessor 700 to "single step" through each instruction. An interrupt ($\overline{INT}$) input to the microprocessor 700 is activated when a signal is applied having a level approximately equal to the ground reference. The single step feature and the interrupt feature are disabled by connecting the two inputs to the $V+$ power source via a line 730. A capacitor 734 (having a capacitance of 0.02 microfarad, for example) is connected between the line 730 and the ground reference to filter any transients in the supply voltage that might activate either of the two inputs.

An external access (EA) input to the microprocessor 700 forces the microprocessor 700 to fetch instructions from an external memory rather than the internal PROM. This input is active when a high voltage level (i.e., $V+$) is applied to it. In the present embodiment of the invention, no external memory is used and the EA input is connected to the ground reference via a resistor 738 (having resistance of 47,000 ohms, for example) to disable this feature.

The microprocessor 700 includes a reset ($\overline{RESET}$) input is provided to the microprocessor 700. The $\overline{RESET}$ signal is active when a signal having a level approximately equal to the ground reference is applied. When the $\overline{RESET}$ signal is active the microprocessor is initialized to a predetermined state. When the $\overline{RESET}$ signal is deactivated, the microprocessor 700 begins operating by fetching an instruction from a predetermined program location (e.g., PROM address 0000). The $\overline{RESET}$ signal input is connected via a line 740 to an output of the PAL circuit 704. The control of the $\overline{RESET}$ signal input by the PAL circuit 704 will be discussed more fully below.

The microprocessor 700 includes an eight-bit data input/output bus comprising eight data input/output pins labelled DB0, DB1, DB2, DB3, DB4, DB5, DB6 and DB7. In the present invention, the least significant data bit, DB0, of the data bus is connected to an "A" output of the PAL circuit 704 via a data line 750. The data bit DB1 is connected to a "B" output of the PAL circuit 704 via a data line 752. The data bit DB2 is connected to a "C" output of the PAL circuit 704 via a data line 754. The data bit DB3 is connected to a "D" output of the PAL circuit 704 via a data line 756. The four data lines 750, 752, 754 and 756 are connected via respective resistors 760, 762, 764 and 766 to the ground reference to provide protection for the inputs of the microprocessor 700. The other four data input/output pins for the data bits DB4, DB5, DB6 and DB7 are connected via respective resistors 770, 772, 774 and 776 to the ground reference to provide a constant logical zero input to the microprocessor 700 for the four data bits. Although the data input/output pins are bidirectional, the present invention utilizes them solely for providing input data to the microprocessor 700. In the preferred embodiment, the resistors 760, 762, 764, 766, 770, 772, 774, 776 have a resistance of approximately 47,000 ohms.

The microprocessor 700 includes a first port input/output connector P10 (pin 27) and a second port input/output connector P11 (pin 28). The P10 and P11 port input/output connectors are used in the present invention to provide an SU output signal and an SD output signal from the microprocessor 700 to the PAL circuit 704 via an "SU" line 780 and an "SD" line 782, respectively. The SU and SD output signals initiate a shift up and a shift down operation, respectively. The generation of the SU and SD output signals by the microprocessor 700 will be discussed more fully below.

The microprocessor 700 includes a timer input connector T1 (pin 39) that is connected to the rotation speed sensing circuit 706 via a $\overline{\text{TICK}}$ line 790. The microprocessor 700 includes an internal counter that is incremented at each high-to-low transition of a signal applied to the timer input pin T1. As will be discussed below, in the present invention, the $\overline{\text{TICK}}$ signal on the line 790 is activated by the rotation speed sensing circuit 706 a plurality of times for each revolution of the rear wheel 14 of the bicycle 10 (FIG. 1) on which the present invention is mounted. Thus, the internal counter of the microprocessor 700 will be incremented a corresponding plurality of times for each revolution of the rear wheel 14. In one embodiment, the internal counter is incremented 64 times per revolution. In an alternative embodiment, the internal counter is incremented 128 times per revolution. As will be seen below, other increment values can also be used.

The rotation speed sensing circuit 506 comprises an infrared light emitting diode (IRLED) 800 that is connected in series with a current limiting resistor 802 between the V+ supply voltage and the ground reference so that current flows through the IRLED 800 so long as the supply voltage is present. In the preferred embodiment, the IRLED 800 is available from Radio Shack® as part number 276-143A, and the current limiting resistor 802 has a resistance of approximately 825 ohms. The rotation speed sensing circuit 706 further includes an infrared sensitive NPN phototransistor 804 that has its collector connected to the V+ supply voltage and has its photosensitive base area positioned to receive the infrared light transmitted by the IRLED 800. The phototransistor 804 is advantageously a TIL414 phototransistor available from Radio Shack® as part number 276-145. When the phototransistor 804 receives infrared light, it conducts and provides a high voltage level on its emitter. The emitter of the phototransistor 804 is connected to one terminal of a parallel RC circuit comprising a resistor 810 and a capacitor 812. The other terminal of the RC circuit is connected to the ground reference. The resistor 810 of the RC circuit operates to pull the voltage level on the emitter of the phototransistor 804 to a level approximately equal to the ground reference when the phototransistor 804 is not conducting. In addition, the capacitor 812 of the RC circuit filters out noise when the voltage on the emitter of the phototransistor 804 switches from the low voltage level and the high voltage level and vice versa.

The emitter of the phototransistor 804 is also connected to the input of a CMOS Schmitt trigger inverter 814, which is advantageously one of the six gates of a 74HC14 hex Schmitt trigger circuit available from GE Solid State, Signetics Corporation, and number of other sources. The output of the inverter 814 is the $\overline{\text{TICK}}$ signal on the line 790. When the input of the inverter 814 is low, the output is high, and vice versa. Thus, when the phototransistor 804 receives a sufficient intensity of infrared light to conduct, the output of the inverter 814 will be low. When the phototransistor 804 is not conducting, the output of the inverter 814 will be high.

Referring now to FIGS. 37 and 38, a sprocket assembly 16′, constructed in accordance with this aspect of the present invention, is illustrated on the rear wheel 14 (shown in partial view only). The shifting mechanism of the sprocket assembly 16′ is constructed as described above and is not shown in detail in FIG. 37. In addition to the shifting mechanism, the sprocket assembly 16′ includes a circular disk 820 that is mounted concentrically with the axis of the sprocket assembly 16′ so that the disk 820 rotates about the axis as the rear wheel 14 turns. The disk 820 has a raised peripheral edge 822 that includes a plurality (e.g., 64) of evenly spaced light transmitting slots 824 formed thereon. The raised peripheral edge 822 can be a solid opaque material that blocks light, and the slots 824 can be formed by removing material from the peripheral edge. Alternatively, in the preferred embodiment, the raised peripheral edge 822 is an optically transparent material, such as plastic, with an optically opaque material secured thereon in a repeating pattern. In the preferred embodiment, the slots 824 comprise the areas on the raised peripheral edge 822 between the opaque material.

The raised peripheral edge 822 rotates between the IRLED 800 and the phototransistor 804 so that light from the IRLED 800 is blocked by the solid portion of the raised edge 822 and can propagate through the raised edge 822 only at the locations of the slots 824. As shown more clearly in the cross-sectional view of FIG. 38, the IRLED 800 and the phototransistor 804 are mounted on opposite sides of the raised edge 822 so that the infrared light emitted by the IRLED 800 will be incident on the phototransistor 804 when one of the slots 824 is aligned with the IRLED 800 and the phototransistor 804. When a slot 824 is aligned with the IRLED 800 and the phototransistor 804, the phototransistor 804 will conduct and cause the $\overline{\text{TICK}}$ signal output of the inverter 814 on the line 790 to switch from a high level to a low level. After the slot 824 has rotated out of alignment with the IRLED 800 and the phototransistor 804, the infrared light from the IRLED 800 will be blocked, the phototransistor 804 will stop conducting, and the $\overline{\text{TICK}}$ signal output on the line 790 will return to its high level. Thus, it can be seen that the $\overline{\text{TICK}}$ signal output on the line 790 will periodically switch from a high voltage level to a low voltage level in response to the rotation of the wheel 14. For example, as illustrated by a waveform 830 in FIG. 38, the $\overline{\text{TICK}}$ signal comprises 64 negative-going pulses 832 for each revolution of the wheel 14. The number of negative-going pulses 832 per unit time depends upon the rotational velocity of the wheel 14 and thus upon the speed of the bicycle 10. For example, at a rotational velocity of 120 revolutions per minute for the wheel 14, the $\overline{\text{TICK}}$ signal has a frequency of 128 Hz (120÷60×64). Thus, it can be seen that the number of $\overline{\text{TICK}}$ pulses per unit of time can be counted to determine the rotational velocity of the wheel 14 and thereby determine the forward velocity of the bicycle 10. As set forth above, the counting of the pulses is performed by the internal counter of the microprocessor 700. It can be seen that the resolution of the rotational velocity of the wheel 14 can be increased by increasing the number of holes 824 in the disk 820. For example, the resolution can be doubled by increasing the number of slots to 128.

Other optical and non-optical (e.g., magnetic) devices can be used to detect the wheel rotational velocity and provide the $\overline{\text{TICK}}$ signal to the microprocessor 700.

Referring back to FIG. 39, the battery 409 and the set 429 of gear indicating switches comprising the eleven switch contacts 430–440. As discussed above, only one of the switch contacts 430–440 is closed to connect the positive output voltage from the battery 409 to a signal line corresponding to the switch contact. For example, when the first gear (G1) is enabled, only the switch contact 430 is closed and the positive voltage is provided to a first gear indicator output line 830, labelled as "G1". Similarly, when the second gear (G2) is enabled, only the switch contact 431 is enabled to provide the positive voltage to a second gear indicator output line 832, labelled as "G2". The switch contacts, output lines and labels are summarized as follows:

| GEAR | SWITCH CONTACT | OUTPUT LINE | LABEL |
|---|---|---|---|
| FIRST | 430 | 830 | G1 |
| SECOND | 431 | 831 | G2 |
| THIRD | 432 | 832 | G3 |
| FOURTH | 433 | 833 | G4 |
| FIFTH | 434 | 834 | G5 |
| SIXTH | 435 | 835 | G6 |
| SEVENTH | 436 | 836 | G7 |
| EIGHTH | 437 | 837 | G8 |
| NINTH | 438 | 838 | G9 |
| TENTH | 439 | 839 | G10 |
| ELEVENTH | 440 | 840 | G11 |

The gear indicator output lines are connected to the gear contact filter circuit 708 in FIG. 36. For convenience, the eleven gear indicator output lines are represented together as a bus 850 that interconnects the gear indicator switch set 429 and the gear contact filter circuit 708.

The gear contact filter circuit 708 comprises eleven parallel RC circuits, each parallel RC circuit comprising a resistor 860 and a capacitor 862. Each resistor 860 and capacitor 862 has one terminal connected to a respective one of the gear indicator output lines 830-840 and the other terminal connected to the ground reference. The resistor 860 in each RC parallel circuit operates to pull the voltage level on the respective one of the gear indicator output lines 830-840 to a voltage level substantially equal to the ground reference when the respective gear switch contacts 430-440 are open while allowing the voltage on one of gear indicator output lines 830-840 to increase to the V+ voltage level when a respective one of the switch contacts 430-440 is closed. The capacitor 862 in each RC parallel circuit operates to filter noise when the respective gear switch contact is opened or closed during shifting operations.

Each of the gear indicator output lines 830-840 is connected to a respective input terminal of the PAL circuit 704. Thus, the PAL circuit 704 will be provided with a signal having a voltage level substantially equal to the ground reference voltage for each gear that is presently not engaged and a signal having a voltage level substantially equal to the V+ supply voltage for a gear that is engaged. For example, when the sprocket assembly is in the first gear position, the switch contact 430 (FIG. 39) will be closed and the voltage on the G1 gear indicator output line 830 will be substantially equal to V+. In contrast, the voltage levels on the G2-G11 gear indicator output lines 831-840 will be substantially equal to the ground reference voltage level. It should be understood that the V+ voltage corresponds to a logical "1" and the ground reference voltage level corresponds to a logical "0", as those terms are used hereinafter. It should be further understood that when the sprocket assembly is shifting between gears, all the gear indicator output lines 830-840 will have logical "0" signal levels.

The timer circuit 702 comprises a CMOS integrated circuit timer 880, such as an ICM7555 low-power CMOS timer available from GE Solid State/Intersil, or the like. The CMOS timer 880 is functionally equivalent to the industry standard 555 timer except that it requires a very low supply current of approximately 80 microamperes which makes it particularly suitable for the present invention, as will be discussed below. The CMOS timer 880 is provided with DC power via a $V_{CC}$ connector (pin 8) of the integrated circuit labelled as "$V_{CC}$". The $V_{CC}$ pin is connected via a line 882 to an output connection (pin 16) of the PAL circuit 704 which provides an output signal "TVCC". The PAL circuit 704 is capable of providing sufficient current when the output signal TVCC is at a high voltage level to supply the 80 microamperes of current required to operate the CMOS timer 880. When the output signal TVCC is low, no DC power is provided to the CMOS timer 880 and it is not operational. The operation of the PAL circuit 704 in generating the TVCC signal on the line 882 will be discussed more fully below. The ground ("GND") connection (pin 1) of the CMOS timer 880 is the logic and power ground for the CMOS timer 880 and it is connected to the circuit ground reference as shown.

The CMOS timer 880 provides an output signal TOUT on an output ("OUT") connection (pin 3). The timer output signal TOUT is connected via a line 884 to an input connection (pin 23) of the PAL circuit 704. The operation of the PAL circuit 704 in response to the timer output signal TOUT will be discussed below.

The CMOS timer 880 is interconnected to provide astable operation when it is provided with a DC supply voltage by an active TVCC signal on the line 882. This astable operation is provided by connecting the CMOS timer 880 as illustrated in FIG. 36. A reset ("$\overline{\text{RESET}}$") input connection (pin 4) is connected to the TVCC signal on the line 882. This is an active low signal and is thus disabled by connecting it to the same DC supply source as the $V_{CC}$ connection of the CMOS timer 880. A control voltage ("CV") input connection (pin 5) is connected to the circuit ground reference via a capacitor 886. For example, the capacitor 886 is advantageously a 0.1 microfarad capacitor.

The characteristics of the astable timing signal provided by the CMOS timer 880 are determined by a timing capacitor 890, a first timing resistor 892 and a second timing resistor 894. The timing capacitor 890 has a first terminal connected to a trigger ("TR") input connection (pin 2) and to a threshold ("TH") input connection (pin 6) of the CMOS timer 880. A second terminal of the timing capacitor 890 is connected to the circuit ground reference. The first terminal of the timing capacitor 890 is further connected to a first terminal of the first timing resistor 892. A second terminal of the first timing resistor 892 is connected to a discharge ("DISC") output connection (pin 7) of the CMOS timer 880. The discharge output connection is connected to a first terminal of the second timing resistor 894. A second terminal of the second timing resistor 894 is connected to the TVCC signal on the TVCC line 882.

Figure 40:
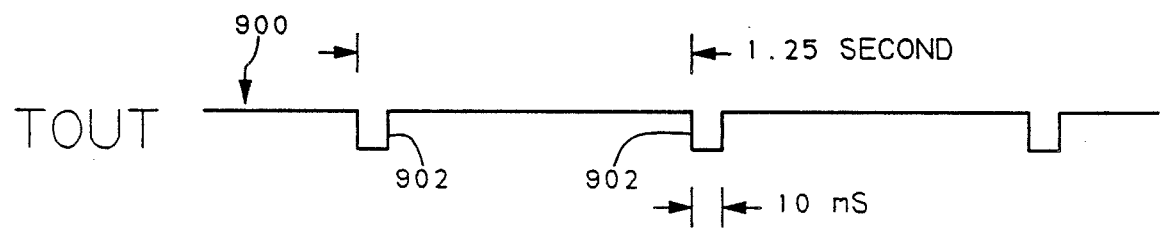
FIG. 40 illustrates a graph that represents the TOUT output signal from the TIMER circuit of FIG. 36.

The values of the timing capacitor 890, the first timing resistor 892 and the second timing resistor 894 are selected to provide a periodic TOUT signal as illustrated by a waveform 900 in FIG. 40. As illustrated, the waveform 900 comprises a high voltage level (i.e., a logical "1") for a large percentage of each cycle, with a negative-going pulse 902 in each cycle. In the preferred embodiment, the timing capacitor 890, the first timing resistor 892 and the second timing resistor 894 have values of 1.0 microfarad, 14,000 ohms and 1.9 Megohms, respectively, to provide a TOUT signal having a period of approximately 1.25 seconds and having a negative-going pulse with a width of approximately 10 milliseconds. As set forth above, the TOUT signal is provided as an input to the PAL circuit 704 via the TOUT line 884.

The programmable array logic (PAL) circuit 704 is a conventional programmable array logic circuit that comprises a plurality of internal logic gates that can be interconnected to provide output signals that are responsive to logical combinations of one or more of the input signals applied to the inputs of circuit. The interconnections are accomplished by "burning" fusible links within the circuit in accordance with the desired logical relationships between the input signals and the output signals. Various programmable array logic circuits are commercially available. In the present invention, the PAL circuit 704 is a C208LZ PAL circuit available from Monolithic Memories, Inc., or the like.

It can be seen in FIG. 36 that the PAL circuit 704 receives an input from each the gear switch contacts 430–440 via the gear indicator output lines 830–840. The PAL circuit 704 also receives the TOUT signal from the CMOS timer 880 via the TOUT signal line 884; the SU and SD signals from the microprocessor 700 via the SU signal line 780 and the SD signal line 782, respectively. As further set forth above, the PAL circuit 704 generates the TVCC signal on the TVCC signal line 882 which controls the power applied to the CMOS timer 880. The PAL circuit 704 generates the $\overline{\text{RESET}}$ signal on the $\overline{\text{RESET}}$ signal line 740. The PAL circuit 704 also generates the output signals A, B, C and D on the A signal line 750, the B signal lined 752, the C signal line 754 and the D signal line 756, respectively. As will be discussed below, the output signals A, B, C and D provided an encoded representation of the currently active gear indicator output signal on the gear indicator output lines 830–840.

The PAL circuit 704 also generates a $\overline{\text{SHIFTUP}}$ output signal on a $\overline{\text{SHIFTUP}}$ signal line 920 and a $\overline{\text{SHIFTDOWN}}$ output signal on a $\overline{\text{SHIFTDOWN}}$ signal line 922. The $\overline{\text{SHIFTUP}}$ output signal on the signal line 920 is provided as an input to an inverter gate 930. In similar manner, the $\overline{\text{SHIFTDOWN}}$ output signal on the signal line 922 is provided as an input to an inverter gate 932. In the preferred embodiment, each of the inverter gates 930 and 932 is advantageously one of the six gates of a 74HC14 hex Schmitt trigger circuit, as discussed above. The output of the inverter gate 930 is an active high shift up signal which is connected to one terminal of a current limiting resistor 940. The second terminal of the current limiting resistor 940 is connected to one terminal of the actuator coil of a first reed relay 942. The output of the inverter gate 932 is an active high shift down signal which is connected to one terminal of a current limiting resistor 944. The second terminal of the current limiting resistor 944 is connected to one terminal of the actuator coil of a second reed relay 946. The second terminals of the actuator coils of the first and second reed relays 942 and 946 are connected to the circuit ground reference.

Preferably, the first and second reed relays 942 and 944 are single-pole double throw relays, each having a common contact terminal ("C"), a normally open contact terminal ("NO") and a normally closed contact terminal ("NC"). In the illustrated embodiment, the normally closed contact of each relay is connected to the circuit ground reference, and the normally closed contact of each relay is connected to positive voltage source $V_{MOTOR}$. The common contact of the first reed relay 942 is connected to one terminal of the motor 238 via a first motor power line 950. The common contact of the second reed relay 946 is connected to a second terminal of the motor 238 via a second motor power line 952. It can be seen that when neither the $\overline{\text{SHIFTUP}}$ signal nor the $\overline{\text{SHIFTDOWN}}$ signal from the PAL circuit 704 is active, the outputs of both the inverter 930 and the inverter 932 are low. Thus, neither the first relay 942 nor the second relay 946 is actuated, and the common contacts of both relays 942 and 946 are connected to their respective normally closed contacts. Thus, both terminals of the motor 238 are connected via the motor power lines 950 and 952 to the circuit ground reference. Since both motor terminals are at the same potential, no current flows in the motor 238 and it does not rotate.

When the $\overline{\text{SHIFTUP}}$ signal from the PAL circuit 704 is active low, the output of the inverter 930 is active high, causing current to flow through the current limiting resistor 940 to actuate the first relay 942. The common contact of the first relay 942 is connected to the normally open contact, thus connecting the first motor driver line 950 to the positive voltage source $V_{MOTOR}$. Since the second relay 946 remains unactuated, the second motor driver line 952 remains connected to the circuit ground reference. Thus, current will flow through the motor 238 from the first motor driver line 950 to the second motor driver line 952, causing the motor to rotate in a first direction corresponding to the direction required to cause the sprocket assembly 16 to shift up to a higher gear.

When the $\overline{\text{SHIFTDOWN}}$ signal from the PAL circuit 704 is active low, the output of the inverter 932 is active high, causing current to flow through the current limiting resistor 944 to actuate the second relay 946. The common contact of the second relay 946 is connected to the normally open contact, thus connecting the second motor driver line 952 to the positive voltage source $V_{MOTOR}$. Since the first relay 942 remains unactuated, the first motor driver line 950 remains connected to the circuit ground reference. Thus, current will flow through the motor 238 from the second motor driver line 952 to the first motor driver line 950 in the opposite direction as before, causing the motor to rotate in a second direction corresponding to the direction required to cause the sprocket assembly 16 to shift down to a lower gear.

Figure 41:
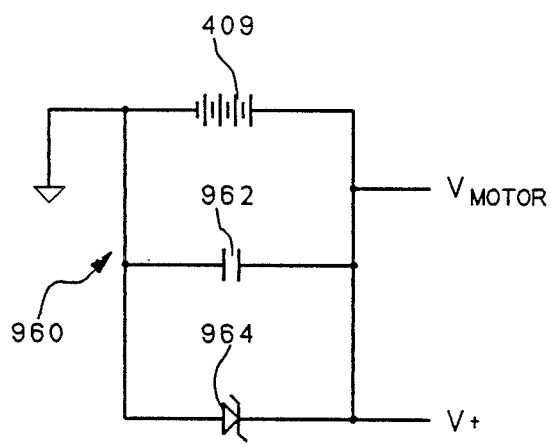
FIG. 41 is a schematic diagram of an exemplary noise filter that filters out electronic noise caused by the operation of the shifting motor.

The motor voltage $V_{MOTOR}$ may be supplied by the same battery 409 that is used to supply the power for the microprocessor 700 and other circuit components. Alternatively, the positive voltage source for the voltage $V_{MOTOR}$ may be a separate voltage source and is thus designated as $V_{MOTOR}$ to distinguish the voltage source from the voltage source $V^+$. In the preferred embodiment, the voltage $V_{MOTOR}$ is derived directly from the battery 409, and the voltage $V^+$ is filtered and clamped to reduce noised caused by the actuation of the shifting motor, as will be described hereinafter. FIG. 41 illustrates an exemplary noise filtering and clamping circuit 960 to provide this function. As illustrated, the voltage $V_{MOTOR}$ is provided by connecting directly to the positive terminal of the battery 409. The voltage $V^+$ is provided by filtering the battery voltage by a capacitor 962 and by clamping the voltage with a Zener diode 964 between the V+ output and the circuit ground reference. For example, the Zener diode 964 is advantageously a 6.2 volt Zener diode.

Returning again to FIG. 36, the operation of the PAL circuit 704 will now be described more fully. The first function of the PAL circuit is to generate the output signals A, B, C and D on the lines 750, 752, 754 and 756, respectively. In the preferred embodiment, the PAL circuit 704 is programmed with the following logic equations to provide the A, B, C and D outputs:

$$A = G1 + G3 + G5 + G7 + G9 + G11 \tag{1}$$

$$B = G2 + G3 + G6 + G7 + G10 + G11 \tag{2}$$

$$C = G4 + G5 + G6 + G7 \tag{3}$$

$$D = G8 + G9 + G10 + G11 \tag{4}$$

In the Equations (1)–(4) and the equations to follow, the symbol "+" is used to indicate the logical OR function. It can be seen that A is the least significant bit of the encoded output signals and that D is the most significant bit of the encoded outputs. The foregoing equations can be summarized as follows:

| ACTIVE INPUT | D | C | B | A |
|---|---|---|---|---|
| G1 | 0 | 0 | 0 | 1 |
| G2 | 0 | 0 | 1 | 0 |
| G3 | 0 | 0 | 1 | 1 |
| G4 | 0 | 1 | 0 | 0 |
| G5 | 0 | 1 | 0 | 1 |
| G6 | 0 | 1 | 1 | 0 |
| G7 | 0 | 1 | 1 | 1 |
| G8 | 1 | 0 | 0 | 0 |
| G9 | 1 | 0 | 0 | 1 |
| G10 | 1 | 0 | 1 | 0 |
| G11 | 1 | 0 | 1 | 1 |

Thus, the microprocessor 700 can monitor the A, B, C and D lines 760, 762, 764, and 766 and determine in which gear the sprocket assembly 16 is positioned. It should be understood that when the sprocket assembly is between gears, none of the eleven gear indicator output lines will be active and all of the A, B, C and D signal lines will have a logical "0" signal level (i.e., DCBA=0000)

The PAL circuit 704 generates the $\overline{\text{SHIFTUP}}$ and $\overline{\text{SHIFTDOWN}}$ signals from the SU and SD signals generated by the microprocessor 700 on the SU output line 780 and the SD output line 784, respectively. The $\overline{\text{SHIFTUP}}$ and $\overline{\text{SHIFTDOWN}}$ signals are generated in accordance with the following equations:

$$\overline{\text{SHIFTUP}} = !((SU \& !SD \& !G11)) \tag{5}$$

$$\overline{\text{SHIFTDOWN}} = !((SD \& !SU \& !G1)) \tag{6}$$

In the Equations (5) and (6) and the equations to follow, the exclamation symbol "!" is used to indicate negation or inversion and the ampersand symbol "&" is used to indicate the logical AND function. The $\overline{\text{SHIFTUP}}$ signal will be active low when the SU signal output from the microprocessor 700 is active high and both the SD signal and the G11 signal are inactive low. Thus, the $\overline{\text{SHIFTUP}}$ signal will not be generated if the microprocessor 700 somehow generates both the SU and SD signals at the same time. Furthermore, the $\overline{\text{SHIFTUP}}$ signal will not be generated if the sprocket assembly 16 is currently in the highest gear as indicated by the active G11 signal. In like manner, the $\overline{\text{SHIFTDOWN}}$ signal will only be activated when the SD signal is generated by itself and the G1 signal is inactive. Thus, it can be seen that the PAL circuit 704 prevents the present invention from attempting to shift above the highest gear or below the lowest gear.

The signal TVCC on the TVCC line 882 is generated within the PAL circuit 704 in accordance with the following equation:

$$TVCC = !(\overline{\text{SHIFTUP}} \oplus \overline{\text{SHIFTDOWN}}) \tag{7}$$

In the Equation (7) and the equation to follow, the symbol "⊕" indicates the exclusive-OR function. It can be seen from the equation, the TVCC signal will be active high until one or the other of the $\overline{\text{SHIFTUP}}$ signal or $\overline{\text{SHIFTDOWN}}$ signal, but not both, is active low. When only one of the $\overline{\text{SHIFTUP}}$ or $\overline{\text{SHIFTDOWN}}$ signals becomes active low, the TVCC signal line will become inactive to disable the supply voltage to the TIMER circuit 702, thus disabling the output TOUT of the TIMER circuit on the TOUT line 884. When both the respective $\overline{\text{SHIFTUP}}$ or $\overline{\text{SHIFTDOWN}}$ signal again becomes inactive, the TVCC signal line will become active to provide power to the TIMER circuit 702 so that the TIMER circuit 702 again generates the pulses 902 of the waveform 900 illustrated above in connection with FIG. 40.

The PAL circuit 704 also generates the $\overline{\text{RESET}}$ signal to the microprocessor 700 via the $\overline{\text{RESET}}$ signal line 740. The $\overline{\text{RESET}}$ signal is generated in accordance with the following equation:

$$\overline{\text{RESET}} = TOUT + (\overline{\text{SHIFTUP}} \oplus \overline{\text{SHIFTDOWN}}) \tag{8}$$

The $\overline{\text{RESET}}$ signal will be inactive high when the TOUT signal is high or when the $\overline{\text{SHIFTUP}}$ and $\overline{\text{SHIFTDOWN}}$ signals are different. Thus, the $\overline{\text{RESET}}$ signal will be active low only when the TOUT signal is low and both the $\overline{\text{SHIFTUP}}$ and the $\overline{\text{SHIFTDOWN}}$ signals are inactive (as set forth above, the $\overline{\text{SHIFTUP}}$ and $\overline{\text{SHIFTDOWN}}$ signals are precluded from being both active low at the same time). As further illustrated above, the TOUT signal is low approximately every 1.25 seconds while the TIMER circuit 702 is enabled by the TVCC signal on the TVCC line 882. Thus, when the TIMER circuit 702 is enabled, a $\overline{\text{RESET}}$ signal will be generated approximately every 1.25 seconds. The purpose for generating the periodic $\overline{\text{RESET}}$ signal will be discussed below.

Figure 42:
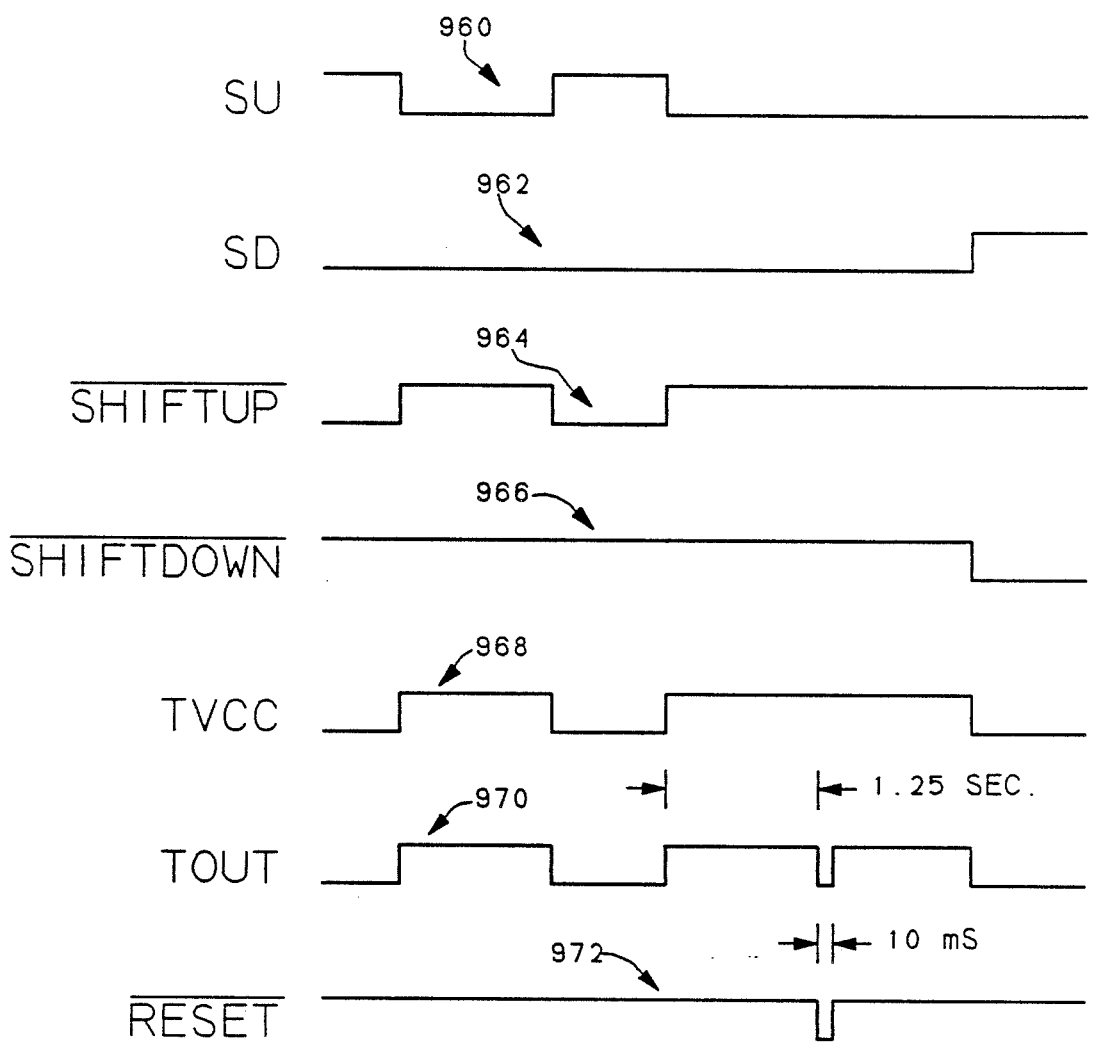
FIG. 42 illustrates graphs of waveforms generated by the PAL circuit and the TIMER circuit of FIG. 36 during the shift up and shift down operations.

The operation of the PAL circuit 704 and the TIMING circuit 702 in generating the $\overline{\text{SHIFTUP}}$ signal, the $\overline{\text{SHIFTDOWN}}$ signal, the TVCC signal, the TOUT signal and the $\overline{\text{RESET}}$ in response to the SU and SD signals from the microprocessor 700 are illustrated in FIG. 42 in which a first waveform 960 and a second waveform 962 represent the SU signal and the SD signal, respectively, generated by the microprocessor 700; a waveform 964 represents the $\overline{\text{SHIFTUP}}$ signal and a waveform 966 represents the $\overline{\text{SHIFTDOWN}}$ signal generated by the PAL circuit 704; a waveform 968 represents the TVCC signal generated by the PAL circuit 704; a waveform 970 represents the TOUT signal generated by the TIMER circuit 702; and a waveform 972 represents the $\overline{\text{RESET}}$ signal generated by the PAL circuit 704. As illustrated by the waveforms 960 and 964, when the SU signal, for example, is activated by the microprocessor 700, the $\overline{\text{SHIFTUP}}$ signal will become active low to drive the first relay 942. At the same time, the TVCC signal will become inactive, thus disabling the TIMER circuit 702 and causing the TOUT signal to become inactive low. Although the TOUT signal is inactive low, the $\overline{\text{RESET}}$ will not be generated because of the active SU signal. When the microprocessor 700 deactivates the SU signal, the TVCC signal will once again become active to enable the TIMER circuit 702 which causes the TOUT signal to return to its active high condition as the TIMER circuit 702 resumes its astable timing operation. The TOUT signal returns to its active high condition sufficiently fast to prevent the $\overline{\text{RESET}}$ signal from becoming inactive. If another SU signal becomes active within 1.25 seconds following the trailing edge of the first SU signal, then the same events occur. Similarly, if, as illustrated, an SD signal becomes active within 1.25 seconds following the second SU signal, similar events occur except that the $\overline{\text{SHIFTDOWN}}$ signal is generated rather than the $\overline{\text{SHIFTUP}}$ signal. If, on the other hand, neither a $\overline{\text{SHIFTUP}}$ nor a $\overline{\text{SHIFTDOWN}}$ signal is generated within 1.25 seconds of the most recent $\overline{\text{SHIFTUP}}$ or $\overline{\text{SHIFTDOWN}}$ signal, then the negative-going TOUT pulse will be generated by the TIMER circuit 702. As set forth above, the presence of a inactive TOUT pulse in combination with both the $\overline{\text{SHIFTUP}}$ signal and the $\overline{\text{SHIFTDOWN}}$ signal being inactive will cause the PAL circuit 704 to generate an active low $\overline{\text{RESET}}$ signal on the RESET line 740 to the microprocessor 700. The generation of the active RESET pulse every 1.25 seconds is a fail-safe mechanism that assures that noise on the power supply lines or other such cause cannot cause the microprocessor 700 to fail to continue executing its programmed instructions. In the event that no shifting occurs within 1.25 seconds, the active RESET pulse causes the microprocessor 700 to be reset to known initial conditions and begin execution of instructions from a known instruction address (e.g., 0000).

Description of An Exemplary Computer Program

Appendix A is a source listing for an exemplary computer program to control the microprocessor 700 in response to the A, B, C and D input signals on the lines 750, 752, 754 and 756 and in response to the $\overline{\text{TICK}}$ signal input on the $\overline{\text{TICK}}$ signal line 790. The instructions are described for an 8748 microprocessor. Similar instructions would be applicable for other microprocessors. The instruction addresses and the object codes are listed in hexadecimal notation (i.e., base 16). Since the instructions are stored in the PROM of the microprocessor 700, various instruction locations have been left at their unprogrammed values of 00 which correspond to no operations (NOP's) by the microprocessor 700 and can generally be ignored. An exemplary flow chart for the program is set forth in FIGS. 43A–43D.

Figure 43A:
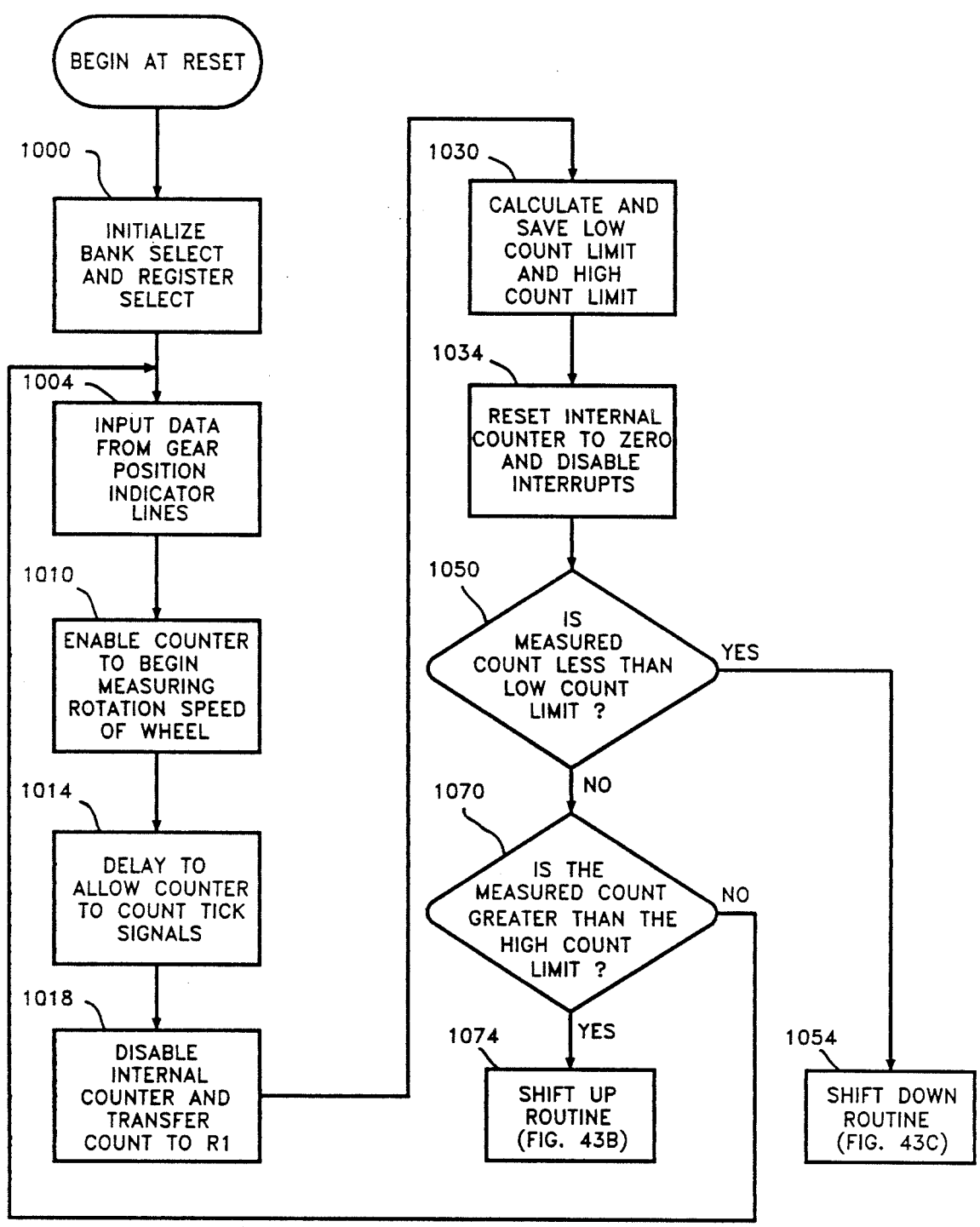
FIGS. 43A-43D illustrate a flow chart of an exemplary computer program that controls the operation of the microprocessor of FIG. 36.

As set forth above, the address location 0000 is the first location where program instruction begins when the microprocessor 700 is reset by the $\overline{\text{RESET}}$ signal. The first operations performed by the microprocessor 700, represented by an activity block 1000 in FIG. 43A, is to initialize its memory bank select and register select by selecting memory bank 0 and register bank 0. Thereafter, processing continues in an activity block 1004 wherein the microprocessor 700 inputs the data in the data bus input lines and thus inputs the values on the A, B, C and D signal lines 750, 752, 754 and 756. As set forth above, these signal lines encode the current gear position and can be any hexadecimal value of 0, 1, 2, 3, 4, 5, 6, 7, 8, 9, A or B, with the value of 0 indicating a position of the shifting mechanism between one of the fixed gear positions. The input value is stored in an internal register R0.

After inputting the current gear position in the activity block 1004, the microprocessor 700 begins executing the instructions associated with an activity block 1010 wherein it begins to measure the current rotational speed of the rear wheel 14. This is accomplished in the activity block 1010 by enabling the internal counter of the microprocessor 700 to count the high-to-low going edges of the $\overline{\text{TICK}}$ signal on the $\overline{\text{TICK}}$ signal line 790. After enabling the internal counter, the microprocessor 700 begins executing the instructions associated with an activity block 1014 wherein it delays for a fixed amount of time (e.g., one sixth of a second) by executing a trio of nested counting loops using the internal registers R4, R3 and R2 in a conventional manner. After delaying for the fixed amount of time, the microprocessor enters an activity block 1018 wherein it disables the internal counter from receiving any further counts from the $\overline{\text{TICK}}$ signal and then transfers the accumulated count to the accumulator and then to the internal register R1. The accumulated count stored in the register R1 will be referred to herein as the current count. It should be understood that the current count is a multiple of the current wheel rotational velocity.

After saving the accumulated count in the register R1, the microprocessor 700 begins executing the instructions associated with an activity block 1030 wherein it calculates the low limit and high limit of the $\overline{\text{TICK}}$ count range associated with the current gear position. In the present embodiment, the low limit of the $\overline{\text{TICK}}$ count ranges is calculated by multiplying the current gear position by 3 and adding 32; and the high limit of the $\overline{\text{TICK}}$ count range is calculated by multiplying the current gear position and adding 36 to provide the following $\overline{\text{TICK}}$ count ranges for each gear position:

| GEAR POSITION | COUNT RANGE |
| --- | --- |
| G1 | 35–40 |
| G2 | 38–44 |
| G3 | 41–48 |
| G4 | 44–52 |
| G5 | 47–56 |
| G6 | 50–60 |
| G7 | 53–64 |
| G8 | 56–68 |
| G9 | 59–72 |
| G10 | 62–76 |
| G11 | 65–80 |

The foregoing $\overline{\text{TICK}}$ count ranges are selected so that the cyclist will be pedalling within a cadence range of approximately 65–75 revolutions per minute for each gear. For many cyclists, this cadence range provides a reasonable compromise between speed and pedalling effort for an efficient utilization of the energy expended in pedalling. For other cyclists, such as professional or Olympic caliber riders, a higher cadence may be appropriate, and corresponding higher high and low limits for the $\overline{\text{TICK}}$ count range can be programmed into the microprocessor 700 for such cyclists.

It can be seen that the $\overline{\text{TICK}}$ count ranges for each gear position overlap to prevent unnecessary changes of gears where the $\overline{\text{TICK}}$ count is varying in a range that is suitable for either of two gears. The calculated low $\overline{\text{TICK}}$ count limit is stored in the internal register R2 and the calculated high $\overline{\text{TICK}}$ count limit is stored in the internal register R3.

After storing the calculated $\overline{\text{TICK}}$ count limits, the internal counter is reset to zero and all interrupts are disabled in an activity block 1034. Thereafter, the microprocessor 700 begins executing the instructions associated with a decision block 1050 wherein it compares the calculated low $\overline{\text{TICK}}$ count limit with the measured $\overline{\text{TICK}}$ count stored in the register R1. If the measured $\overline{\text{TICK}}$ count is less than the calculated low $\overline{\text{TICK}}$ count limit, then the current gear is too high and the program branches to a shift down routine that begins in an activity block 1054, and which will be described below.

If, on the other hand, the measured $\overline{\text{TICK}}$ count is greater than the low $\overline{\text{TICK}}$ count limit, it cannot yet be determined whether the $\overline{\text{TICK}}$ count is too high or within the acceptable range. Thus, the program branches from the decision block 1050 to a decision block 1070 wherein the calculated high $\overline{\text{TICK}}$ count limit is compared with the measured $\overline{\text{TICK}}$ count. If the measured $\overline{\text{TICK}}$ count is higher than the calculated high $\overline{\text{TICK}}$ count limit, then the program branches to a shift up routine in an activity block 1074, which will be described below in connection with FIG. 43B.

On the other hand, if the measured $\overline{\text{TICK}}$ count is less than the calculated high $\overline{\text{TICK}}$ count limit, then the measured $\overline{\text{TICK}}$ count is within the calculated $\overline{\text{TICK}}$ count range for the current gear position and no shift is necessary. The program branches from the decision block 1070 back to the activity block 1004 where it again causes the microprocessor 700 to input the current gear position and to initiate the routine for measuring the current $\overline{\text{TICK}}$ count.

Figure 43B:
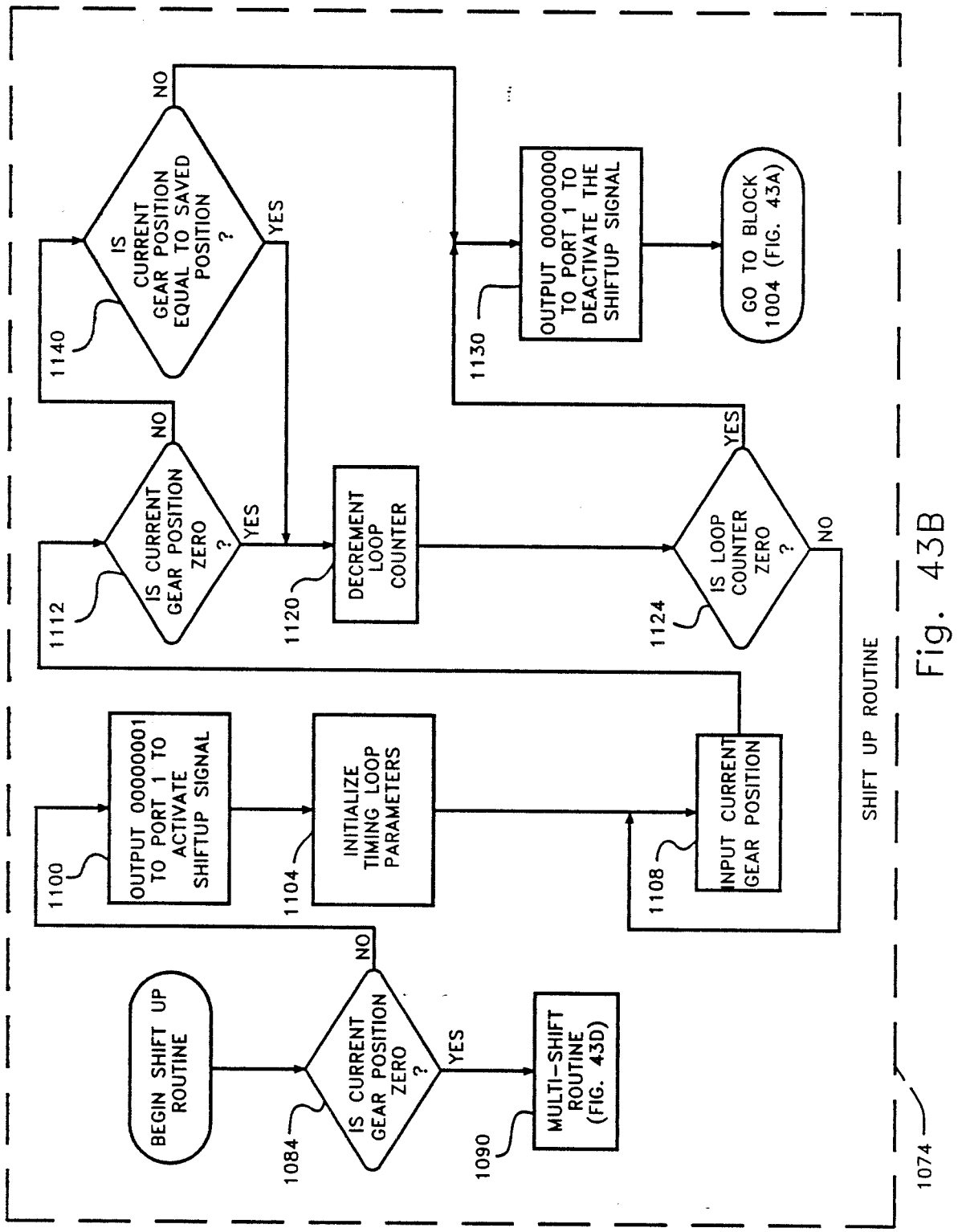

The activity block 1074 corresponding to the shift up routine is illustrated in more detail in FIG. 43B. The first operation within the activity block 1074 is a decision block 1084 wherein the stored current gear position is compared to zero. If the current gear position is zero, indicating that the shifting mechanism is between two gears, then the microprocessor 700 is caused to branch to an activity block 1090 wherein a multi-shift routine is executed. The multi-shift routine will be described later in connection with FIG. 43D. If the current gear position is not 0, then the microprocessor 700 executes the instructions in an activity block 1100 wherein it outputs a value of $(00000001)_2$ to port 1, which has the effect of causing a high logic level on the P10 output connection and thus causing a high logic level on the SU signal line 780 to the PAL circuit 704. As discussed above, a high level signal on the SU signal line 780 has the effect of causing the motor 238 (FIG. 36) to rotate in a first direction to cause the shifting mechanism to shift up.

In order to determine whether the shifting operation occurs, the program sets up a nested timing loop by initializing the registers R4, R3 and R2 with timing values in an activity block 1104. The register R4 is an outer loop counter which is decremented each time both inner loop counters, the registers R3 and R2, are equal to zero. The three registers can be considered together as one large loop counter. After setting the loop counters, the microprocessor 700 begins executing instructions in an activity block 1108 wherein it inputs the current gear position as represented by the A, B, C and D signals on the signal lines 750, 752, 754 and 756. Thereafter, the microprocessor 700 executes the instructions corresponding to a decision block 1112 wherein it compares the current gear position to 0 to determine whether the shifting operation has succeeded in shifting from the previous gear position to a position between gears. If the current gear position is 0, the program branches from the decision block 1112 to an activity block 1120 wherein the loop counter, comprising the registers R4, R3 and R2, is decremented. In a decision block 1124, the loop counter is compared to zero to determine whether a sufficient amount of time has been allowed for completion of the shift operation. If the loop counter is not equal to zero, the program branches back to the activity block 1108 and then to the decision block 1112 where it again checks the gear position to determine whether it is equal to zero. It should be understood that the nested inner loop counters will be reset to their initial values each time they reach zero until the outer loop counter reaches zero.

If the loop counter is equal to zero, then the shifting operation will be stopped irrespective of whether it was successful by causing the microprocessor to execute the instructions in an activity block 1130 wherein a value of $(00000000)_2$ is output to the port 1 to cause the SU signal on the SU signal line 780 to return to its inactive state, thus causing the motor 238 to stop rotating. Thereafter, the program branches back to the activity block 1004 where the microprocessor 700 again inputs the current gear position and resumes the processes described above.

Returning again to the decision block 1112, if the current gear position is not zero to indicate that the shifting mechanism is between gears, the program branches to a decision block 1140 wherein the current gear position is compared to the gear position stored in the register R0 to determine whether the gear position has moved since the shift up operation began. If the gear position is the same, the program branches to the activity block 1120 where the loop counter is decremented and then to the decision block 1124 wherein the loop counter is compared to zero. If the loop counter is not zero, the program again branches to the activity block 1108 where the microprocessor 700 resumes checking the current gear position and comparing it to the stored gear position. If the loop counter is equal to zero, the program branches to the activity block 1130 wherein the microprocessor 700 outputs the $(00000000)_2$ value on the port 1 to disable the SU signal on the signal line 780 and then branches to the activity block 1004 wherein it resumes checking as described above. In the present embodiment, the loop counter is set up to provide a delay of approximately 3.1 seconds.

Returning again to the decision block 1140, if the current gear position is different from the gear position stored in the register R0, then the program branches directly to the activity block 1130 wherein the microprocessor 700 outputs the $(00000000)_2$ value on the port 1 to disable the SU signal on the signal line 780 and then branches to the activity block 1004 to resume checking as described above.

Figure 43C:
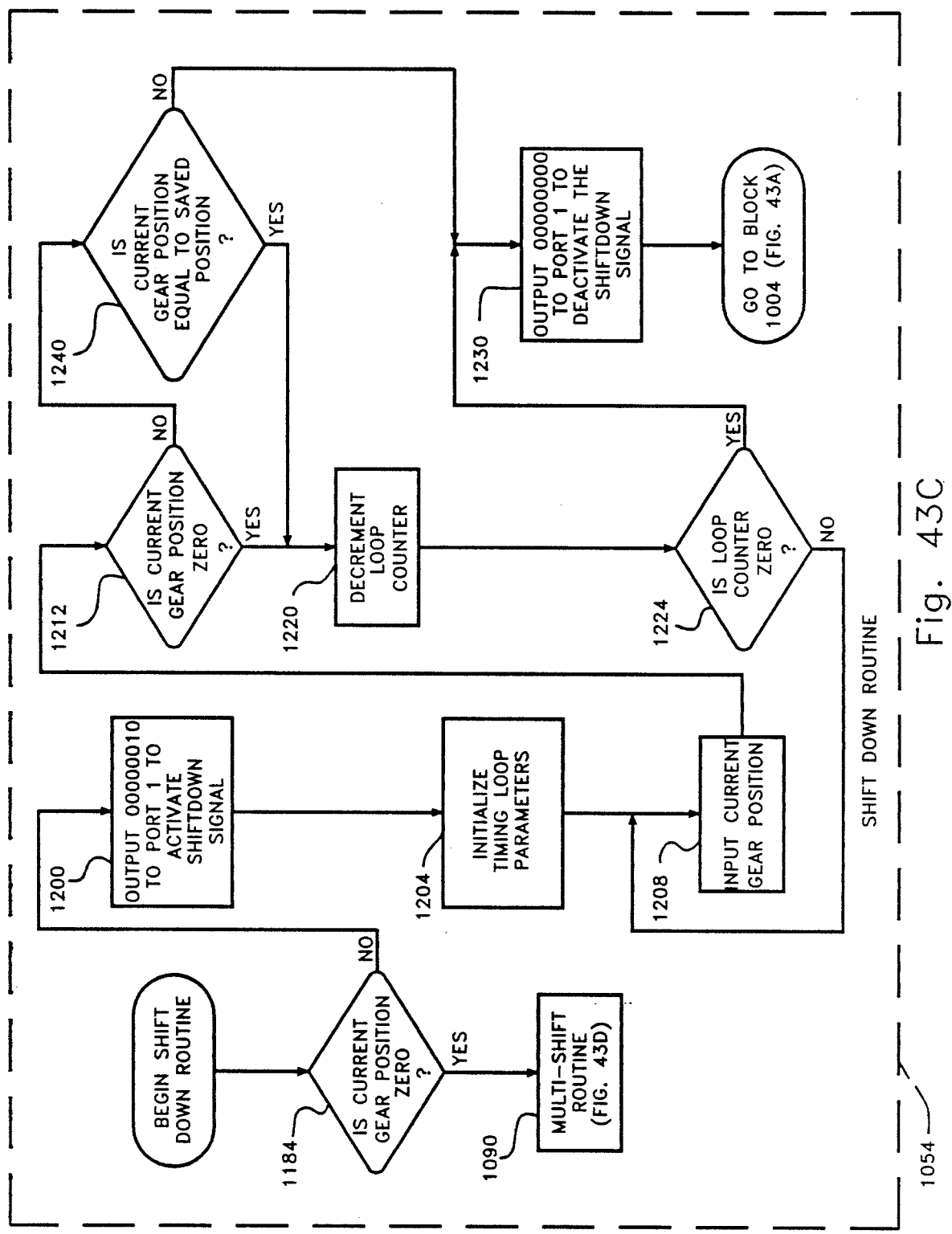

Referring now to the activity block 1054 in FIG. 43C, it can be seen that the shift down operation corresponds to the shift up operation except that the microprocessor 700 is caused to output a value $(00000010)_2$ on the port 1 to cause the SD signal line 782 to become active. Thus, the first operation within the activity block 1054 is a decision block 1184 wherein the microprocessor 700 compares the stored current gear position to zero. If the current gear position is zero, indicating that the shifting mechanism is between two gears, then the microprocessor 700 is caused to branch to the activity block 1090 wherein a multi-shift routine is executed. If the current gear position is not 0, then the microprocessor 700 begins executing the instructions in an activity block 1200 wherein it outputs a value of $(00000010)_2$ to port 1, which has the effect of causing a high logic level on the P11 output connection and thus causing a high logic level on the SD signal line 782 to the PAL circuit 704. As discussed above, a high level signal on the SD signal line 782 has the effect of causing the motor 238 (FIG. 36) to rotate in a second direction to cause the shifting mechanism to shift down.

In order to determine whether the shifting operation occurs, the program sets up a nested timing loop by initializing the registers R4, R3 and R2 with timing values in an activity block 1204. After setting the loop counters, the microprocessor 700 begins executing instructions corresponding to an activity block 1208 wherein it inputs the current gear position as represented by the A, B, C and D signals on the signal lines 750, 752, 754 and 756. Thereafter, the microprocessor 700 executes the instructions corresponding to a decision block 1212 wherein it compares the current gear position to 0 to determine whether the shifting operation has succeeded in shifting from the previous gear position to a position between gears. If the current gear position is 0, the program branches from the decision block 1212 to an activity block 1220 wherein the loop counter is decremented. In a decision block 1224, the loop counter is compared to zero to determine whether a sufficient amount of time has been allowed for completion of the shift operation. If the loop counter is not equal to zero, the program branches back to the activity block 1208 and the decision block 1212 where it again checks the gear position to determine whether it is equal to zero.

If the loop counter is equal to zero, then the shifting operation will be stopped irrespective of whether it was successful by causing the microprocessor 700 to begin executing instructions in an activity block 1230 wherein a value of $(00000000)_2$ is output to the port 1 to cause the SD signal on the SD signal line 782 to return to its inactive state, thus causing the motor 238 to stop rotating. Thereafter, the program branches back to the activity block 1004 (FIG. 43A) where the microprocessor 700 again inputs the current gear position and resumes the processes described above. In the present embodiment, the loop counter is set up to provide a delay of approximately 3.1 seconds.

Returning again to the decision block 1212 in FIG. 43C, if the current gear position is not zero to indicate that the shifting mechanism is between gears, the program branches to a decision block 1240 wherein the current gear position is compared to the gear position stored in the register R0 to determine whether the gear position has moved since the shift down operation began. If the gear position is the same, the program branches to the activity block 1220 where the loop counter is decremented and then to the decision block 1224 wherein the loop counter is compared to zero. If the loop counter is not zero, the program again branches to the activity block 1208 where the microprocessor 700 resumes checking the current gear position and comparing it to the stored gear position. If the loop counter is equal to zero, the program branches to the activity block 1230 wherein the microprocessor 700 outputs the $(00000000)_2$ value on the port 1 to disable the SD signal on the signal line 782 and then branches to the activity block 1004 wherein it resumes checking as described above.

Returning again to the decision block 1240, if the current gear position is different from the gear position stored in the register R0, then the program branches directly to the activity block 1230 wherein the microprocessor 700 outputs the $(00000000)_2$ value on the port 1 to disable the SD signal on the signal line 782 and then branches to the activity block 1004 to resume checking as described above.

Figure 43D:
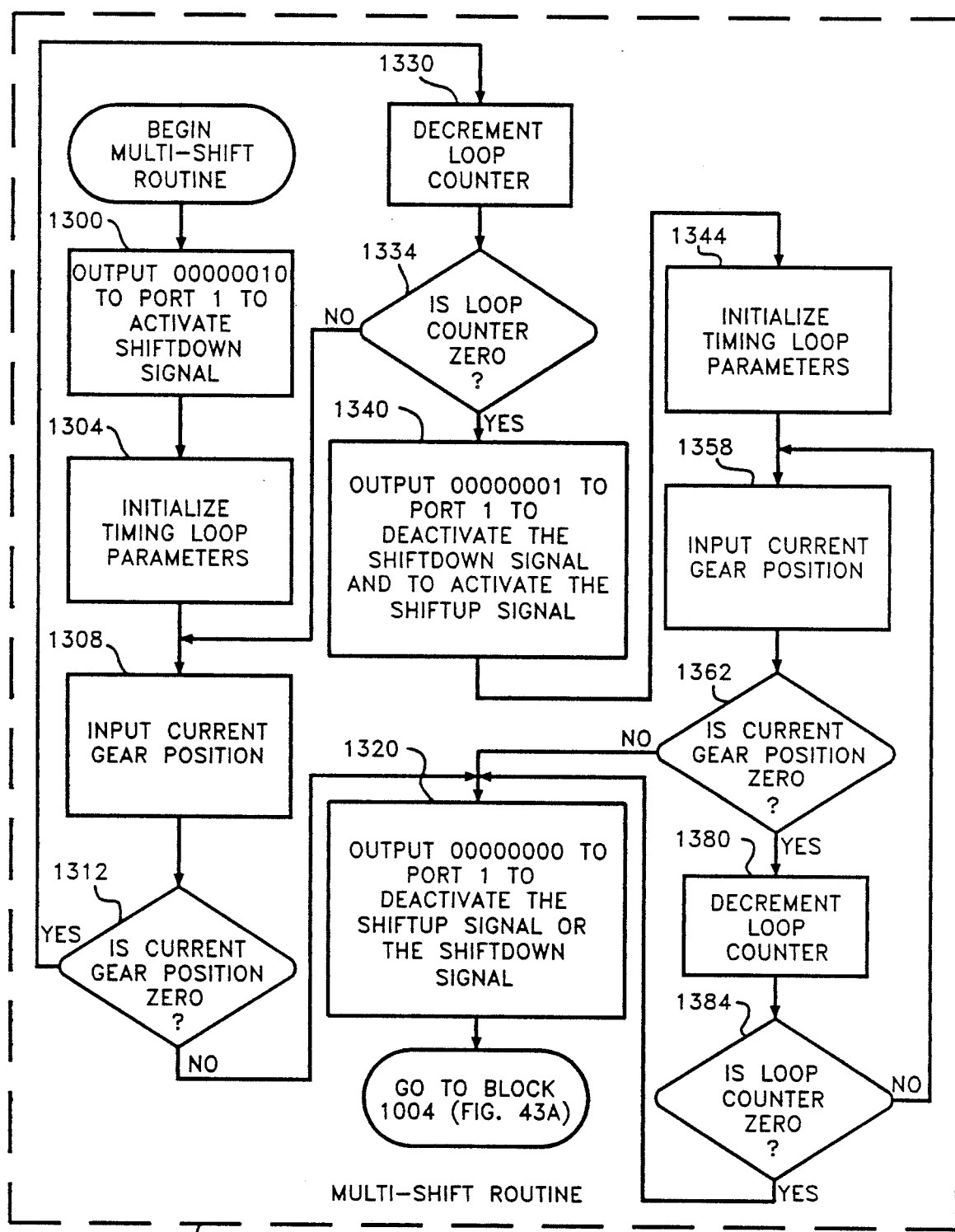

Referring now to the activity block 1090 in FIG. 43D, the instructions that are executed in the multi-shift routine will be discussed. This routine is entered if the microprocessor 700 determines that the current gear position is 0 when it enters either the shift up routine or the shift down routine described above. This may happen for instance if the motor 238 is unable to move the shifting mechanism from one gear position to the next gear position within the allocated time duration. Although this should not ordinarily occur, the multi-shift routine allows for the possibility and corrects for it.

Within an activity block 1300 in the multi-shift activity block 1090, the microprocessor 700 is caused to output a value of $(00000010)_2$ to the port 1 to initiate a shift down operation and thus start the rotation of the motor 238 in the direction to cause the shifting mechanism to shift down. Thereafter, the program enters an activity block 1304 wherein the loop counters are set up as before. Then the program enters an activity block 1308 wherein the A, B, C and D data signals on the lines 750, 752, 754 and 756 corresponding to the current gear position are input. Thereafter, in a decision block 1312, the current gear position is compared to zero to determine whether the shift down operation has moved the shifting mechanism to a known gear position If the current gear position is not zero, the program branches to an activity block 1320 wherein a value of $(00000000)_2$ is output to the port 1 to disable the SD signal and thus stop the rotation of the motor 238. Thereafter, the program branches back to the activity block 1004 where the above described process resumes.

Returning to the decision block 1312, if the current gear position is zero, the program enters an activity block 1330 wherein the loop counter is decremented. Thereafter, in a decision block 1334, the loop counter is compared to zero to determine whether all the inner and outer loop registers have been decremented to zero. If the loop counter is not equal to zero, program execution resumes with the activity block 1308 where the microprocessor 700 again inputs the current gear position. On the other hand, if the loop counter is equal to zero, program execution resumes in an activity block 1340. In the present embodiment, the loop counter is set up to provide a delay of approximately 3.1 seconds.

In the activity block 1340, the microprocessor 700 is caused to output a value $(00000001)_2$ to the port 1 which has the effect of returning the SD signal line 782 to its inactive low logic level and of switching the SU signal line 780 to its active high logic level to cause the motor 238 to rotate in the direction to cause the shifting mechanism to shift up. Thereafter, the program enters an activity block 1344 wherein the loop counters are set up as discussed above. Then the program enters an activity block 1358 wherein the A, B, C and D data signals on the lines 750, 752, 754 and 756 corresponding to the current gear position are input. Thereafter, in a decision block 1362, the current gear position is compared to zero to determine whether the shift up operation has moved the shifting mechanism to a known gear position. If the current gear position is not zero, the program branches to the activity block 1320 wherein a value of $(00000000)_2$ is output to the port 1 to disable the SU signal and thus stop the rotation of the motor 238. Thereafter, the program branches back to the activity block 1004 where the above described process resumes.

Returning to the decision block 1362, if the current gear position is zero, the program enters an activity block 1380 wherein the loop counter is decremented. Thereafter, in a decision block 1384, the loop counter is compared to zero to determine whether all the inner and outer loop registers have been decremented to zero. If the loop counter is not equal to zero, program execution resumes with the activity block 1358 wherein the microprocessor 700 again inputs the current gear position. On the other hand, if the loop counter is equal to zero, program execution falls through to the activity block 1320 wherein a value of $(00000000)_2$ is output to the port 1 to disable the SU signal and thus stop the rotation of the motor 238. Thereafter, the program branches back to the activity block 1004 where the above described process resumes.

Although the microprocessor 700 may not succeed in causing the shifting mechanism to shift from one gear to another gear in one operation, the multi-shift routine described above assures that the microprocessor 700 will continue trying to cause the shifting mechanism to reach a known gear position. Thus, the multi-shift routine is provided as a fail-safe mechanism for assuring that the invention continues to operate, even if irregularities in the power supply cause a temporary disruption of the operation of the electronic circuitry.

The TIMER circuit 702 is also provided as a fail-safe mechanism. In the event that the microprocessor 700 begins operating instructions that are not within the programmed portion of its internal PROM, it is likely that the microprocessor 700 will likely enter one of the following states:

(1) The microprocessor 700 will not activate either the SU signal or the SD signal for an extended amount of time;

(2) The microprocessor 700 will activate the SU signal at the same time as the SD signal; or (3) The microprocessor 700 will activate the SD signal when the G1 gear position indicator signal is active or will activate the SU signal when the G11 gear position indicator signal is active.

It can be seen from the Equation (7) above, that the PAL circuit 704 will not deactivate the TVCC signal on the TVCC signal line 882 unless one and only one of the $\overline{\text{SHIFTUP}}$ and the $\overline{\text{SHIFTDOWN}}$ signals is generated. Thus, the TVCC signal will not be deactivated if condition (1) occurs or condition (2) occurs. Furthermore, from the Equations (5) and (6), it can be seen that the $\overline{\text{SHIFTUP}}$ and the $\overline{\text{SHIFTDOWN}}$ signals will not be generated if condition (3) occurs. Thus, the TVCC signal will not be deactivated if condition (3) occurs. If the TVCC signal is not deactivated within 1.25 seconds, the TIMER circuit 702 will time out and generate the negative-going pulse 902 on the TOUT signal line 884, illustrated in FIG. 40. Since This has the effect of generating an active low $\overline{\text{RESET}}$ pulse on the $\overline{\text{RESET}}$ signal line 740, which in turn causes the microprocessor 700 to be reset to resume normal operation. It can be further seen that the present invention has the advantage that the PAL circuit 704 will not generate an active $\overline{\text{SHIFTUP}}$ signal or an active $\overline{\text{SHIFTDOWN}}$ signal if any one of conditions (1), (2) or (3) occurs.

Description of an Alternative Embodiment with a Strain Gauge

Figure 44:
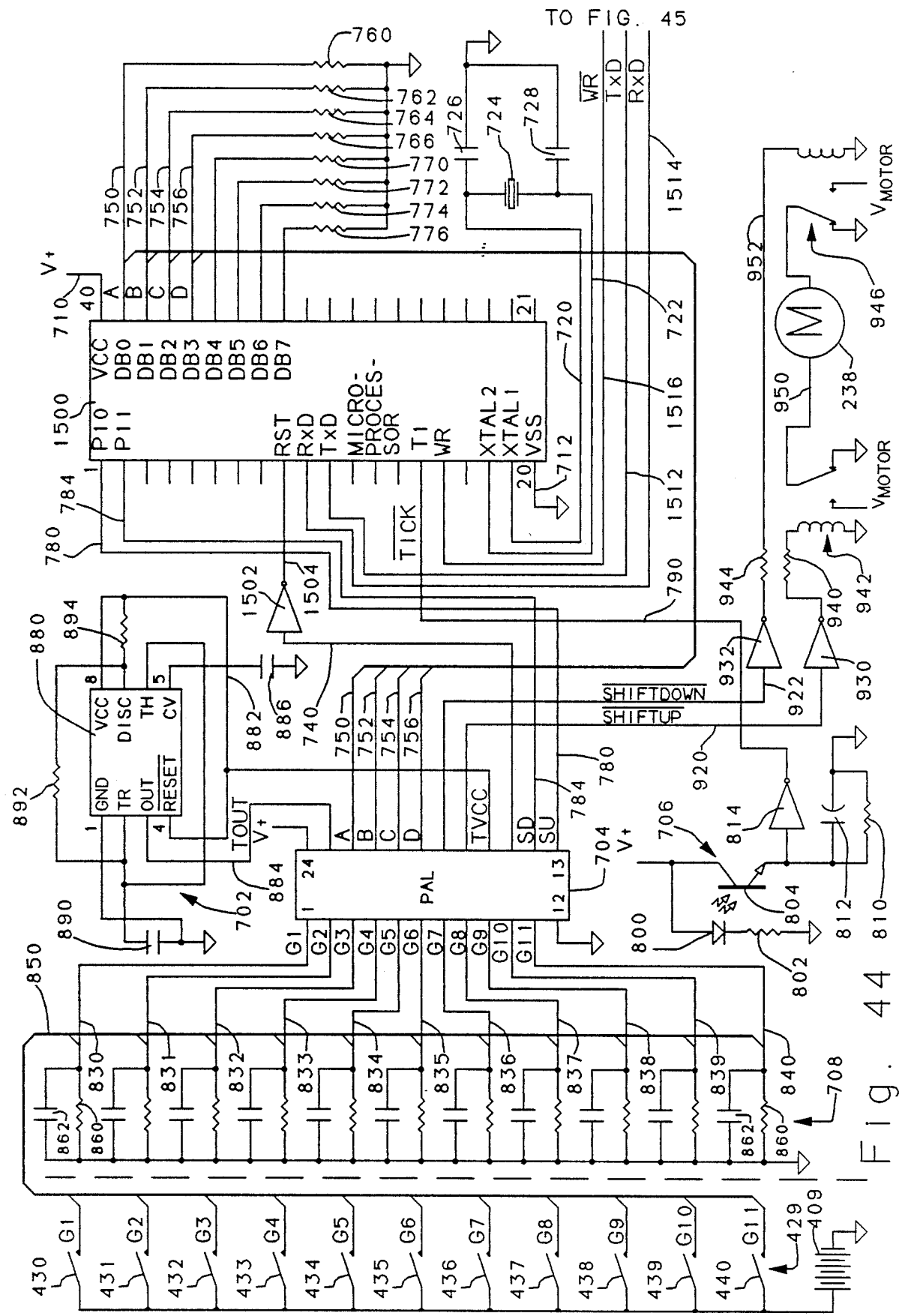
FIG. 44 is a schematic diagram of an alternative embodiment of a microprocessor-controlled automatic transmission control circuit that includes a strain gauge circuit for sensing the strain applied to the chain.

An alternative embodiment of the present invention is illustrated in FIG. 44. The embodiment of FIG. 44 is similar to the embodiment of FIG. 36 except that the embodiment of FIG. 44 includes a microprocessor 1500 in place of the microprocessor 700 of FIG. 36. As set forth above, the microprocessor 700 is advantageously an 8748 microprocessor, or the like. Alternatively, the microprocessor 700 can be an 87C51 microprocessor, available from Intel Corporation, or the like. The 87C51 microprocessor is similar to the 8748 microprocessor described above in that it has an internal PROM memory that can be programmed by the user. The pin configuration of the 87C51 differs from the 8748 and is reflected in FIG. 44. Only those pins pertinent to the embodiment of FIG. 44 are shown in detail. The connections between the 87C51 microprocessor 1500 are similar to the connections to the 8748 microprocessor 700 of FIG. 36 and like numbers in FIG. 44 designate the same elements as before. In the embodiment of FIG. 44, the $\overline{\text{RESET}}$ signal on the $\overline{\text{RESET}}$ signal line 740, is provided as an input to an inverter 1502. The output of the inverter 1502 is an active high RESET signal on a line 1504 that is provided to the reset (RST) input connector (pin 9) of the microprocessor 1500 to satisfy the requirements of the 87C51 microprocessor.

The 87C51 is advantageously used in this particular embodiment of the invention because it includes a programmable full-duplex serial input and output channel. The serial input and output channel comprises a transmit output signal on a TxD output connector (pin 11) and a receive input signal on an RxD input connector (pin 10). The present embodiment also utilizes the write enable signal on a $\overline{\text{WR}}$ output connector (pin 16).

The transmit output signal from the TxD connector is connected to a strain gauge circuit 1510 via a TxD signal line 1512. Similarly, the receive input signal to the RxD connector is connected to the strain gauge circuit 1510 via a RxD signal line 1514. The write enable signal from the $\overline{\text{WR}}$ output connector is connected to the strain gauge circuit 1510 via a $\overline{\text{WR}}$ signal line 1516.

Figure 45:
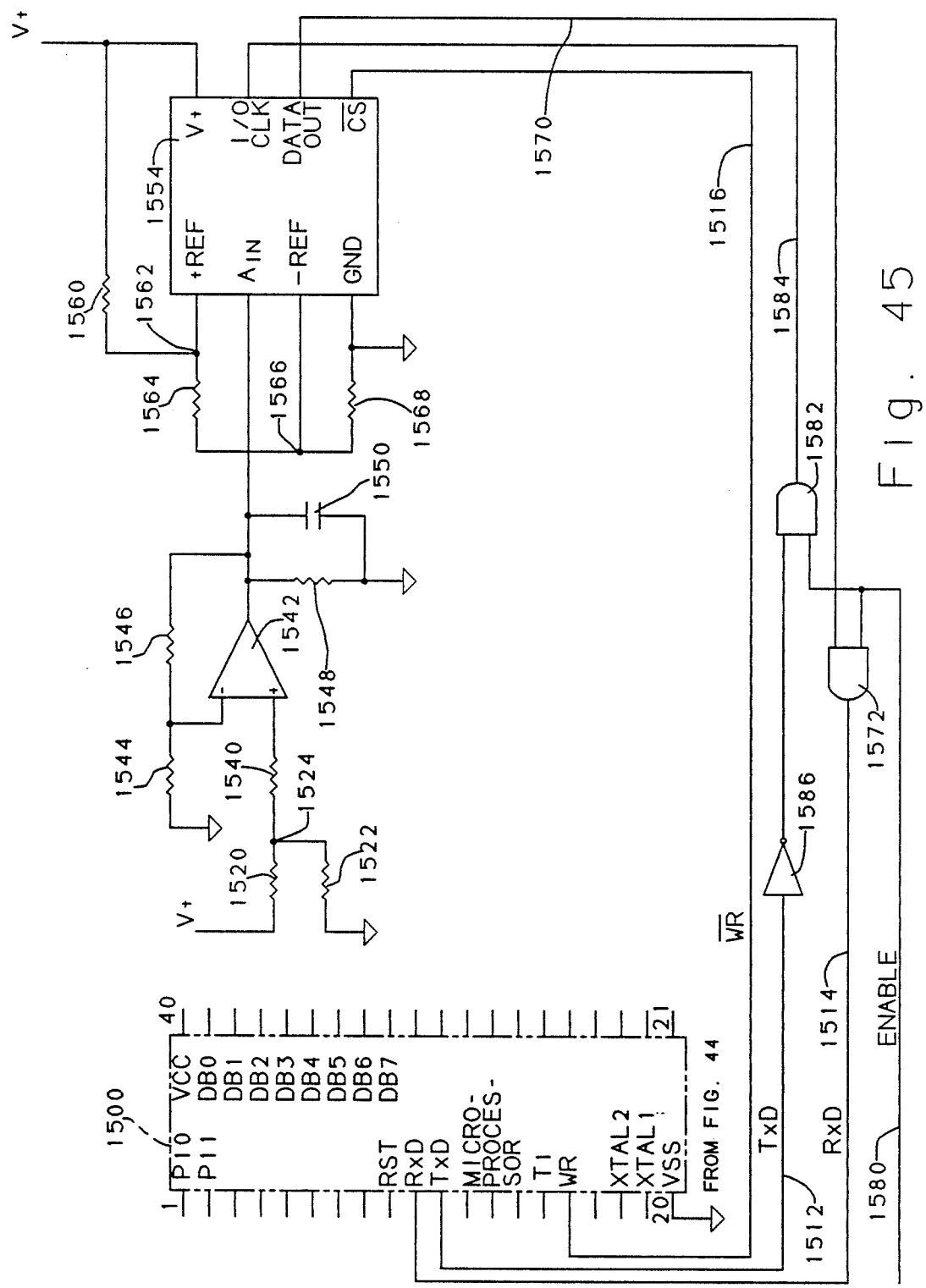
FIG. 45 is a schematic diagram of the strain gauge circuit used in combination with the circuit of FIG. 44.

The strain gauge circuit 1510 is shown in more detail in FIG. 45. As illustrated, the strain gauge circuit 1510 includes a voltage divider network comprising a fixed resistor 1520 in series with a strain sensitive resistor 1522 at a node 1524. The series combination of the two resistors 1520 and 1522 is connected between the positive voltage supply V+ and the circuit ground reference. The fixed resistor 1520 has a nominal value of approximately 5000 ohms. The strain sensitive resistor 1522 has a nominal value of 110 ohms so that the voltage at the common node 1524 is approximately 2 percent of the supply voltage. The voltage at the common node 1524 will vary in accordance with the strain applied to the strain sensitive resistor 1522. When the resistance of the strain sensitive resistor 1522 increases, the voltage at the common node 1524 will increase and vice versa.

In the preferred embodiment, the strain sensitive resistor 1522 is mechanically connected to sense the strain applied to the chain between the front sprocket and the rear sprocket. For example, an exemplary placement for the strain sensitive resistor 1522 is illustrated in FIGS. 46-48, which illustrate the mounting of the rear wheel 14 and the sprocket assembly 16' in accordance with this aspect of the present invention. The sprocket assembly 16' is constructed in accordance with the previously described sprocket assembly 16 and is mounted in a similar manner as was previously described in connection with FIG. 7. In FIGS. 46-48, components corresponding to the components of FIG. 7 are numbered with the same numbers. Although the mounting of the sprocket assembly 16' and rear wheel 14 in FIGS. 46-48 is similar to the mounting in FIG. 7, it should be noted that the sprocket axle 292 and the axle bolt 304 are not frictionally engaged with the frame 156 on the drive side of the wheel 14. Rather, the sprocket axle 292 is allowed to move freely within the wheel mounting slot 1530 provided in the frame 156 by not tightening the nut 306 as in the conventional mounting procedure. Thus, the sprocket axle 292 would be free to move forward in the wheel mounting slot 1530 in the frame 156 with its rearward motion blocked by the terminus of the wheel mounting slot 1530. However, the forward motion of the sprocket axle 292 is blocked by an axle strap 1531 which includes a hole 1532 through which the sprocket axle 292 passes and is secured therein. The axle strap 1531 further includes an elongated portion 1533 which is terminated with a right-angled end portion 1534, having a threaded hole therein for receiving an adjustment screw 1535. The axle strap 1531 is positioned on the frame 156 in alignment with the mounting slot 1530 in the frame. The free end of the adjustment screw 1535 is abutted against one end of a calibrated compression member 1536 which has its other end abutted against the rear portion of the frame 156.

It can be seen that the force of the drive chain against the rear sprocket will tend to pull the entire sprocket assembly 16' forward in the wheel mounting slot 1530. The forward motion of the sprocket assembly 16' is blocked by the action of the end portion 1534 of the axle strap 1531 against the compression member 1536 and the action of the compression member 1536 against the frame 156. Thus, the force applied to the chain is applied through the compression member 1536 and causes a small, but detectable compressive strain in the compression member 1536. This strain is detected by the strain resistor 1522 which is securely mounted to the compression member by a suitable bonding material so that the strain resistor 1522 moves in response to the application and release of the strain on the compression member. The strain resistor 1522 is interconnected with the strain gauge circuit 1510 of FIG. 45 via a pair of interconnection wires 1538. The strain resistor 1522 operates in a conventional manner such that the longitudinal movement of the strain resistor 1522 caused by the compression and expansion of the compression member 1536 causes changes in the resistance of the strain resistor 1522. These changes in the resistance of the strain resistor 1522 are detected as changes in the voltage at the common node 1524 of the strain gauge circuit 1510, as discussed above.

Returning to FIG. 45, the common node 1524 is electrically connected via a series resistor 1540 to the noninverting input to an operational amplifier 1542, which in the embodiment described herein is a commercially available μA741 operational amplifier available from National Semiconductor, or the like. The inverting input of the operational amplifier 1542 is connected to the circuit ground reference via a biasing resistor 1544. In addition, the inverting input of the operational amplifier 1542 is connected to the output of the operational amplifier 1542 via a feedback resistor 1546. In the preferred embodiment, the values of the series resistor 1540, the biasing resistor 1544 and the feedback resistor 1546 are selected to provide a gain through the operational amplifier of approximately 21. For example, the series resistor 1540 and the biasing resistor 1544 advantageously have resistances of approximately 5000 ohms, and the feedback resistor 1546 advantageously has a resistance of approximately 100,000 ohms. The output voltage from the operational amplifier 1542 across the load resistor 1540 is approximately 21 times the voltage on the common node 1524 and is thus responsive to the strain applied to the strain responsive resistor 1522. The output of the operational amplifier 1542 is connected to one terminal of a load resistor 1548 which has its second terminal connected to the circuit ground reference. A filter capacitor 1550 is connected across the load resistor 1548 to filter out transient variations in the output voltage of the operational amplifier 1542 so that output voltage changes in response to sustained changes in the strain applied to the compression member 1536, rather than intermittent strain changes caused by small variations in the pedalling effort.

The output voltage from the operational amplifier 1542 is applied to the analog input ("$A_{IN}$") to an analog-to-digital converter ("ADC") 1554, which, in the preferred embodiment, is a TLC548 commercially available from Radio Shack ®, or the like. The TLC548 ADC 1554 is a serial analog-to-digital converter that samples the analog voltage on the analog input and provides an 8-bit serial output that comprises a digital representation of the analog input. In order to digitize the analog input, the ADC 1554 has a high voltage reference input ("+REF") and a low voltage reference input ("−REF"). A pair of reference voltages are provided to the two reference voltage inputs by a voltage divider network comprising a first voltage divider resistor 1560 connected between the positive supply voltage V+ and a first reference node 1562; a second voltage divider resistor 1564 connected between the first reference node 1562 and a second reference node 1566; and a third voltage divider resistor 1568 connected between the second reference node and the circuit ground reference. In the preferred embodiment, the first voltage divider resistor 1560, the second voltage divider resistor 1564 and the third voltage divider resistor 1568 advantageously have resistances of approximately 4000 ohms, 470 ohms and 100 ohms, respectively. For these resistance values, the voltage at the first reference node 1562 and thus the high voltage reference +REF is approximately 0.62 volts, and the voltage at the second reference node 1566 and thus the low voltage reference −REF is approximately 0.11 volts.

The ADC 1554 generates a serial digital output signal from an output connection ("OUT"). In the particular ADC 1554 used herein, the serial digital output signal is provided with the least significant first, followed serially by the next least significant bit and so on to the most significant of the eight bits. The output connection OUT is connected via a line 1570 to a first input of a two-input AND-gate 1572. The output of the AND-gate 1572 is the serial output of the strain gauge circuit 1510 and is connected to the RxD input of the microprocessor 1500 via the RxD signal line 1514. A second input of the AND-gate 1572 is connected an ENABLE signal line 1580, which is connected to a switch (not shown) on a display panel (not shown). The switch can be selectively activated to selectively enable or disable the strain gauge processing function to be described hereinafter.

The ADC 1554 further includes a clock input connection ("I/O CLK") that controls the rate at which the ADC 1554 transmits the serial data on the OUT connection to the signal line 1570. In the preferred embodiment, the I/O CLK connection is connected to the output of a two-input AND-gate 1582 via a signal line 1584. One of the two inputs of the AND-gate 1582 is connected to the output of an inverter gate 1586 via a signal line 1588. The input of the inverter 1586 is connected to the TxD line 1512 and thus to the TxD output connection of the microprocessor 1500. Thus, when the microprocessor 1500 executes a serial I/O instruction, the data rate of the serial output data on the TxD output connection of the microprocessor 1500 controls the rate at which the ADC 1554 transmits data to the microprocessor 1500. The second input of the AND-gate 1582 is connected to the ENABLE signal line 1580 and is thus enabled when the AND-gate 1572 is enabled by the switch (not shown).

The ADC 1554 further includes a chip select ("$\overline{CS}$") input connection which controls the sampling of the ADC 1554. When the voltage level on the $\overline{CS}$ input connection is active low, the ADC 1554 begins transmitting the currently converted digital data out at a rate determined by the clock signal on the I/O CLK connection, and thus, at a rate determined by the TxD signal generated by the microprocessor 1500. When voltage level on he $\overline{CS}$ input connection is returned to the high voltage level, the ADC samples the analog voltage on the $A_{IN}$ input connection and begins converting it to a digital representation. The $\overline{CS}$ input connection is connected the $\overline{WR}$ output connection of the microprocessor 1500 via the $\overline{WR}$ signal line 1516. Thus, when the microprocessor 1500 activates the signal on the $\overline{WR}$ output connection, the ADC 1554 will be enabled.

Appendix B is an exemplary source listing for a program that controls the microprocessor 1500 in accordance with this aspect of the present invention. The source listing in Appendix B is similar to the source listing in Appendix A with appropriate modifications for the differences in the 8748 microprocessor and the 87C51 microprocessor. The comments for the source listing provide a detailed explanation of the operation of the microprocessor 1500 in determining the current gear position, measuring the current count of the rear wheel 14 and adjusting the gear position in accordance with the measured count. Unlike the previously described source listing, the source listing of Appendix B includes provisions for measuring the strain applied to the chain and for adjusting the gear position in response to the measured strain.

The operation of the program in accordance with the source listing of Appendix B is set forth in a flow chart in FIGS. 49A–49F. The program begins in an activity block 1600 whenever the microprocessor 1500 is reset, as discussed above. In the activity block 1600, the microprocessor 1500 is initialized by selecting register banks 0 for the calculations. Thereafter, the program execution continues in an activity block 1604 wherein the logic levels on the A, B, C and D signal lines 750, 752, 754 and 756 representing the current gear position are input and stored in the internal register R0.

After storing the current gear position in the register R0, the program execution continues in an activity block 1610 wherein the internal counter is reset to zero and turned on to count the high-to-low transitions of the $\overline{TICK}$ signal on the $\overline{TICK}$ signal line 790. Thereafter, in an activity block 1614, the microprocessor 1500 enters a delay loop and waits for a predetermined amount of time (e.g., approximately 1/6 second) to allow the internal counter to count the $\overline{TICK}$ signals. The details of the delay operation are not shown, but have been fully described in connection with the flow chart of FIG. 49A. At the end of the predetermined delay, the program execution resumes in an activity block 1618 wherein the internal counter is disabled and the count in the internal counter is transferred to the internal register R1.

After the $\overline{TICK}$ count corresponding to the current wheel rotational velocity has been measured, the program then causes the microprocessor 1500 to measure the strain on the chain by branching to an activity block 1640. The details of the serial input/output activity block 1640 for measuring the strain are illustrated in FIG. 49E. Within an activity block 46A in the activity block 1640, the microprocessor 1500 first transfers the result of a previous analog-to-digital conversion by activating the $\overline{WR}$ output signal. Thereafter, the microprocessor 1500 enables the serial I/O port in an activity block 1640B. Thereafter, the program enters a decision block 1640C and waits for the 8 bits of data to be transferred to the internal accumulator of the microprocessor 1500 as indicated by a register flag that is set by the serial I/O hardware upon completion of the transfer. After the eight bits of data have been transferred, the $\overline{WR}$ output signal is deactivated in an activity block 1640D to end the activity block 1640. The deactivation of the $\overline{WR}$ output signal causes the ADC 1554 to sample and convert a new analog sample. The microprocessor 1500 does not utilize the serial data input during the first pass through the activity block 1640. After completing the operations in the activity block 1640, processing continues in an activity block 1650 which is a short delay to allow the ADC 1554 to have a sufficient amount of time to convert the new analog sample to a digital representation. Thereafter, the program again branches to the activity block 1640 where it inputs the digital data corresponding to the most recent analog voltage sampled by the ADC 1554.

The serial digital data input from the ADC 1554 to the internal accumulator of the microprocessor 1500 has the least significant bit of digital data in the most significant position of the accumulator, the next least significant bit in the next most significant bit position, and so on. After inputting the digital data to the accumulator in the activity block 1640, the program resumes execution in an activity block 1660 wherein the digital data in the accumulator is converted from its original representation to a representation where the data bits in the accumulator are in their correct binary weighted positions.

After converting the data to its correct binary weighted positions, the program execution resumes in an activity block 1670 wherein the digital strain data is divided by $16_{HEX}$ (22 decimal). The quotient is then transferred to the internal register R7. Thereafter, the program execution continues in an activity block 1674 wherein the low limit and the high limit of the $\overline{TICK}$ count range are calculated. The low $\overline{TICK}$ count range limit is calculated by multiplying the current gear position by 3 and adding 31. The low $\overline{TICK}$ count range limit is further increased by the result of the division in the activity block 1670, as stored in the register R7. The low limit of the $\overline{\text{TICK}}$ count range is stored in the internal register R2. The high limit of the $\overline{\text{TICK}}$ count range is calculated in the activity block 1674 by multiplying the current gear position by 4 and adding 37. The high limit of the $\overline{\text{TICK}}$ count range is further increased by adding the result of the division stored in the register R7 corresponding to the measured strain. The high limit of the $\overline{\text{TICK}}$ count range is stored in the internal register R3.

The use of the strain gauge output to increase the low and high limits of the $\overline{\text{TICK}}$ count range has the effect of providing a passing gear for the shifting mechanism. If a cyclist applies a sudden additional strain to the chain, such as may occur when the cyclist exerts extra effort to pass another cyclist, the additional applied strain causes the limits of the $\overline{\text{TICK}}$ count range to increase. Thus, rather than causing the shifting mechanism to shift up, such as would happen but for the strain gauge input, the cyclist is allowed to pedal at a faster cadence while remaining in the currently selected gear position.

After calculating the low and high limits of the $\overline{\text{TICK}}$ count range in the activity block 1674, the program continues in a decision block 1690 wherein the measured $\overline{\text{TICK}}$ count is compared to the low $\overline{\text{TICK}}$ count limit. If the measured $\overline{\text{TICK}}$ count is less than or equal to the low $\overline{\text{TICK}}$ count limit, the program continues execution in a decision block 1694 wherein the measured $\overline{\text{TICK}}$ count is again compared to the low $\overline{\text{TICK}}$ count limit. If the measured $\overline{\text{TICK}}$ count is equal to the low $\overline{\text{TICK}}$ count limit, the current gear position is correct, and program execution continues with the activity block 1610 wherein the $\overline{\text{TICK}}$ count is once again measured. If the measured $\overline{\text{TICK}}$ count is not equal to the low $\overline{\text{TICK}}$ count limit in the decision block 1694, then it must be less than the low $\overline{\text{TICK}}$ count limit and program execution branches to an activity block 1700 which corresponds to the shift down routine. The shift down activity block 1700 is illustrated in more detail in FIG. 49C and will be described more fully below.

Figure 49A:
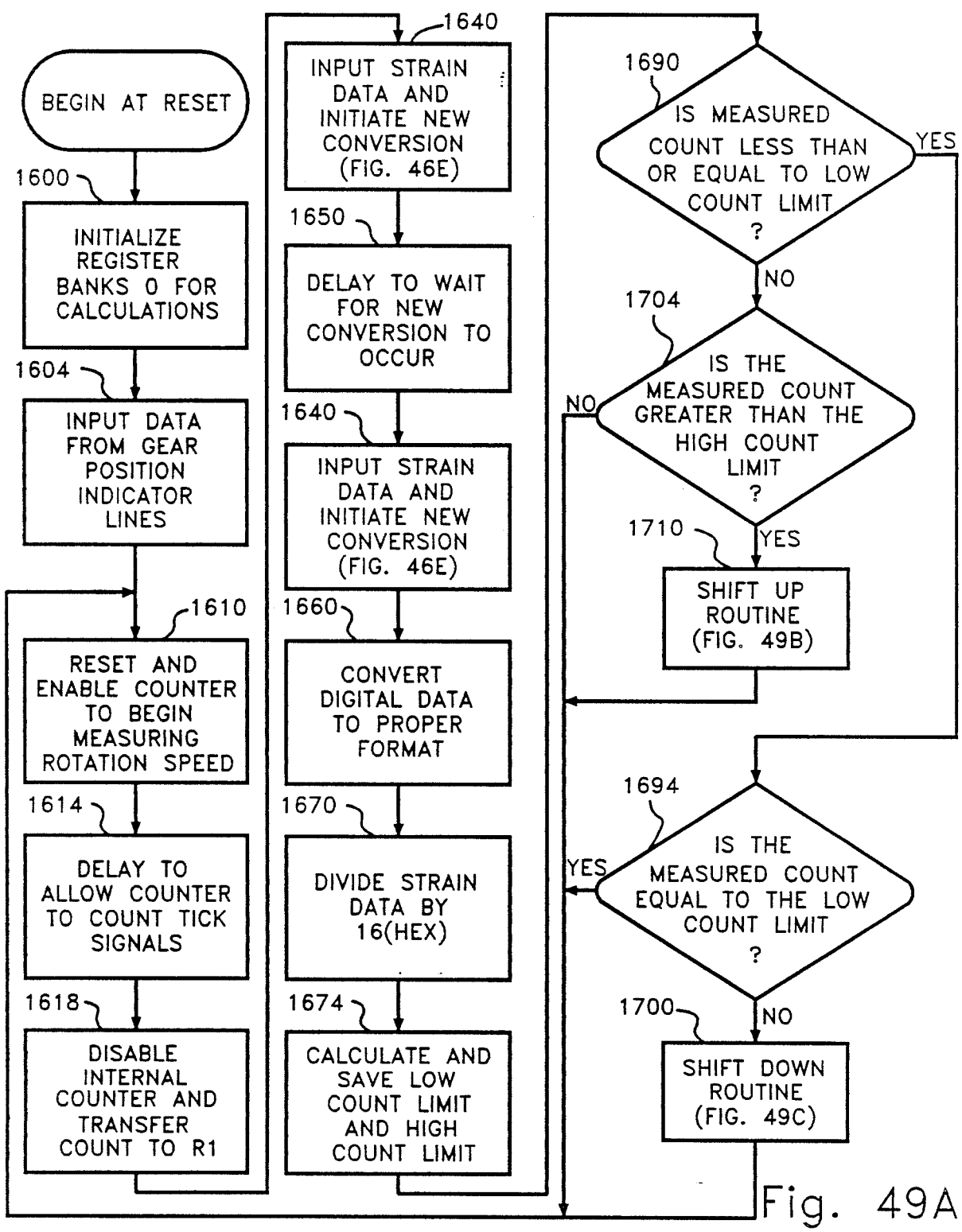
FIGS. 49A-49F illustrate an exemplary flow chart for a computer program for the microprocessor of FIG. 44.

Returning to the decision block 1690 of FIG. 49A, if the measured $\overline{\text{TICK}}$ count is greater than the low $\overline{\text{TICK}}$ count limit, then program execution branches to a decision block 1704 wherein the measured $\overline{\text{TICK}}$ count is compared to the high $\overline{\text{TICK}}$ count limit. If the measured $\overline{\text{TICK}}$ count is less than or equal to the high $\overline{\text{TICK}}$ count limit, then the measured $\overline{\text{TICK}}$ count is within the range for the current gear position, and the program branches back to the activity block 1610 wherein it resumes the measurement of the current $\overline{\text{TICK}}$ count. On the other hand, if the measured $\overline{\text{TICK}}$ count is greater than the high $\overline{\text{TICK}}$ count limit, then the program branches to an activity block 1710 which corresponds to the shift up routine. The details of the shift up activity block 1710 are illustrated in FIG. 49B.

Figure 49B:
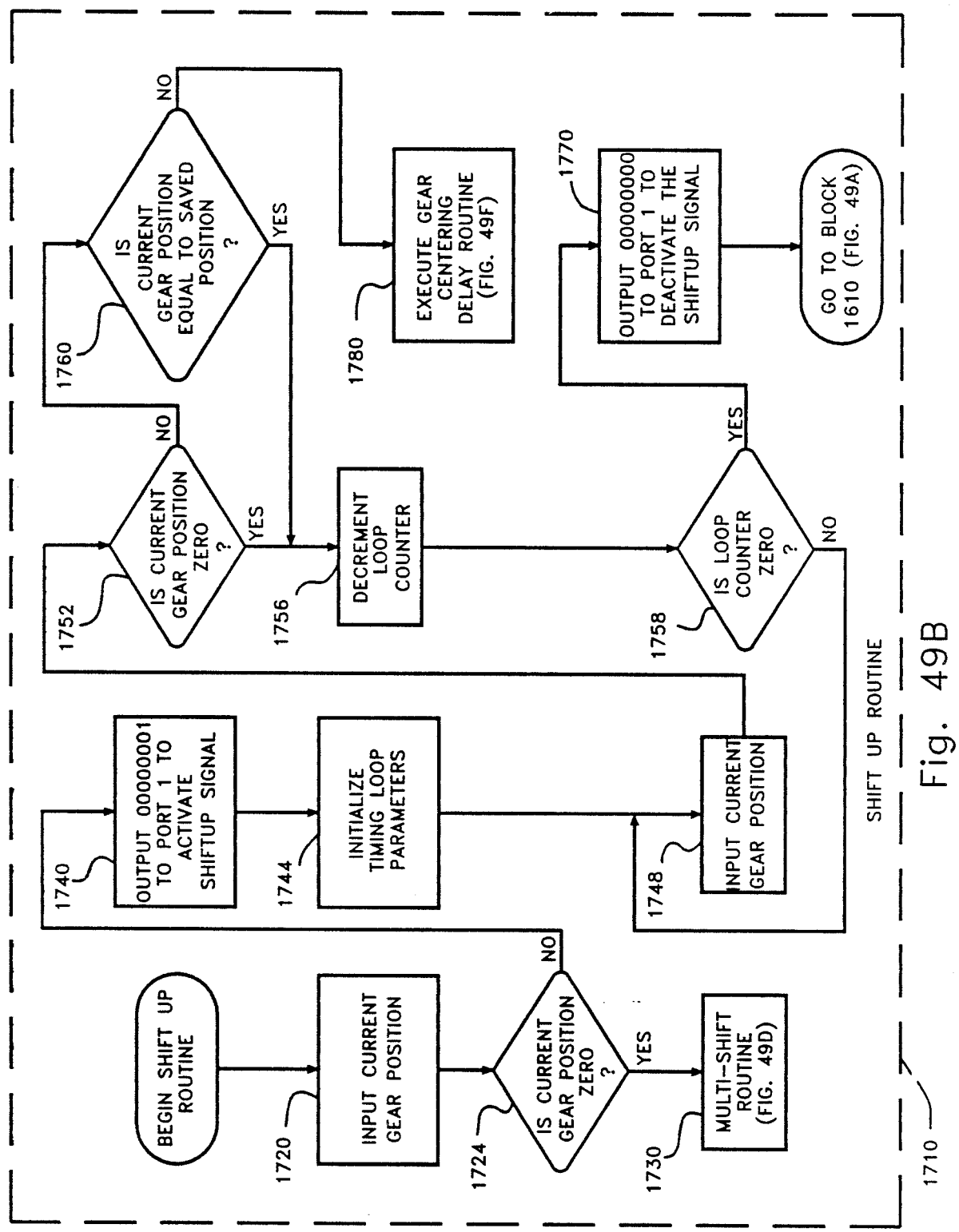

In FIG. 49B, in a first activity block 1720 within the shift up activity block 1710, the microprocessor 1500 inputs the current gear position, and then, in a decision block 1724, the current gear position is compared to zero. If the current gear position is zero, the program branches to a multi-shift activity block 1730, illustrated in more detail in FIG. 49D. On the other hand, if the current gear position is not zero, the program branches to an activity block 1740 wherein (00000001)$_2$ is output to the port 1 to activate the SU signal, and thus the $\overline{\text{SHIFTUP}}$ signal, as discussed above. Thereafter, the microprocessor 1500 executes the instructions associated with the activity block 1744 wherein it initializes a delay loop, an activity block 1748 wherein it inputs the current gear position, a decision block 1752 wherein the current gear position is compared to zero, an activity block 1756 wherein the loop counter is decremented, a decision block 1758 wherein the loop counter is compared to zero, and a decision block 1760 wherein the current gear position is compared to the stored gear position. If the loop counter reaches zero before the current gear position changes to non-zero value different from the original gear position, the program will branch from the decision block 1758 to an activity block 1770 wherein (00000000)$_2$ is output to the port to disable the SU signal and thus turn off the motor 238. Thereafter, the program branches back to the activity block 1610 wherein it resumes measuring the $\overline{\text{TICK}}$ count and the strain. On the other hand, if the shifting mechanism successfully shifts to a new gear position within the allowed delay time, the program branches from the decision block 1760 to an activity block 1780 which represents an optional gear centering routine.

Figure 49C:
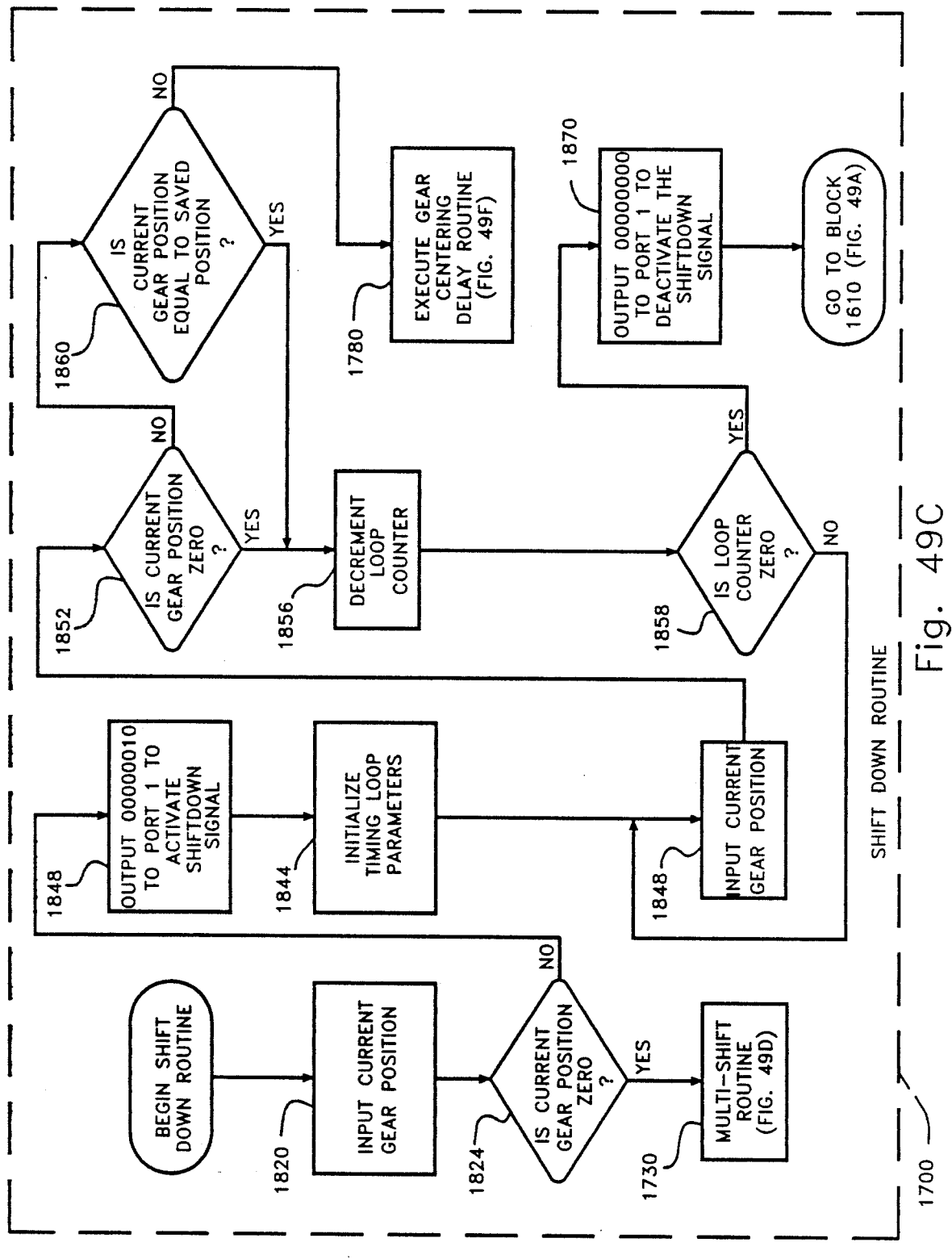
Figure 49D:
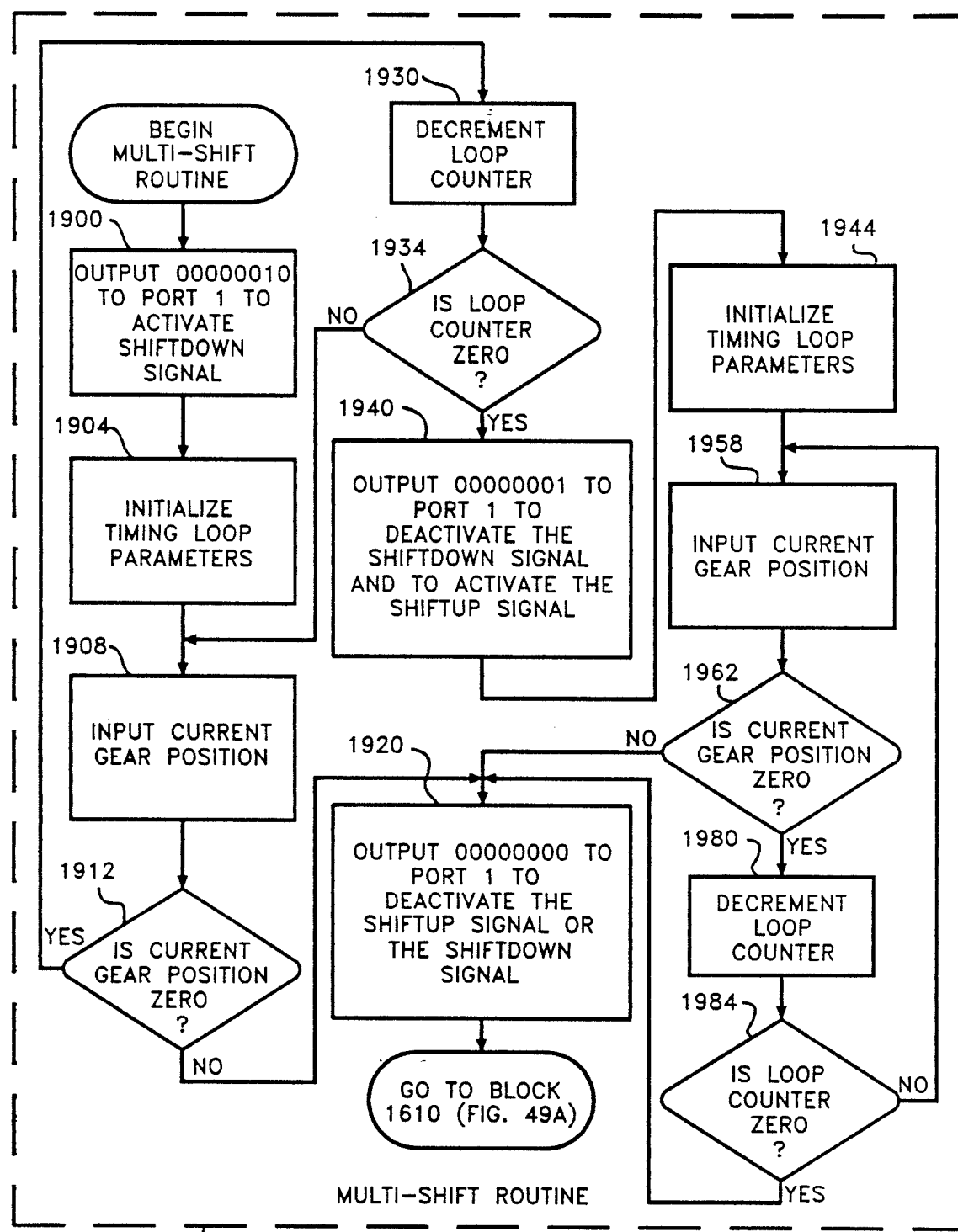
Figure 49E:
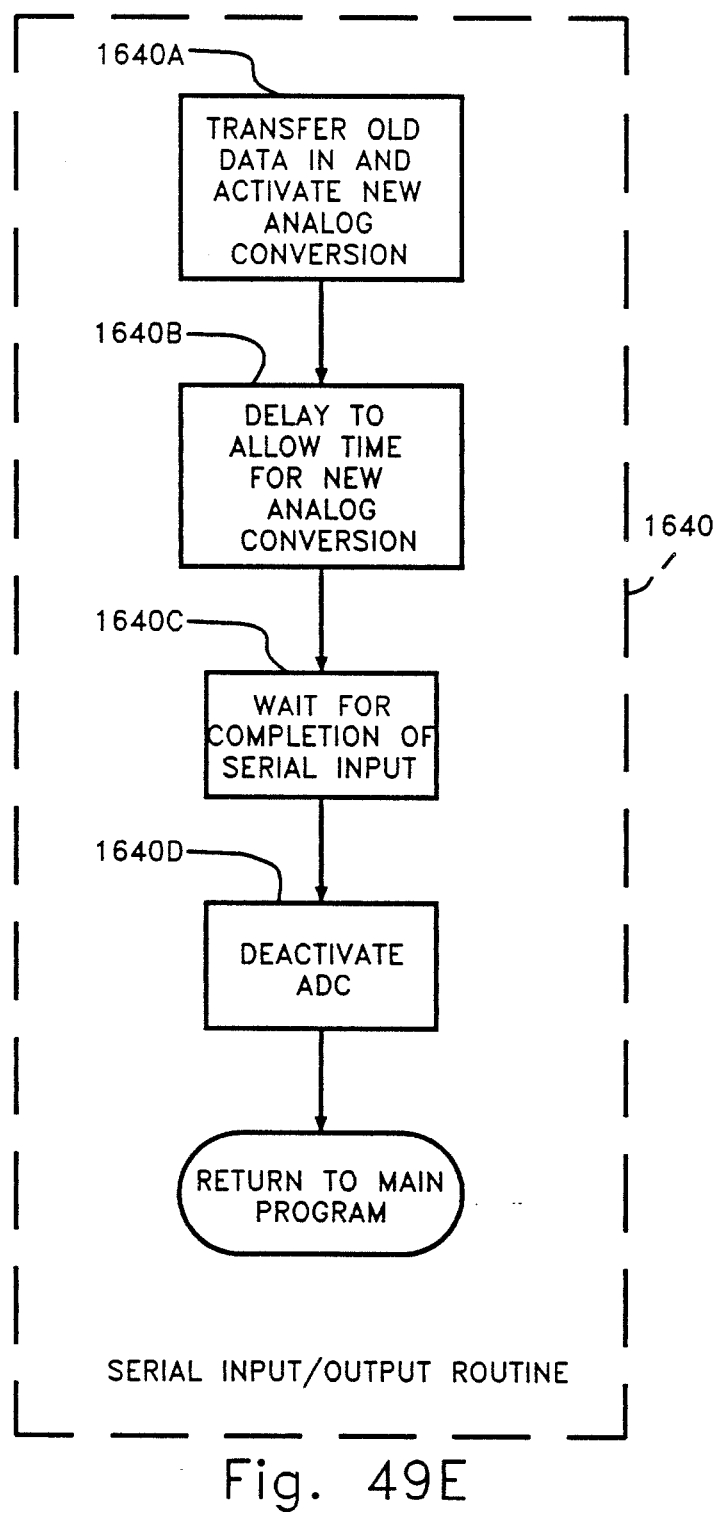
Figure 49F:
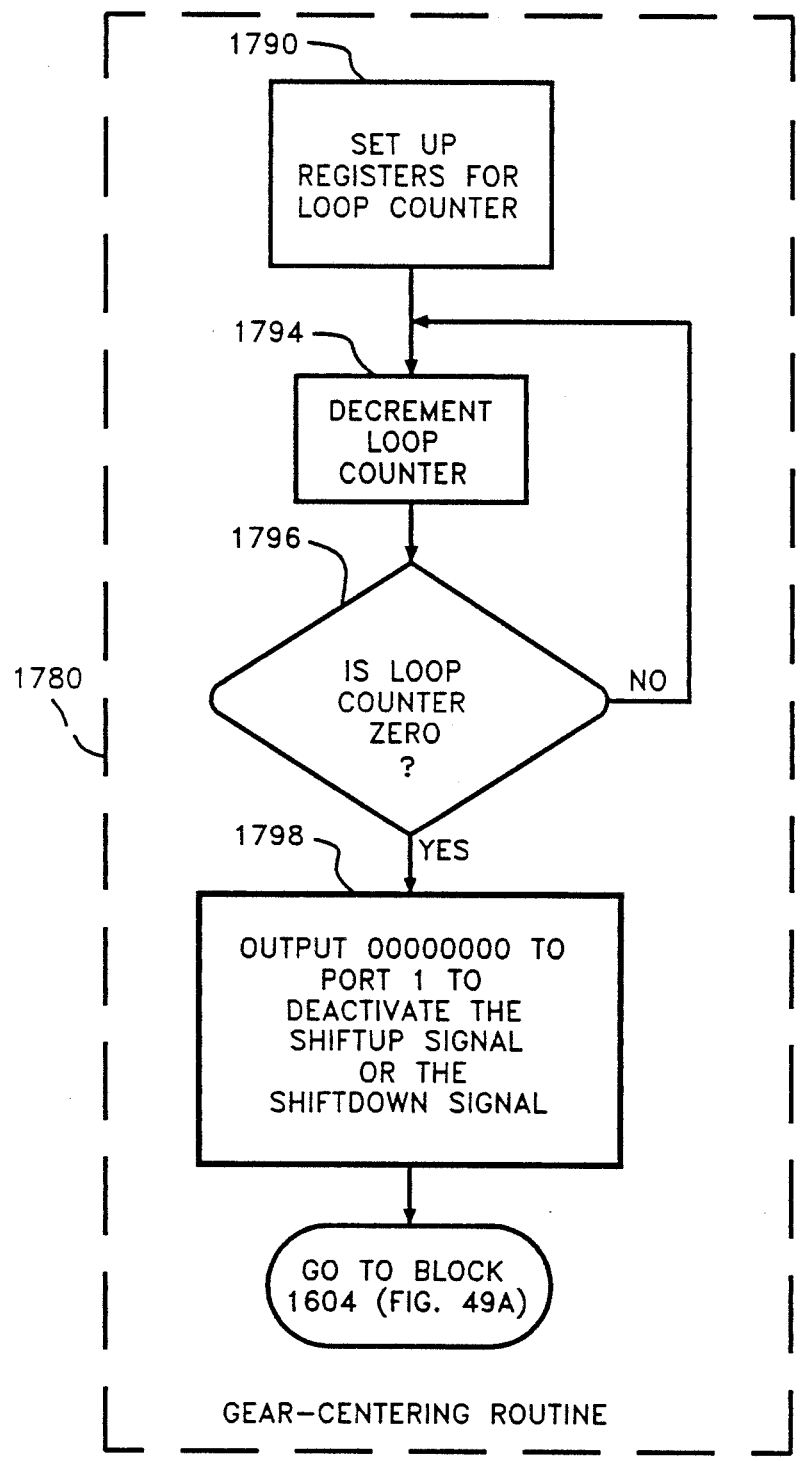

The optional gear centering routine is illustrated in more detail in FIG. 49F. As illustrated in FIG. 49F, the gear centering routine includes a first activity block 1790 wherein the internal register R3 and the internal register R2 comprise a loop counter that is initialized with values to provide a delay of approximately 40 milliseconds. In an activity block 1794, the loop counter is decremented, and in a decision block 1796, the loop counter is compared to zero to determine whether the delay has been completed. When the delay is completed, the program executes the instructions in an activity block 1798 wherein (00000000)$_2$ is output to the port 1 to deactivate both the SU and the SD signals, thus deactivating whichever signal is active upon entry to the activity block 1790. Thereafter, the program branches to the activity block 1604 of FIG. 49A wherein the current gear position is input by the microprocessor 1500. The purpose of the gear centering routine is to assure that the shifting mechanism is well within the currently selected gear position rather than at one edge of it. This will reduce the wear on the shifting mechanism. Depending upon the configuration of the switch contacts 430–440 in the contact set 429, the gear centering routine may not be necessary. For example, the switch contacts can be advantageously configured so that a particular switch contact does not engage until its corresponding gear is centered.

Referring now to FIG. 49C, the details of the shift down activity block 1700 are illustrated. It can be seen that the shift down activity block 1700 is substantially identical to the shift up activity block 1710 described above. Thus, the blocks within the activity block 1700 have been numbered with numbers 100 greater than the numbers of corresponding blocks within the activity block 1710. In other words, the activities with the activity block 1820 in FIG. 49C correspond to the activities in the activity block 1720 of FIG. 49B, the decision represented by the decision block 1824 corresponds to the decision in the decision block 1724, and so on. The only significant difference between the shift down activity block 1700 of FIG. 49C and the shift up activity block 1710 of FIG. 49B is that in the activity block 1840 of FIG. 49C, the microprocessor 1500 is caused to output (00000010)$_2$ to the port 1 to activate the SD signal and thus activate the $\overline{\text{SHIFTDOWN}}$ signal from the PAL circuit 704. The shift down activity block 1700 ends by branching to the activity block 1610 of FIG.

49A or by branching to the gear centering activity block 1780 of FIG. 49F.

The multi-shift routine activity block 1730 is shown in more detail in FIG. 49D. The multi-shift routine of FIG. 49D is substantially similar to the previously described multi-shift routine of FIG. 43D and will not be described in detail. In FIG. 49D, the blocks have been labelled with numbers that are 600 greater than the corresponding blocks in FIG. 43D. Thus, for example, an activity block 1900 in FIG. 49D corresponds to the activity block 1300 in FIG. 43D, an activity block 1904 corresponds to the activity block 1304, and so on. When the multi-shift routine represented by the activity block 1730 is completed the program branches back to the activity block 1604 of FIG. 49A to input the current gear position.

As in the previously described embodiment, the RESET signal is generated if the microprocessor 1500 does not generated an SU or an SD signal within 1.25 seconds.

Although described above in connection with two particularly preferred microprocessors, one skilled in the art will appreciate that other embodiments of the present invention can be envisioned utilizing other microprocessors or microcontrollers.

What is claimed is:

1. A device that automatically controls the gear selection of a multi-gear shifting mechanism of a bicycle, comprising:

an electric motor engageable with the shifting mechanism so that rotation of said electric motor causes said shifting mechanism to shift from one gear to another gear, the motor operational in a first direction to cause said shifting mechanism to select a higher gear, said motor operational in a second direction to cause said shifting mechanism to select a lower gear;

a transducer that generates a transducer output signal having a characteristic that varies in accordance with the rotation rate of one of the wheels of said bicycle;

a strain gauge that detects the strain applied to said bicycle when being pedalled by a rider, said strain gauge providing a strain gauge output signal responsive to the detected strain; and an electrical circuit that receives said transducer output signal and said strain gauge output signal, and that generates a motor power signal to operate said electric motor, said electrical circuit comparing the characteristic of said transducer output with first and second ranges of characteristics for the currently selected gear, said first and second ranges of characteristics varying in response to said strain gauge output signal, said electrical circuit generating said motor power signal with a first polarity to operate said electric motor in said first direction to select a higher gear when said transducer output is within said first range of characteristics, said electrical circuit generating said motor power signal with a second polarity to operate said electric motor in said second direction to select a lower gear when said transducer output is within said second range of characteristics.

2. The device as defined in claim 1, wherein said characteristic is the time interval between successive pulses generated by said transducer.

3. A device that automatically controls the gear selection of a multi-gear shifting mechanism of a bicycle, comprising:

an electric motor engageable with the shifting mechanism so that rotation of said electric motor causes said shifting mechanism to shift from one gear to another gear, the motor operational in a first direction to cause said shifting mechanism to select a higher gear, said motor operational in a second direction to cause said shifting mechanism to select a lower gear;

a transducer that generates a transducer output signal having a characteristic that varies in accordance with the rotation rate of one of the wheels of said bicycle; and an electrical circuit that receives said transducer output signal and that generates a motor power signal to operate said electric motor, said electrical circuit comparing the characteristic of said transducer output with first and second ranges of characteristics for the currently selected gear, said electrical circuit generating said motor power signal with a first polarity to operate said motor in said first direction to select a higher gear when said transducer output is within said first range of characteristics, said electrical circuit generating said motor power signal with a second polarity to operate said electric motor in said second direction to select a lower gear when said transducer output is within said second range of characteristics, said electrical circuit comprising:

a pulse generator that generates a pulse having a time duration that varies in accordance with the currently selected gear;

a counter that counts the number of pulses generated by said transducer during said time duration and provides a count output corresponding to the number of pulses; and a decoder that decodes the count output of said counter and that generates a first signal when said count output is within a first range of counts and that generates a second signal when said count output is within a second range of counts.

4. The device as defined in claim 3, wherein said time duration is selected by a plurality of timing resistors, one of said timing resistors corresponding to each gear selection provided by said shifting mechanism.

5. The device as defined in claim 7, wherein said characteristic of said transducer output is the number of pulses generated by said transducer.

6. The device as defined in claim 1, wherein said electrical circuit comprises a microprocessor, said microprocessor receiving said pulses from said transducer as a first input and receiving a second input indicative of the current gear of said multi-gear shifting mechanism, said microprocessor selectably outputting a signal to operate said electric motor in response to said first and second inputs, said microprocessor counting the number of said pulses per unit time and comparing said number with an associated range of numbers for the current gear of said shifting mechanism and operating said electric motor to select a higher gear when said number of pulses is greater than said associated range of numbers and operating said electric motor to select a lower gear when said number of pulses is less than said associated range of numbers.

7. A device that automatically controls the gear selection of a multi-gear shifting mechanism of a bicycle, comprising:
- a transducer for generating a sequence of pulses at a rate that varies in accordance with the rotation speed of the rear wheel of said bicycle;
- a gear position indicator that generates a gear position indicator signal that varies in accordance with the current gear of said multi-gear shifting mechanism;
- an electric motor that provides power to shift said multi-gear shifting mechanism, said electric motor responsive to current flowing in a first direction to shift said multi-gear shifting mechanism from a lower gear to a higher gear, said electric motor responsive to current flowing in a second direction to shift said multi-gear shifting mechanism from a higher gear to a lower gear;
- a motor control circuit responsive to a first signal to generate current to said electric motor in said first direction in response to a first shift signal and to generate current to said electric motor in said second direction in response to a second shift signal;
- a microprocessor that receives said sequence of pulses from said transducer and said gear position indicator switch from said gear position indicator and generates said first and second shift signals to said motor control circuit responsive thereto, said microprocessor comparing the number of pulses that occur in a predetermined amount of time with a range of numbers associated with the current gear position indicator signal and generating one of said first and second shift signals when said number of pulses is outside said range of numbers; and
- a strain gauge that detects the strain applied to said bicycle when being pedalled by a rider, said strain gauge generating an output signal that is provided as an input to said microprocessor, said microprocessor responsive to said strain gauge output signal to adjust said range of numbers associated with the current gear position indicator so that said range of numbers is increased when additional strain is applied by said rider.

8. A device that automatically controls the gear selection of a multi-gear shifting mechanism of a bicycle, comprising:
- a transducer for generating a sequence of pulses at a rate that varies in accordance with the rotation speed of the rear wheel of said bicycle;
- a gear position indicator that generates a gear position indicator signal that varies in accordance with the current gear of said multi-gear shifting mechanism;
- an electric motor that provides power to shift said multi-gear shifting mechanism, said electric motor responsive to current flowing in a first direction to shift said multi-gear shifting mechanism from a lower gear to a higher gear, said electric motor responsive to current flowing in a second direction to shift said multi-gear shifting mechanism from a higher gear to a lower gear;
- a motor control circuit responsive to a first signal to generate current to said electric motor in said first direction in response to a first shift signal and to generate current to said electric motor in said second direction in response to a second shift signal;
- a microprocessor that receives said sequence of pulses from said transducer and said gear position indicator switch from said gear position indicator and generates said first and second shift signals to said motor control circuit responsive thereto, said microprocessor comparing the number of pulses that occur in a predetermined amount of time with a range of numbers associated with the current gear position indicator signal and generating one of said first and second shift signals when said number of pulses is outside said range of numbers; and
- a timer circuit, said timer circuit generating a periodic timer output signal when said timer circuit is enabled, said timer output signal causing said microprocessor to be reset to known predetermined conditions, said timer circuit being disabled whenever said microprocessor generates one of said first and second shift signals so that said reset signal is precluded for a predetermined amount of time after each of said first and second shift signals.

9. A method of controlling an automatic shifting mechanism in a bicycle, comprising the steps of:
- generating a sequence of pulses having a pulse repetition rate responsive to the rotation speed of a bicycle wheel;
- counting the number of said pulses in said sequence in a predetermined amount of time;
- comparing said counted number of pulses with a predetermined range of pulses for the currently selected gear of said shifting mechanism;
- shifting said shifting mechanism to a selected one of a higher or a lower gear when said counted number of pulses is outside said predetermined range of pulses for the currently selected gear;
- measuring the strain applied to the rear wheel of said bicycle by a rider on said bicycle; and
- adjusting said predetermined range of pulses for the currently selected gear in response to the magnitude of said measured strain so that said shifting step occurs when said counted number of pulses is outside said adjusted predetermined range of pulses.

10. An apparatus for sensing the force applied to a drive chain of a bicycle that has a frame and a drive wheel rotating about an axle mounted within said frame, said apparatus comprising:
- a force sensing device that provides an output that is sensitive to an applied force;
- an axle strap having a first end and a second end, said first end having an opening that receives one end of said axle, said one end of said axle mounted so that it is free to move with respect to said frame of said bicycle, said second end of said axle strap coupled to said force sensing device to that force applied to said drive chain is coupled from said drive chain through said axle and said axle strap to said force sensing device.

11. The apparatus as defined in claim 10, wherein said output is an electrical signal having a characteristic responsive to the magnitude of said force.

12. A method for sensing the force applied to the chain of a bicycle by a drive sprocket, comprising the steps of:
- mounting the drive wheel of the bicycle in the frame of the bicycle so that one end of the axle of the wheel is loosely mounted with respect to the frame;
- interconnecting said one end of the axle to a force transducer so that force applied to said chain is coupled through said axle to said force transducer; and
- sensing the force applied to said force transducer and providing an output responsive thereto.

* * * * *

UNITED STATES PATENT AND TRADEMARK OFFICE
CERTIFICATE OF CORRECTION

PATENT NO. : 4,952,196
DATED     : August 28, 1990
INVENTOR(S) : Keith C. Chilcote and Robert J. Malahowski It is certified that error appears in the above-identified patent and that said Letters Patent is hereby corrected as shown below:

Column 7, line 43, insert "is" after "13" and before "a".

Column 33, line 21, change "506" to --706--.

Column 51, line 31, change "he" to --the--.

Appendix A (set forth on pages 104-108 of the application) is missing from the patent.

Appendix B (set forth on pages 109-115 of the application) is missing from the patent.

Column 56, line 24, insert "electric" between "said" and "motor".

Column 58, line 49, after device, change "to" to --so--.

Signed and Sealed this

Eighteenth Day of May, 1993

Attest:

MICHAEL K. KIRK

Attesting Officer

Acting Commissioner of Patents and Trademarks